US012279318B2

(12) United States Patent
Mo

(10) Patent No.: US 12,279,318 B2
(45) Date of Patent: Apr. 15, 2025

(54) TRANSACTIVE COMMUNICATION NETWORK

(71) Applicant: Instant! Communications Inc, Colorado Springs, CO (US)

(72) Inventor: Richard Mo, Colorado Springs, CO (US)

(73) Assignee: Instant! Communications Inc, Colorado Springs, CO (US)

( * ) Notice: Subject to any disclaimer, the term of this patent is extended or adjusted under 35 U.S.C. 154(b) by 0 days.

(21) Appl. No.: 18/111,391

(22) Filed: Feb. 17, 2023

(65) Prior Publication Data

US 2024/0008110 A1 Jan. 4, 2024

Related U.S. Application Data

(63) Continuation of application No. 17/026,031, filed on Sep. 18, 2020, now abandoned.
(Continued)

(51) Int. Cl.
*H04W 76/11* (2018.01)
*H04W 12/73* (2021.01)
(Continued)

(52) U.S. Cl.
CPC ............ *H04W 76/11* (2018.02); *H04W 12/73* (2021.01); *H04W 88/16* (2013.01); *H04W 92/06* (2013.01);
(Continued)

(58) Field of Classification Search
None
See application file for complete search history.

(56) References Cited

U.S. PATENT DOCUMENTS 9,565,117 B2 2/2017 Dahod et al.
9,693,356 B1 6/2017 Ren et al.
(Continued)

FOREIGN PATENT DOCUMENTS

CN 101095349 B 5/2012
CN 103583078 A 2/2014
(Continued)

OTHER PUBLICATIONS

Anna Lally, "Internet Access in Developing Countries—A Tool Sustainability—The Borgen Project," borgenproject.org, Oct. 2018 [retrieved from www.borgenproject.org on Sep. 10, 2020].
(Continued)

*Primary Examiner* — Robert M Morlan
(74) *Attorney, Agent, or Firm* — Haynes and Boone, LLP

(57) ABSTRACT

A method of operating a user equipment (UE) gateway through a transactive network is disclosed. The method includes sending a service request to one or more distributed units in the network, receiving a proposed contract from each of the one or more distributed units, deciding on a winning proposed contract, notifying a winning distributed unit associated with the winning proposed contract, and connecting to receive services through the winning distributed unit. A method of operating a distributed unit includes receiving a service request from a UE gateway, requesting service from a provider according to the service request, receiving a provisional contract from the provider, providing a proposal with the provisional contract to the service request to the UE gateway; and, if notified that the proposal is a winning proposal, arranging services to the UE gateway according to the proposal.

54 Claims, 41 Drawing Sheets

Related U.S. Application Data

(60) Provisional application No. 63/012,433, filed on Apr. 20, 2020, provisional application No. 62/911,556, filed on Oct. 7, 2019.

(51) Int. Cl.
  H04W 88/16 (2009.01)
  H04W 92/06 (2009.01)
  *G16Y 10/75* (2020.01)
  *G16Y 30/10* (2020.01)
  *H04L 9/40* (2022.01)
  *H04L 41/50* (2022.01)
  *H04L 41/5006* (2022.01)
  *H04W 12/088* (2021.01)
  *H04W 28/02* (2009.01)
  *H04W 76/12* (2018.01)
  *H04W 84/18* (2009.01)
  *H04W 88/02* (2009.01)

(52) U.S. Cl.
  CPC .............. *G16Y 10/75* (2020.01); *G16Y 30/10* (2020.01); *H04L 41/5006* (2013.01); *H04L 41/5029* (2013.01); *H04L 41/509* (2013.01); *H04L 63/102* (2013.01); *H04W 12/088* (2021.01); *H04W 28/0268* (2013.01); *H04W 76/12* (2018.02); *H04W 84/18* (2013.01); *H04W 88/02* (2013.01)

(56) References Cited

U.S. PATENT DOCUMENTS

| | | |
|---|---|---|
| 2007/0047441 A1 | 3/2007 | Chouanard |
| 2008/0192713 A1 | 8/2008 | Mighani et al. |
| 2009/0003356 A1 | 1/2009 | Vaswani |
| 2011/0209202 A1 | 8/2011 | Otranen |
| 2011/0299549 A1* | 12/2011 | Diab ............... H04L 12/12 370/401 |
| 2012/0082161 A1 | 4/2012 | Leung et al. |
| 2013/0257364 A1 | 10/2013 | Redding |
| 2014/0025321 A1 | 1/2014 | Spanier |
| 2014/0189127 A1 | 7/2014 | Chagam |
| 2014/0279047 A1 | 9/2014 | Wang |
| 2015/0222621 A1 | 8/2015 | Baum et al. |
| 2015/0249672 A1 | 9/2015 | Burns et al. |
| 2015/0253367 A1 | 9/2015 | Flammer, III et al. |
| 2015/0303950 A1 | 10/2015 | Shattil |
| 2016/0112470 A1 | 4/2016 | Pai et al. |
| 2016/0204951 A1* | 7/2016 | Walton .......... H04M 15/51 370/259 |
| 2016/0205078 A1 | 7/2016 | James et al. |
| 2016/0205097 A1 | 7/2016 | Yacoub et al. |
| 2016/0232366 A1 | 8/2016 | Van Gorp et al. |
| 2016/0262160 A1 | 9/2016 | Mo |
| 2017/0006135 A1 | 1/2017 | Siebel et al. |
| 2017/0195318 A1 | 7/2017 | Liu et al. |
| 2017/0195424 A1 | 7/2017 | Nasir et al. |
| 2017/0195703 A1 | 7/2017 | Durbha et al. |
| 2018/0145910 A1 | 5/2018 | Mester |
| 2018/0249375 A1 | 8/2018 | Goldhamer |
| 2018/0359811 A1 | 12/2018 | Verzun et al. |
| 2018/0368008 A1 | 12/2018 | Pajona et al. |
| 2018/0376317 A1 | 12/2018 | Kim |
| 2019/0104202 A1 | 4/2019 | Reynolds et al. |
| 2019/0140906 A1 | 5/2019 | Furuichi et al. |
| 2019/0158594 A1 | 5/2019 | Shadmon et al. |
| 2019/0245836 A1 | 8/2019 | Erickson et al. |
| 2019/0260707 A1 | 8/2019 | Kesavan et al. |
| 2020/0169572 A1 | 5/2020 | Jana |
| 2020/0304403 A1* | 9/2020 | Fiedler ............... H04L 12/4641 |
| 2020/0344292 A1 | 10/2020 | Todd |

FOREIGN PATENT DOCUMENTS

| | | |
|---|---|---|
| CN | 104823391 A | 8/2015 |
| CN | 106506197 A | 3/2017 |
| CN | 109120485 A | 1/2019 |
| CN | 109802985 A | 5/2019 |
| CN | 109905296 A | 6/2019 |
| CN | 110024478 A | 7/2019 |
| CN | 110728781 A | 1/2020 |
| CN | 112020106 A | 12/2020 |
| EP | 2782316 A1 | 9/2014 |
| KR | 2016/0129471 A | 11/2016 |
| KR | 2020/0049020 A | 5/2020 |
| WO | 2004/056121 A1 | 7/2004 |
| WO | 2013/168094 A2 | 11/2013 |
| WO | 2016/119607 A1 | 1/2017 |
| WO | 2017/003586 A1 | 1/2017 |
| WO | 2017/004251 A1 | 1/2017 |
| WO | 2017/030765 A1 | 2/2017 |
| WO | 2017/068302 A1 | 4/2017 |
| WO | 2017/108747 A1 | 6/2017 |
| WO | WO-2019217323 A1 * | 11/2019 ....... G05B 19/41865 |
| WO | 2020/022944 A1 | 1/2020 |
| WO | 2021/071660 A1 | 4/2021 |
| WO | 2021/071662 A | 4/2021 |

OTHER PUBLICATIONS

Cenfura Ltd., "The Transition to Distributed Energy," 2019. [retrieved from www.cenfura.com on Sep. 10, 2020].

Daniel Du Seuil, "European Self Sovereign Identity Framework," Jun. 2019 [retrieved from www.eesc.europa.eu on Sep. 11, 2020).

E. Jordan, "Open Ran 101-RU, Du, Cu Why, what, how, when?," Jul. 8, 2020 [retrieved from https://www.rcrwireless.com/20200708/open_ran/open-ran-101-ru-du-cu-reader-forum on Jul. 8, 2020 & Aug. 8, 2020].

Fleming, "Energy Poverty Across the Globe," Submitted as coursework for PH240, Standford University, Fall 2017, Dec. 14, 2017, pp. 1-3.

Global Banking and Finance Review, "Remote KYC: A competitive Advantage for Mobile Only Banking," Feb. 9, 2017 [retrieved from www.GlobalBankingandfinance.com on Sep. 11, 2020].

International Energy Agency, "World Energy Outlook Special Report 2017," International Energy Agency, 2017 [retrieved from www.iea.org on Sep. 10, 2020].

International Search Report and Written Opinion dated Dec. 14, 2020 issued in PCT Application No. PCT/US2020/051858 (22 pages).

International Search Report and Written Opinion dated Feb. 25, 2021 issued in PCT Application No. PCT/US2020/051877 (19 pages).

International Search Report and Written Opinion dated Jan. 4, 2021 issued in PCT Application No. PCT/US2020/051861 (22 pages).

International Search Report and Written Opinion dated Jan. 6, 2021 issued in PCT Application No. PCT/US2020/051864 (17 pages).

Micheal Fagan, Katerina N. Megas, Karen Scarfone, Matthew Smith, "Foundational Cybersecurity activities for IoT Device Manufacturers," National Institute of Standards and Technology, NISTIR 8259, May 2020 [retrieved from www.csrc.nist.gov on Sep. 10, 2020].

Robin Duke-Woolley and Syed Zaeem Hosain, "Security for the Internet of Things: Introduction," Beecham Research Ltd., Dec. 16, 2015.

Steffi O. Muhanji, Alison E. Flint, and Amro M. Farid, "eIoT: The Development of the Energy Internet of Things in Energy Infrastructure," ISBN 978-3-030-10427-6 (ebook) (Springer, 2019).

Tom Lyons, Ludovic Courcelas, and Ken Timsit, "Blockchain and Digital Identity: A thematic report prepared by The European Union Blockchain Observatory and Forum," v1.0, The European Union Blockchain Observatory and Forum, May 2019, [retrieved from www.eublockchainforum.eu on Sep. 11, 2020].

UNESCO, "The State of Broadband 2019: Broadband as a Foundation for Sustainable Development," UNESCO Broadband Com-

(56) References Cited

OTHER PUBLICATIONS mission for Sustainable Development, 2019 [retrieved from www.broadbandcommission.org on Sep. 10, 2020].
Non-Final Office Action dated Jun. 23, 2022, U.S. Appl. No. 17/026,015.
Non-Final Office Action dated Aug. 18, 2022, U.S. Appl. No. 17/026,031.
Non-Final Office Action dated Jul. 21, 2022, U.S. Appl. No. 17/026,054.
Non-Final Office Action dated Jun. 26, 2024, U.S. Appl. No. 18/157,026.
Final Office Action dated Oct. 14, 2022, U.S. Appl. No. 17/026,060.
Non-Final Office Action dated Mar. 7, 2022, U.S. Appl. No. 17/026,060.
U.S. Appl. No. 17/026,015 (filed Sep. 18, 2020).
U.S. Appl. No. 18/068,457 (filed Dec. 19, 2022).
U.S. Appl. No. 17/026,031 (filed Sep. 18, 2020).
U.S. Appl. No. 17/026,054 (filed Sep. 18, 2020).
U.S. Appl. No. 18/157,026 (filed Jan. 19, 2023).
U.S. Appl. No. 17/026,060 (filed Sep. 18, 2020).

* cited by examiner

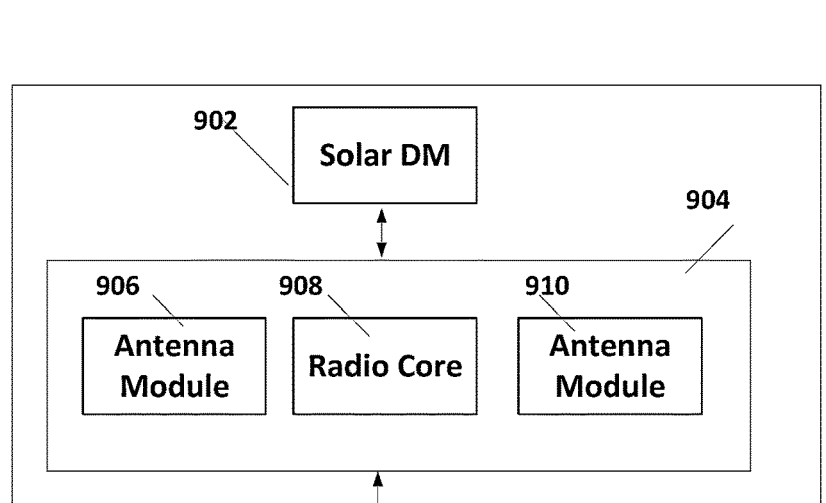
Figure 9
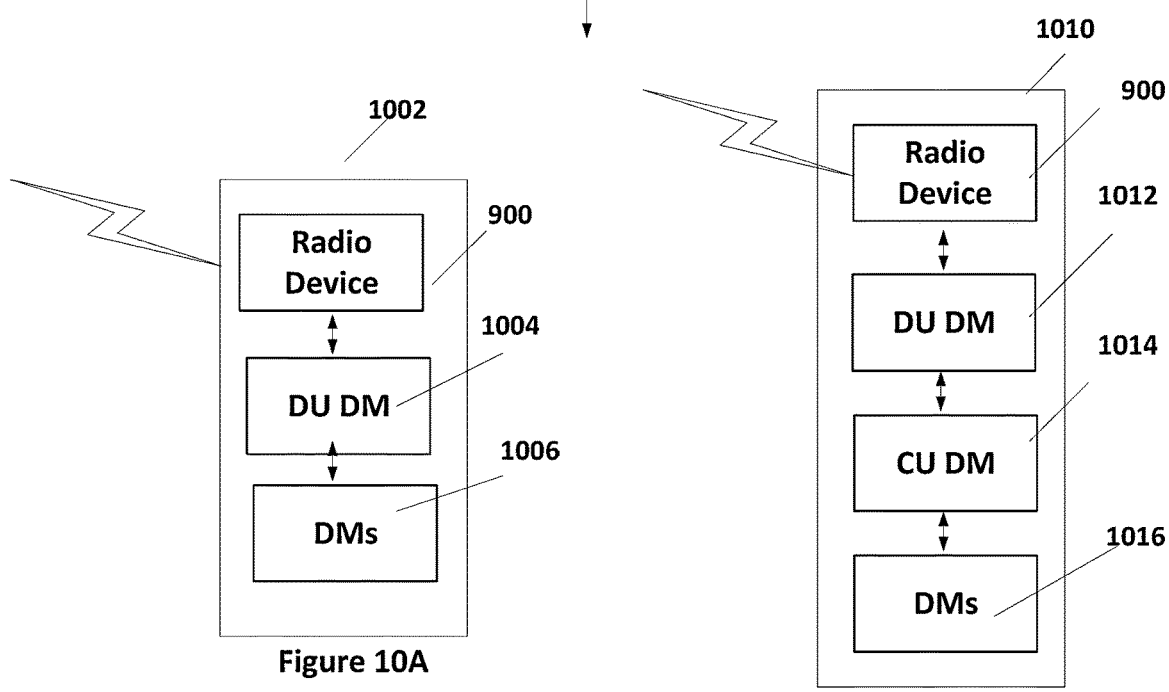
Figure 10A
Figure 10B
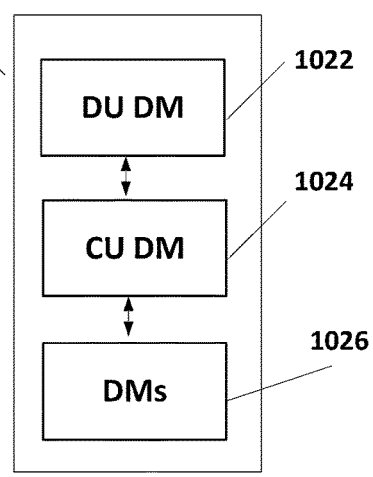
Figure 10C

SECURITY ?

TRANSACTIVE COMMUNICATION NETWORK

RELATED APPLICATIONS

This disclosure is a Continuation of U.S. Non-Provisional Ser. No. 17/026,031, entitled "A Transactive Communication Network", filed on Sep. 18, 2020, which claims priority to U.S. Provisional Application 63/012,433, entitled "System and Method for a Virtual Transactive Wireless Mesh Network Supporting Transactive Energy and Transactive Communications Services, filed on Apr. 20, 2020, and U.S. Provisional Application No. 62/911,556, entitled "System and Method for a Secure Mesh Fixed Wireless Network Protecting Connected Devices and Providing Irrefutable Distributed Transaction Ledger", filed on Oct. 7, 2019, each of which are herein incorporated by reference in their entirety.

This application is further related to U.S. patent application Ser. No. 17/026,015, filed Sep. 18, 2020, entitled "A Dynamic Radio Access Mesh Network," U.S. patent application Ser. No. 18/068,457, filed Dec. 19, 2022 entitled "A Dynamic Radio Access Mesh Network", U.S. patent application Ser. No. 17/026,054 filed Dec. 19, 2022, entitled "A Secured Distributed Mesh Network," and U.S. patent application Ser. No. 17/026,060, filed Sep. 18, 2020, entitled "Device Module Formation of Network Devices for a Distributed Mesh Radio Network", each of which are herein incorporated by reference in their entirety.

TECHNICAL FIELD

Embodiments of the present invention are related to networks and, in particular, to a system and method for a transactive communication network.

DISCUSSION OF RELATED ART

Current broadband internet services are provided by fixed networks. Although there are multiple technologies that allow for transmission of data through the network, for example by combinations of cabling, optical, microwave, radio, or other technologies. Expanding the network requires further infrastructure and is fixed to each subscriber. For example, each subscriber is fixed in bandwidth and often pays according to the amount of bandwidth that is subscribed but not based on the bandwidth that is actually used. Further, the number of Internet-of-Things (IOT) devices is increasing dramatically. These devices present security problems for standard networks.

It has been years since United Nations identified broadband connection to the enormous economic and social benefits of the Internet as a critical accelerator of development for developing countries. As of 2015, over 4 billion of people in the developing countries are still without Internet access. (Anna.Lally, "Internet Access in Developing Countries—A Tool for Sustainability—The Borgen Project," borgenproject.org, October 2018 [retrieved from www.borgenproject.org on Sep. 10, 2020]; UNESCO, "The State of Broadband 2019: Broadband as a Foundation for Sustainable Development," UNESCO Broadband Commission for Sustainable Development, 2019 [retrieved from www-.broadbandcommission.org on Sep. 10, 2020]). However, the costs and complexity of building radio base station network infrastructure, such as the 5G NR radio to provide Internet access have been costly to develop and slow to implement even in the developed countries like the United States.

Meanwhile Internet contents have evolved to multi-media with HD, 4K, 8K, and Retina VR/AR streaming that requires over 1 Gbps broadband access. The explosive growth has caught many by surprise including the regulatory agencies in developed countries. For example, the FCC of United States still defines Internet Broadband access as 25 Mbps, which is woefully inadequate to access the many sophisticated services provided by the Internet. This broadband inadequacy not only limits the development of billions of people in developing countries it also bounds 10s of millions of Americans with fundamental economic and social disadvantage.

Furthermore, the focus on fixed wired broadband technologies to provide Internet access have been costly to develop and slow to implement even in the developed countries like the United States. As of 2016, 11 million homes in the US have access to less than 25 Mbps internet connections only and over 44 million US homes have only one provider offering greater than 25 Mbps Internet connections. In addition, the 5G cellular network design community have failed to provide a cost-effective fixed broadband access. The cost and complexity of building radio base station network infrastructure, such as the 5G NR radio, to support Fixed Wireless Broadband Internet access are enormously challenging and time consuming.

The concerns of potential health issues created with large number of these radio base stations in city streets, business premises and residential neighborhoods stirs social unrests further slowdown the implementation of broadband access services to connect people who have no access or inadequate access to essential broadband Internet services.

Consequently, there is critical need of a cost effective fixed wireless solution for billions of people from developing and developed countries to connect to the Internet with adequate broadband speed quickly to realize the human development growth potential.

Meanwhile, Fortune Business Insight projected, in July 2020, the Internet-of-Things (IoT) market will grow from USD 250.72 billing in 2019 to 1,463.19 billion by 2027. The explosive growth of these devices creates tremendous challenges for Internet connectivity and cybersecurity industries to connect and secure these devices. (Micheal.Fagan, Katerina N. Megas, Karen Scarfone, Matthew Smith, "Foundational Cybersecurity Activities for IoT Device Manufacturers," National Institute of Standards and Technology, NISTIR 8259, 2020 [retrieved from www.csrc.nist.gov on Sep. 10, 2020]).

Reference to the IoT is directed to a rapidly evolving and expanding collection of diverse technologies that interact with the physical world. Many organizations are not aware of the large number of IoT devices they are already using and how IoT devices may affect cybersecurity and privacy risks differently than do conventional information technology (IT) devices. (Fagan et al., NISTIR 8259). In addition, since many of these devices are consumer-grade and cost driven, they lack basic identity management and security protection capabilities. While the actual projected numbers are debatable, the rapid market acceptance and the potential cybersecurity risks IoT devices introduced are undeniable.

Specifically, IoT, and the related Industrial Control System (ICS) devices, are vulnerable due to the following factors: 1) Outdated systems—devices are installed with undetected security exploits but lack update capabilities to correct known vulnerabilities; 2) Increased connectivity— more connected devices translate to higher risk exposures; and 3) Malware-free attacks are growing in that almost 50% of cyberattacks as of 2019 do not rely on known malware and these attacks cannot be easily identified through signatures or common Indicators of Compromise (IoC). As new IoT and ICS devices are introduced behind Fixed Wireless Home Gateways they expose the Fixed Wireless Access networks and the Transactive Energy networks to complex IoT and ICS device cybersecurity risks. Consequently, there is a large need to provide security for IoT and IoC devices (in this disclosure, reference to IoT devices includes ICS devices as well).

Further, the aging fossil-based, centralized electricity infrastructure is evolving to include a distributed renewable energy supply framework to address both the developed and developing countries' expanding electricity demands. This change is pushing the need of a Transactive Energy network framework that requires secure fixed wireless access infrastructure capable of networking potentially millions of geographically disbursed energy supply and demand endpoints to the TE core network. (Cenfura Ltd, "The Transition to Distributed Energy," 2019. [retrieved from www.cenfura.com on Sep. 10, 2020]).

The United Nations defines Energy Poverty as "the absence of sufficient choice in accessing adequate, affordable, reliable, high-quality, safe, and environmentally benign energy services to support economic and human development." As of 2016, 1.1 billion people do not have access to electricity. Recent global initiatives have attempted to address such challenges by creating objectives to lead to sustainable energy access for all. India currently leads the world with regards to increasing access to electricity where half a billion people have gained access to electricity since 2000. This pace has increased since 2011, with 40 million people gaining access each year. The International Energy Agency's (IEA) 2016 World Energy Outlook Report projects the growth of Total Primary Energy Demand from 1161 million tons of oil equivalent (Mtoe) in 2014 to between 1705-2017 Mtoe in 2025 and 2528-4049 Mtoe in 2040. (International.Energy.Agency, "World Energy Outlook Special Report 2017," International Energy Agency, 2017). During that time, global electricity consumption is projected to increase by around 2% per year. Demand for electricity in industrializing economies outpaces renewable electricity generation so that displacement does not occur, but energy generation from all available sources continues to grow.

As of 2016, 1.1 billion people do not have access to electricity. —(International Energy Agency, "World Energy Outlook Special Report 2017," International Energy Agency, 2017 [retrieved from www.iea.org on Sep. 10, 2020]). To address the electricity needs challenges, the fossil-based centralized electricity production infrastructure is evolving to include a distributed renewable energy supply framework. This change is pushing the need of a Transactive Energy (TE) network framework capable of networking potentially millions of geographically disbursed energy supply and demand endpoints to the TE core network (Cenfura Ltd, 2019).

Meanwhile, the fossil fuel-based, centralized and hierarchical electric production and distribution infrastructure of the world is undergoing a radical transformation to a renewable and distributed framework driven by the rising demand of electricity, the emergence of community focused renewable energy resources, the development of electrified transportation, the innovation of smart grid technologies, and the deregulation of electric power markets. (Cenfura Ltd, 2019; Steffi.O.Muhanji, Alison E. Flint, and Amro M. Farid, "eIoT: The Development of the Energy Internet of Things in Energy Infrastructure," ISBN 978-3-030-10427-6 (ebook) (Springer, 2019)). In the center of this new energy infrastructure is an intelligent Transactive Energy (TE) network capable of networking potentially millions of points distributed over wide geographical remote areas of supply and demand and creating an environment of interoperability in which every point can exchange energy information and thus "discuss" in real-time the value of energy at any given point in time or space. Using these values, supply points and demand points can rapidly execute transactions for energy within the framework that also includes functionality required to maintain grid stability and reliability. (Cenfura Ltd, 2019)

However, the challenges involved in building these TE networks are many. The four largest challenges include 1) design and build the TE core networks; 2) interconnecting millions of geographically disbursed supply and demand endpoints to the TE core network; 3) providing security and accounting for these transactions; and 4) securing the endpoints from malicious hackers and intruders. There is a great need to overcome these challenges.

Consequently, there is a need for more versatile, secure, and dynamic networking for providing Internet services and Transactive Energy services.

SUMMARY

A transactive communications network according to some embodiments is disclosed. In some embodiments, a method of receiving services at a user equipment (UE) gateway through a network includes sending a service request to one or more distributed units in the network, receiving a proposed contract from each of the one or more distributed units, deciding on a winning proposed contract, notifying a winning distributed unit associated with the winning proposed contract, and connecting to receive services through the winning distributed unit. A method of operating a distributed unit within a network includes receiving a service request from a user-equipment (UE) gateway, requesting service from a provider according to the service request, receiving a provisional contract from the provider, providing a proposal with the provisional contract to the service request to the UE gateway; and, if notification that the proposal is a winning proposal, arranging services to the UE gateway according to the proposal.

A user equipment (UE) gateway according to some embodiments includes a radio device that communicates with a network, a router, and one or more device interfaces. The router executes instructions to send a service request to one or more distributed units in the network, receive a proposed contract from each of the one or more distributed units, decide on a winning proposed contract, notify a winning distributed unit associated with the winning proposed contract, and connect to receive services through the winning distributed unit.

A distributed unit according to some embodiments includes a processing platform coupled between a centralized unit and a radio unit in a network, wherein the processing platform executing instructions to receive a service request from a user-equipment (UE) gateway, request service from a provider according to the service request, receive a provisional contract from the provider, provide a proposal with the provisional contract to the service request to the UE gateway, and, if notified that the proposal is a winning proposal, arrange services to the UE gateway according to the proposal.

These and other embodiments are further discussed below with respect to the following figures.

BRIEF DESCRIPTION OF THE DRAWINGS

FIG. 9 illustrates a radio device according to some embodiments.

FIGS. 10A, 10B, 10C, and 10D further illustrate device module depictions that further describe the network configuration with components as described in FIGS. 8A, 8B, 8C, and 8D.

DETAILED DESCRIPTION

Figure 1A:
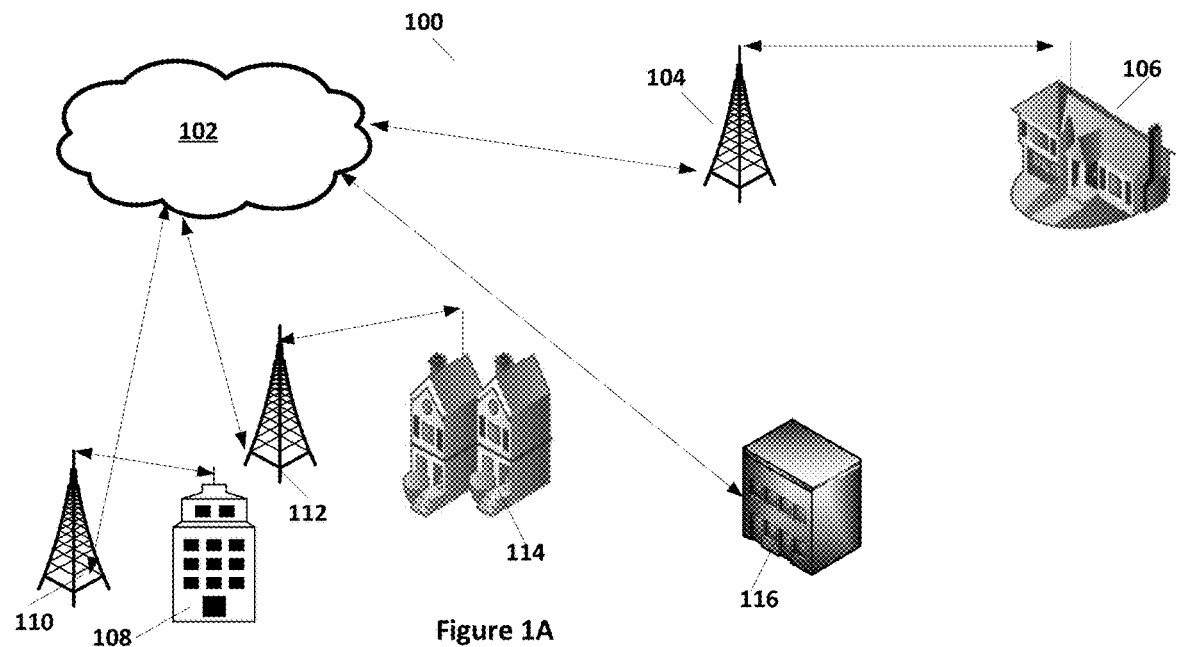
FIGS. 1A and 1B illustrate an aspect of some embodiments of the present invention.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention. Examples are provided and discussed for illustrative purposes only.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

This includes description of distributed network components according to some aspects of the present invention. In particular, descriptions of virtual base stations and user equipment functionalities in these distributed network devices can allow for dynamic expansion of the network. In some embodiments, the distributed virtual devices described herein can be utilized to help address transactive energy network connectivity, wireless broadband Internet access, internet-of-things (IoT) connectivity, and connectivity of energy network devices. Integrated Virtual BS UE Gateways, as described further below help address the Transaction Energy (TE) network connectivity, wireless broadband Internet access, and IoT connectivity. Additionally, aspects of the present disclosure address the security challenges of devices in the network. Embodiments of the present invention provide a powerful framework to enable modular, self-organized, self-healed, transactive broadband wireless mesh network systems, securely interconnecting millions of connected IoT devices, including energy supply and demand endpoints, to support Transactive Energy services, fixed wireless broadband Internet access services, and Transactive Communications services.

The embodiments of the present disclosure described below describe a Radio-Based access network architecture. The dynamic network devices disclosed here provide processes, systems, methods, algorithms, and designs for constructing a network of intelligent gateways. The network wirelessly formed with embodiments of devices according to this disclosure can form a wireless broadband access network to interconnect millions of connected devices including IoT devices, energy network devices including energy supply and demand endpoints such as power meters, roaming energy network devices such as electric vehicle charges. These devices support Transactive Energy network services or Transactive Communication (TC) network services. Further, such a network can provide security for end-user IoT and other devices, Transactive Energy (TE) network services, Transactive Communication (TC) network services, and other services without expanding or constructing a separate radio base station network.

Some embodiments according to this disclosure provide for network devices, processes, systems, methods, algorithms and protocols to address many of the issues discussed above. In particular, embodiments of the present disclosure can provide a drastically simplified, high-performance distributed radio system that is consistent with radio networks such as, for example, the 5G NR network architecture. Such devices can be used to enable a fixed wireless broadband communications infrastructure to interconnect potentially millions of multi-Gbps access endpoints securely and reliably without wired networking or providing further infrastructure in a Radio-Based network.

Some embodiments according to this disclosure provide for a self-organized, self-healing network. Such capabilities support secure fault tolerant connectivity between connected endpoints. The mesh network according to some embodiments is dynamically configured into subnets, each with specific performance parameters, serving a particular user-specific need at a specific time. The subnet performance parameters are modified as the service needs are changed.

In addition, embodiments according to this disclosure provide for security for devices connected in the network. Some aspects of the present invention utilize a Blockchain technology-based security screen with identity management as recommended in Tom.Lyons, Ludovic.Courcelas, and Ken.Timsit, "Blockchain and Digital Identity: A thematic report prepared by The European Union Blockchain Observatory and Forum," v1.0, The European Union Blockchain Observatory and Forum, May 2019, [retrieved from www.eublockchainforum.eu on Sep. 11, 2020], and Known Communicators Network (KCN) registry. Such a security screen allows for security of all connected devices to help address the exploding complexity of the IoT and other devices. The proliferation of these devices raises security issues for the entire network. Further, Blockchain technology can provide irrefutable transaction contract ledgers wherever needed, as is further described below.

Consequently, in some embodiments a secure store and Blockchain framework that identifies and secures all connected devices is implemented. Such a security system can include smart energy consuming endpoint devices, entertainment and communication equipment, and other smart connected IoT devices that are part of the communications network. Some embodiments provide the capabilities to intelligently identify and captures all legitimate endpoints that communicates with the device being secured with the Known Communicators Network (KCN) registry. Some embodiments provide for multiple subnets independently and secure from each other. Depending on the Quality-of-Service (QoS) requested, some subnets can be dedicated and non-blocking while other subnets may share resources. Embodiments may detect new subnets owned by different users dynamically and secure all connected devices connected to each of the independent subnets.

In some embodiments a smart device predictive profile is created and maintained as part of the KCN registry for each of the connected devices. Communication activities are collected, summarized and stored in the smart predictive profile for each of the connected device. These profiles are abstracted and collected over time in distributed units and centralized units. Machine Learning can be employed to analyze the collected communication activities to characterize the communication profile of each connected device, to assess the security risks of communication activities, and to predict future legitimate communication activities expected from specific connected device.

The Blockchain security framework can provide irrefutable transaction contract ledger capabilities for various types of transactions between end-point users and service provider entities. For example, the transaction contract ledger can facilitate Power Purchase Agreements (PPA) and Transactive Energy (TE) transactions between potentially millions of energy demand endpoint devices and multiple fast-growing renewable energy producers. It also provides irrefutable transaction contract ledger for Transactive Communications (TC) services. Further, such transaction ledgers can be used to arrange bandwidth arrangements to end point users or gateways.

Embodiments of networks according to this disclosure provide for an architecture framework to construct logically self-contained network of Device Module (DM)s and to interconnect and manage multiple DM's into powerful coherent network products rapidly. These DM's may be logical or physical entities incorporated into various networked components. In some examples, multiple DM's can be integrated on the same platform (e.g., a single PCB board, computer system, or other device) which can be locally attached to a core system or network device. In some embodiments, DM's can be distributed remotely across several network devices to form virtual DMs that can be managed as an integral part of the resulting system and operated virtually on one or more networked devices.

These DM's can be specialized to offload cloud-based processing, such as speech recognition. In so doing unparalleled privacy can be provided to a user using voice assistance services such as Google home and Amazon Alexa. Where all the speech recognition and processing are done and controlled locally in a DM on a home gateway, the process can be kept private.

Another potential application is to have a specialized storage DM to store and captured videos from home security cameras locally controlled as part of the home gateway and remotely accessed from a cloud application. This arrangement not only provides a level of privacy not available currently to the user and also eliminates the Internet access bandwidth needed to stream captured video from the camera to the cloud and the storage needed in the cloud to store the captured video. This may translate to monthly subscription savings for the user. Furthermore, large database end users may perform processing on the data locally, reducing data transmission costs.

The Integrated Virtual BS UE Gateways architecture according to some embodiments of this disclosure is a collection of DMs. As discussed above, the DMs refer to methods, algorithms, protocols and systems that operate on various network devices to integrate the network system described here. These DMs, therefore, are designed to integrate Radio Units (RU), Distributed Units (DU), and Centralized Units (CU), into a UE gateway.

In some embodiments, and used as an example below, examples are provided that are consistent with the 5G NR access network reference architecture. DMs can be provided that are consistent with other network protocols as well, for example the 2G/3G/4G LTE network or other wireless networks.

As is further described below, these Integrated UE Gateways form self-organized, self-healed, dynamic access networks to support sophisticated Energy Network services along with fixed wireless broadband Internet access services. All accomplished without addition to the traditional physical radio base station network infrastructures. Such systems accelerate the deployment of secure energy and communications infrastructures to previously difficult to reach rural and urban locations worldwide rapidly and cost effectively. Further, such systems also enable rapid availability of high bandwidth (100 Mbps or higher) alternatives to millions of existing Internet users currently operating with sub-optimal access speed in developed countries such as the USA or underdeveloped countries.

The Virtual BS UE Gateway network devices described below provides broadband Internet access network services without the burden of building additional traditional radio base station network infrastructure. Such an arrangement allows for easy expansion of networks to accommodate further subscribers in a secured network.

The following terms and definitions defined in Table I are used in this disclosure.

TABLE I

Terms and Definitions

| Term | Definition |
| --- | --- |
| Communications Purchase Agreement | A communications purchase agreement (CPA), or a communications transmission agreement, is a contract between two parties, one which provides the communications transmission service (the seller) and one which is looking to purchase the communications transmission service (the buyer) |
| Fixed Wireless broadband | Fixed Wireless Broadband is a telecommunications technology that provides high-speed wireless Internet access or computer networking access to fixed locations over a wide area. |
| Power Purchase Agreement | A power purchase agreement (PPA), or electricity power agreement, is a contract between two parties, one which generates electricity (the seller) and one which is looking to purchase electricity (the buyer) |
| Transactive Communications | Similar to Transactive Energy, Transactive Communications is a system of economic and control mechanisms that allow the dynamic balance of supply and demand across the entire communications infrastructure using value as a key operational parameter. |
| Transactive Energy | "A system of economic and control mechanisms that allows the dynamic balance of supply and demand across the entire electrical infrastructure using value as a key operational parameter." (U.S. Department of Energy, NIST) |
| Voice Assistant | Voice Assistant uses speech recognition to understand spoken commands and answer questions, and typically text to speech to play a reply. |

The following abbreviations and acronyms illustrated in Table II may be used in this disclosure.

TABLE II

Abbreviations and Acronyms

| Abb. Acronym | Definition |
| --- | --- |
| AFHSS | Adaptive Frequency Hoping Spread Spectrum |
| AMI | Advanced Meter Infrastructure |
| AR | Augmented Reality |
| BAD | Behavioral Anomaly Detection |
| BER | Bit Error Rate |
| BS | Base Station |
| BW | Bandwidth |
| CPE | Customer-Premises Equipment |
| CU | Centralized Unit |
| DDoS | Distributed Denial of Services |
| DFE | Digital Front End |
| DM | Device Module |
| DSI | Distributed Secure Instant communication |
| DU | Distributed Unit |
| DVDM | Distributed Virtual Device Module |
| EN | Energy Node |
| EP | Energy Producer network edge device |
| EV | Electric Vehicle |
| FSK | Frequency Shift Keying |
| FWA | Fixed Wireless Access |
| FWMA | Fixed Wireless Mesh broadband Access |
| GW | Gateway |
| HD | High Definition |
| HG | Home Gateway |
| ICS | Industrial Control System |
| IDW | Integrated Dynamic Wireless |
| IEA | International Energy Agency |
| IoC | Indicators of Compromise |
| IoT | Internet of Things |
| IMC | Instant Mesh Client |
| IMG | Instant Mesh Gateway |
| IMR | Instant Mesh Router |
| IMCU | Instant! Mesh Centralized Unit |
| IMDU | Instant! Mesh Distributed Unit |
| IMRU | Instant Mesh Radio Unit |
| IPR | Intellectual Property Rights |
| iRoE | Instant radio over RoE |

TABLE II-continued

Abbreviations and Acronyms

| Abb. Acronym | Definition |
| --- | --- |
| KYC | Know Your Customers |
| KCN | Known Communicators Network |
| kWh | Kilo Watt Hour |
| LAN | Local Area Network |
| MAC | Media Access Control |
| MCU | Mesh Centralized Unit |
| MD | Memory Device |
| MDU | Mesh Distributed Unit |
| MEC | Multi-access Edge Computing |
| MRU | Mesh Radio Unit |
| Mtoe | Million tones of oil equivalent |
| MU-MIMO | Multi-User, Multiple Input, Multiple Output |
| NIST | National Institute of Standards and Technology |
| NW | Network |
| OCF | Open Communications Foundation |
| OpenADR | Open Automated Demand Response |
| P2P | Point-to-Point |
| P2MP | Point-to-Multipoint |
| PDCP | Packet Data Converging Protocol |
| PHY | Physical Layer |
| PM | Power Meter |
| PoC | Proof of Concept |
| PPA | Power Purchase Agreement |
| QoS | Quality of Service |
| RAN | Radio Access Network |
| RBS | Radio Base Station |
| RLC | Radio Link Control |
| ROE | Radio over Ethernet |
| RRC | Radio Resource Control |
| RRM | Radio Resource Management |
| RU | Radio Unit |
| SDR | Software Defined Radio |
| SFWA | Secured Fixed Wireless Access |
| VSDM | Virtual Super Device Module |
| TC | Transactive Communications |
| TE | Transactive Energy |
| UE | User Equipment |
| UI | User Interface |
| UN | United Nations |
| USPTO | United States Patent and Trademark Office |
| VR | Virtual Reality |
| VSPM | Virtual Super Secure Power Meter |
| WAN | Wide Area Network |

The disclosure below refers to network devices with particular functionality. It is understood that, in accordance with embodiments of the present invention, multiple functionalities may be integrated within a single physical platform or may be distributed across multiple platforms and either virtually or physically interconnected. In particular, the logical radio BS network functionality is distributed across Radio Units (RUs), Distributed Units (DUs), and Centralized Units (CUs) entities consistent with and compatible to the 5G Open radio-access network (RAN) architecture, for example. At a high level, the RU handles the digital front end and the parts of the physical layer, for example digital beamforming. In particular, a RU transmits and receives network traffic using radio. A DU usually sits close to the RU and handles real-time scheduling for data traffic amongst other tasks. A CU connects to the Internet services and manages and consolidates the traffic from a cluster of DUs. A logical Radio BS is assembled by connecting a CU, a DU, and an RU together. A logical User Equipment (UE) gateway connects all user connected devices, such as IoT and ICS devices, and provides a common access point funneling user communication traffic upstream to and downstream from the Internet. In accordance with some embodiments, an integrated BS UE gateway implements a logical Radio BS and a logical UE in the same gateway equipment. Gateways can also interact with other gateways.

As is further discussed below, network components exchange data via data packets. The structure of the data packets, as well as how the network modulates the packets into radio signals, is determined by the particular standard that the network implements (e.g., the 5G new radio (NR) standard). The structure of the packets and the modulations used to physically transmit packets between devices is standard dependent and one skilled in the art will know to consult particular standards for that description.

FIG. 1A illustrates a conventional network 100 that includes a radio-based component. Network 100 as illustrated in FIG. 1A provides internet connectivity from internet 102. Some subscribers, such as user equipment (UE) 116 installed within a structure, may be physically connected to an internet node 102, for example with hard wires, optical links, combination of hard and optical links. However, several radio network base stations (BSs) may also be used in point-to-point (P2P) or point-to-multipoint (P2MP) communications with UEs. In FIG. 1A, for example, radio base station 110, which has a radio unit (RU), is coupled between internet 102 and UE 108; radio base station 112 is coupled between internet 102 and UE 114; and radio base station 104 is coupled between internet 102 and UE 106. However, this provides for a rigid structure that is difficult to expand and upgrade.

Figure 1B:
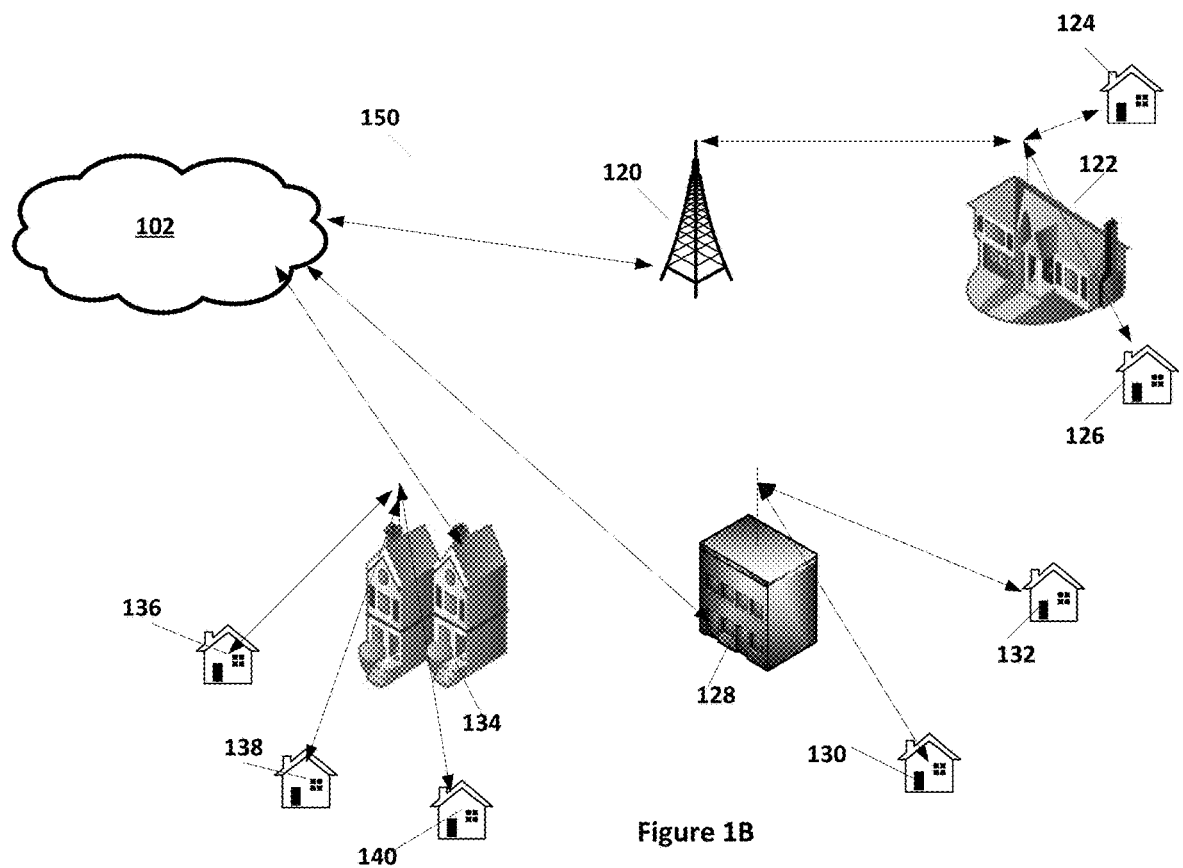

FIG. 1B illustrates a network 150 according to some embodiments of the present invention. Network 150 demonstrates a virtual radio BS network with on-demand P2P connections. As is illustrated in FIG. 1B, UE 134 and UE 128 are coupled directly to internet services 102 without a RU BS. However, UE 134 and UE 128 execute a virtual network with a UE gateway (GW) to which other UE gateways can be connected. UE gateways 136, 138, and 140 are connected to UE gateway 134, for example. UE gateway 130 and 132 are connected to UE gateway 128 that executes a virtual radio network. There is still available for a RU BS. As illustrated in FIG. 1B, RU BS 120 provides network services to UE 122. As is further illustrated, UE 122 can execute a virtual BS with home GW to which UEs 124 and 126 can be connected. Several layers of connectivity can be implemented so that network 150 can continue to grow dynamically.

The implementation of network 150 can eliminate, or supplement, the traditional BS based network. As such, it may reduce the time to market and reduce the costs of deploying a network. As illustrated in the deployment of network 150 illustrated in FIG. 1B, embodiments of the present disclosure can virtualize the radio BS network and integrate the BS with a UE GWs to provide a mesh network to extend the reach of network 150 in a dynamic way. A single radio can be used for UE uplink, while virtual RU uplinks and virtual RU downlinks can be used to serve neighboring UEs.

Further, common (>6 dBi MIMO) antenna systems can serve as endpoints (in FIG. 1B, these are, for example, UEs 130 and 132, UEs 136, 138, 140, or UEs 124 and 126). The radios can be driven with different output power for point-to-point (P2P) and point-to-multipoint (P2MP) operations when necessary. Radio modules may be added to enhance capacity. For example, in the 5G new radio regime, unlicensed-national information infrastructure (U-NII) antennas may be used. U-NII-1 and U-NII-3 spectra (Max Effective Isotropic Radiated Power (EIRP)<53 dBm) for P2P connections in remote endpoints and UNII-3 and UNII-7 spectrum (Max EIRP=36 dBm) for P2MP connections to all other endpoints may be used. U-NII standards are set by the standard IEEE 802.11a are defined in Table III below.

TABLE III

IEEE 802.11a U-NII antennas

| Band | Freq. Range (GHz) | Bandwidth (MHz) | Max. Power | Max. EIRP |
|---|---|---|---|---|
| U-NII Low/U-NII-1/ U-NII Indoor | 5.150-5.250 | 100 | 50 mW | 200 mW |
| U-NII Mid/U-NII-2A | 5.250-5.350 | 100 | 250 mW | 1 W |
| U-NII-2B | 5.350-5.470 | 120 | — | — |
| U-NII Wordwide/ U-NII-2C/U-NII Extended/U-NII-2e | 5.470-5.725 | 255 | 250 mW | 1 W |
| U-NII Upper/U-NII-3 | 5.725-5.850 | 125 | 1 W | 200 W |
| DSRC/.ITS/U-NII-4 | 5.850-5.925 | 75 | | |
| U-NII-5 | 5.925-6.425 | 500 | | |
| U-NII-6 | 6.425-6.525 | 100 | | |
| U-NII-7 | 6.525-6.875 | 350 | | |
| U-NII-8 | 6.875-7.125 | 250 | | |

Figure 2A:
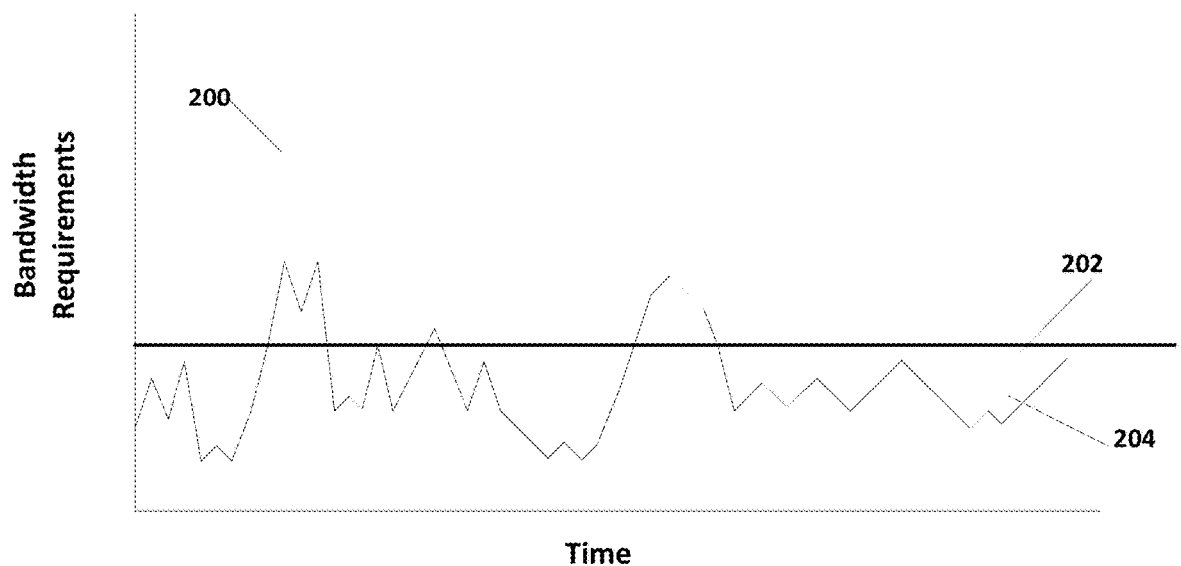
FIGS. 2A and 2B illustrate another aspect of some embodiments of the present invention.
Figure 2B:
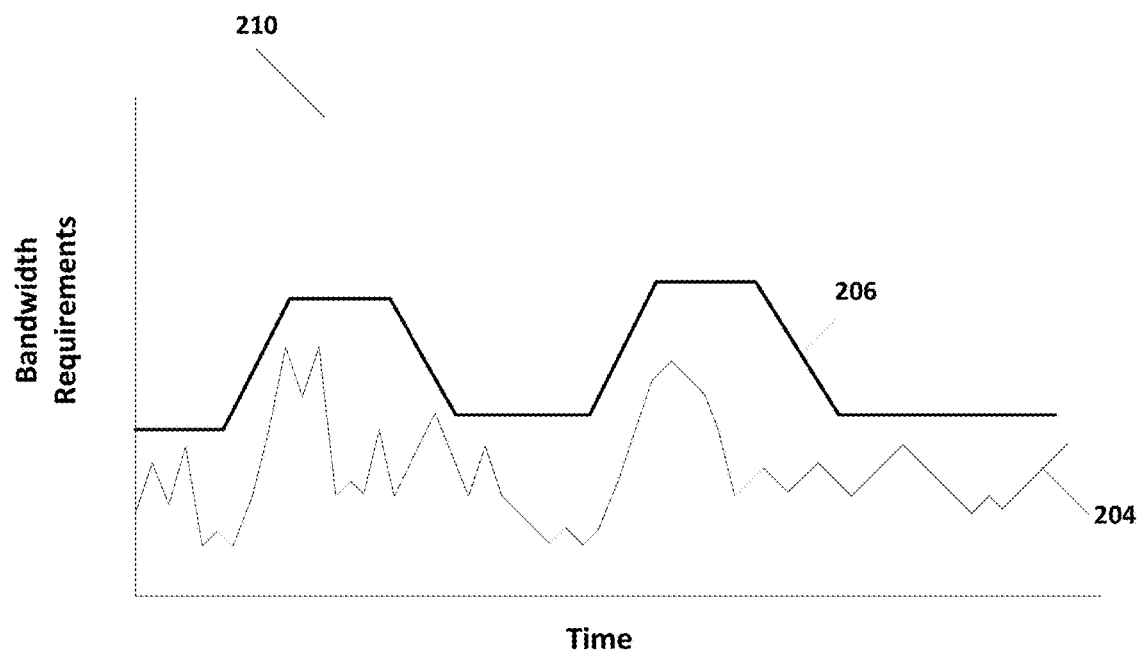

FIGS. 2A and 2B illustrate another aspect of the present invention. As illustrated in FIG. 2A, in network 100 as illustrated in FIG. 1A, each UE has a fixed bandwidth subscription. FIG. 2A illustrates a graph 200 of bandwidth requirements versus time for a typical end user. FIG. 2A further illustrates a bandwidth usage 204 in comparison with a fixed bandwidth limit 202. Broadband internet services are typically priced based on fixed bandwidth 202. The user cannot exceed fixed bandwidth 202 and, if reached, streaming and other services may be negatively affected. Alternatively, if the user does not use the fixed bandwidth 202, the user is paying for bandwidth that they are not using.

This type of pricing and billing structure used in current broadband internet services is neither fair to the consumers nor desirable for network operators. As illustrated in FIG. 2A, for the majority of times, the consumer only uses a fraction of the maximum bandwidth to which they have subscribed. At other times, the user applications (e.g. AR/VR video streaming) requires bandwidths higher than the maximum bandwidth 202 of the subscription, resulting in poor application performance. From the network operator's perspective, the maximum bandwidth-based pricing requires that the network capacity be built to ensure that network 100 can deliver enough bandwidth capacity to handle peak demand periods as defined by the subscription services. This results in a majority of times where network 100 is overbuilt and the network 100 is left idled. Further, there are no obvious tools available to the network operator to encourage consumers to shift network usage to off-peak demand periods.

In the energy industry, electricity services are typically priced on the amount of electricity (watt-hrs.) that are typically used. There may also be time-of-day pricing so that the price of the electricity is modified as to when it is actually used. This type of pricing, variable billing based on usage as well as peak-power-demand leveling, can be used in the internet bandwidth area as well.

FIG. 2B illustrates a graph 210 of bandwidth 204 as billed according to some embodiments according to this disclosure. In particular, bandwidth can be supplied, as well as billed, according to user actual usage rather than a fixed bandwidth 202. Further, operators can provide billing to enable peak demand leveling to minimizes the need to overbuild network capacity. Operators, therefore, can provide bandwidth 206 in accordance with a user demand (and bill accordingly).

Consequently, as illustrated in FIGS. 1B and 2B, a dynamic mesh transactive communications network is presented that includes one or more gateways, each gateway configured to couple with one or more other gateways over a radio link; one or more mesh distributed units coupled to at least one of the one or more gateways through radio links; and a mesh centralized unit coupled through radio links to the one or more mesh distributed units, the mesh centralized unit coupled to a upstream cloud network. The network can include dynamic transactive communications per-user subnets, each of the subnets configured with one or more connections each with specific performance parameters according to a user's specific needs. The network may further be formed where a link between each of the one or more gateways and the dynamic mesh transactive communications network is self-organized and self-healing against link faults. In some embodiments, the network is self-optimized.

Figure 3A:
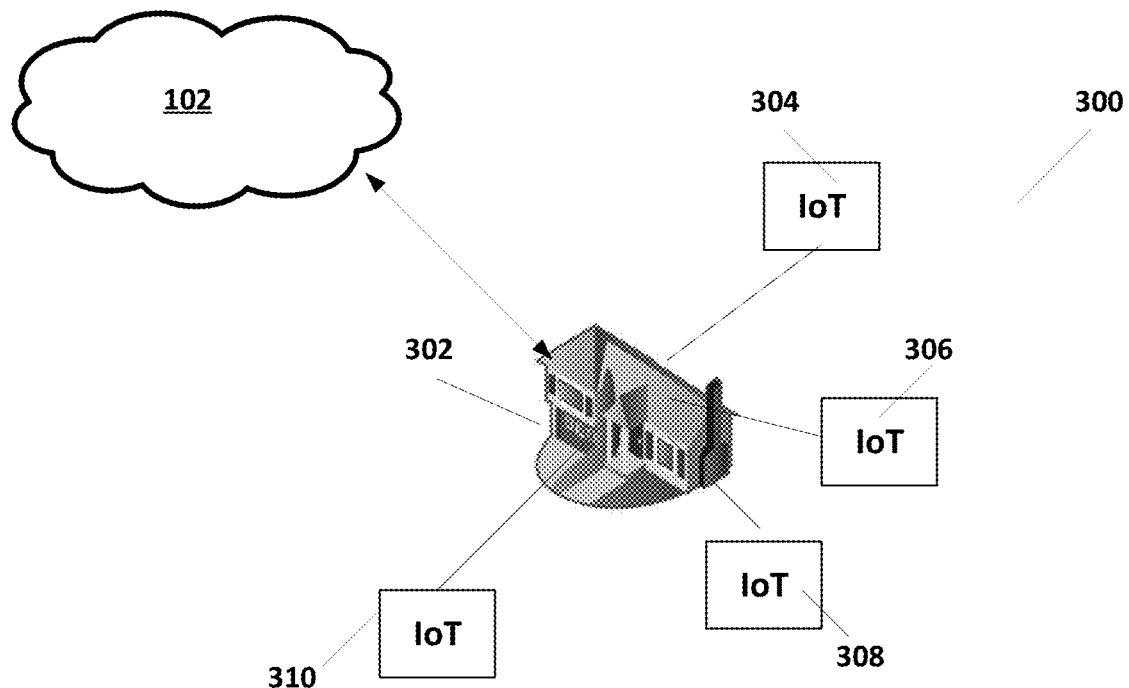
FIGS. 3A and 3B illustrate another aspect of some embodiments of the present invention.
Figure 3B:
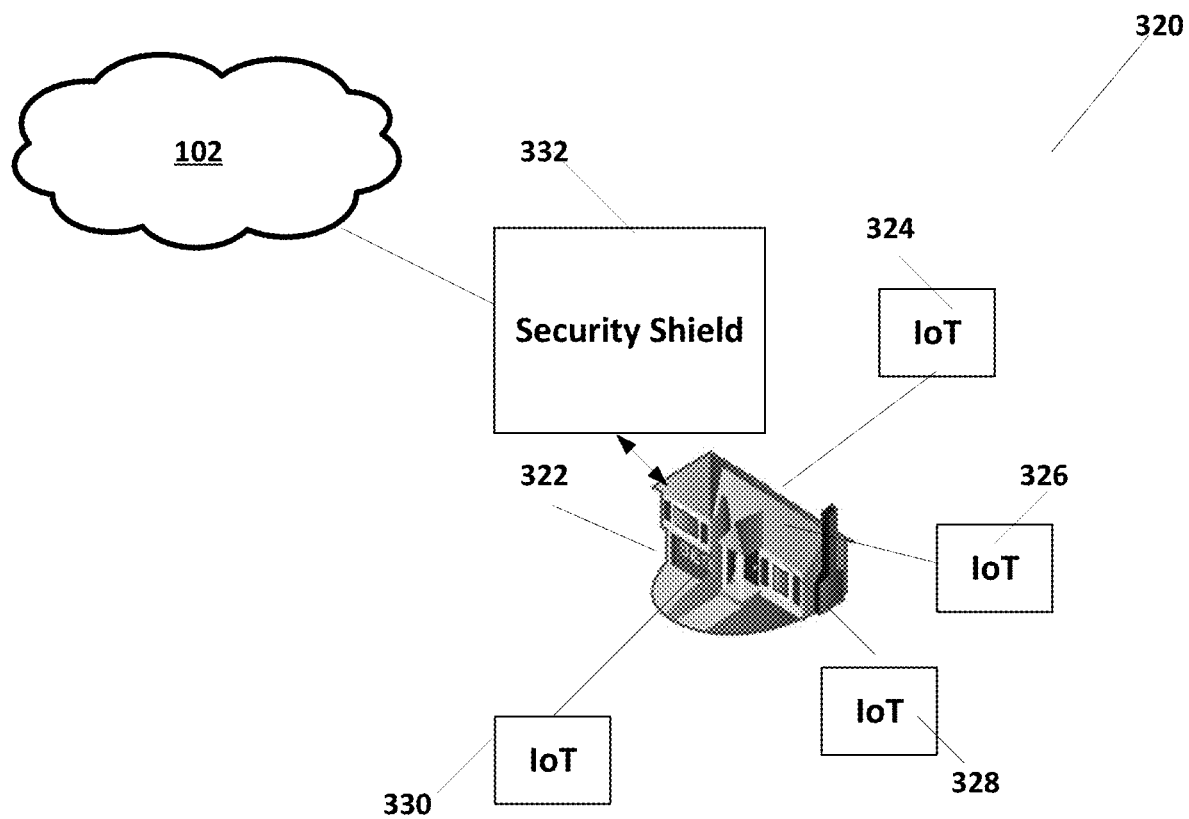

FIGS. 3A and 3B illustrates another aspect of the present invention. More and more cost-sensitive devices are being deployed. Such devices include any device that includes internet connectivity and exchange data or receive instructions from an internet service in cloud services 102. As is used in this disclosure, several end-point devices can be connected to the network. These devices may be referred to as user equipment devices (smart phones, laptops, computers), IoT devices (cameras, thermostats, smart example IP cameras, smart thermostats, smart TVs, smart refrigerators, or any other device that exchanges information with internet-based services), energy network devices (power meters or other devices that monitor or control energy usage), or roaming energy network devices (electric vehicle charging systems and other such devices). Consequently, in this disclosure an end-point device refers to any device that communicates with an internet-based service through the network.

FIG. 3A illustrates a current typical IoT device environment 300. As illustrated in FIG. 3A, a gateway (GW) 302 is connected to the internet 102. IoT devices 304, 306, 308, and 310 are coupled through GW 302 to internet 102. Such an arrangement as illustrated in FIG. 3A provides a complex IoT security threat landscape. The current "seek out and fix all the bad actors" approach is proving ineffective to protect cost-sensitive connected IoT devices from being infiltrated.

FIG. 3B illustrates an arrangement 320 according to some embodiments. As illustrated in FIG. 3B, IoT devices 324, 326, 328, and 330. As illustrated in FIG. 3B, a security shield 332 is implemented on the home gateway 322. Security shield 332 may implement a blockchain security protocol. Such a protocol can provide device identities, contract ledgers, and a communications network lockdown. This provides security protection for vulnerable IoT devices and locks the communications network down to minimize the hackable footprint.

The system illustrated in FIG. 3B implementing a security shield 332 according to some embodiments can be focused on securing vulnerable IoT devices such as IoT devices 324, 326, 328, and 330 illustrated in FIG. 3B. Providing a blockchain security shield in addition to standard security practices between each protected IoT device and the internet 102 can providing unique identities to each of the connected devices. Further, security shield 332 can track activity of the device by creating a Known Communicators Networks (KCN) registry for each device and raise alarm when an unknown entity (e.g. a hacker) is trying to communicate with the device or the device is trying to communicate with an unknown entity (e.g. a distributed denial of service (DDoS) victim). As part of the KCN registry, a smart predictive device profile can be included for each of the protected devices. Further, security shield 332 can provide a contract ledger to enable consumers to purchase and track services (e.g. buying a movie stream, buying electricity for charging a car) with protected devices.

Figure 4A:
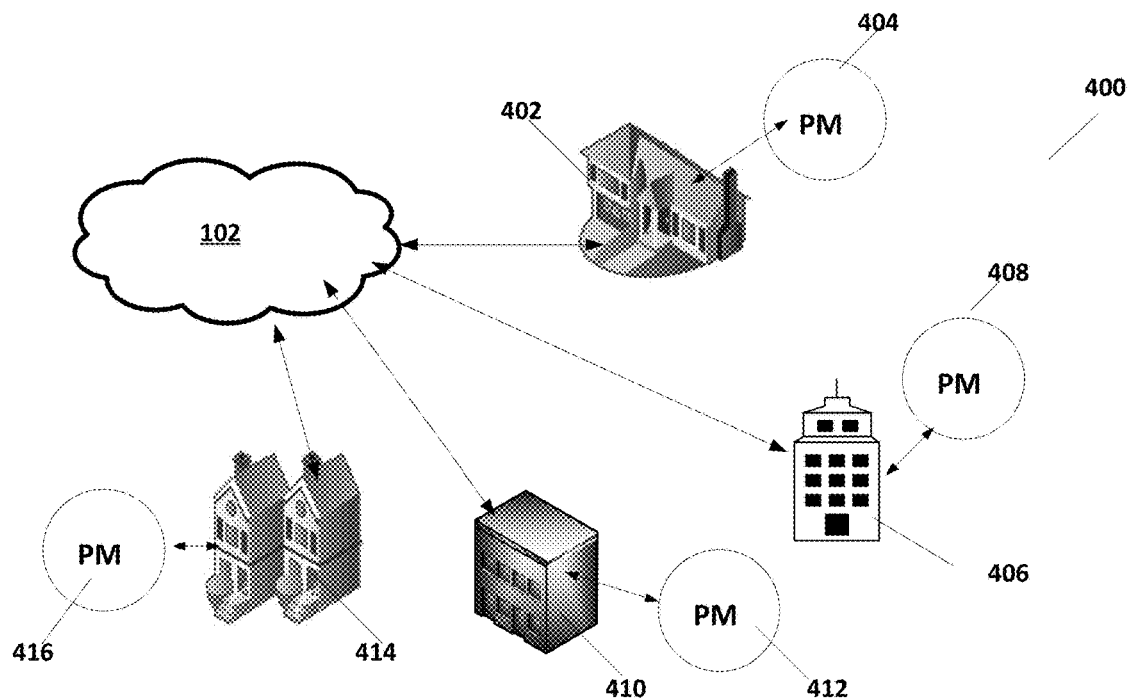
FIGS. 4A and 4B illustrate another aspect of some embodiments of the present invention.

In addition to the issues involving IoT devices as illustrated in FIG. 3B, another aspect of the present disclosure is enhancing and securing the interface of other types of end-point devices, including smart power meters, to internet 102. As part of the smart grid evolution effort, the power industry has spent billions of dollars creating an Advanced Meter Infrastructure (AMI). As part of the AMI, a large portion of electrical meters have been upgraded to smart meters. FIG. 4A illustrates the present smart power meter network 400. As illustrated in FIG. 4A, subscribers 402, 406, 410, and 414 each have smart power meters 404, 408, 412, and 416, respectively, that are coupled to the internet 102. However, not all of the smart power meters 404, 408, 412, and 416 have the same capability. Some power meters come with fixed capabilities that cannot be upgraded. Some meters include restrictive processing power and support only limited feature sets. Many other meters do not have adequate security protections. These different in capabilities in smart power meters makes the management and security of these meters very challenging.

Figure 4B:
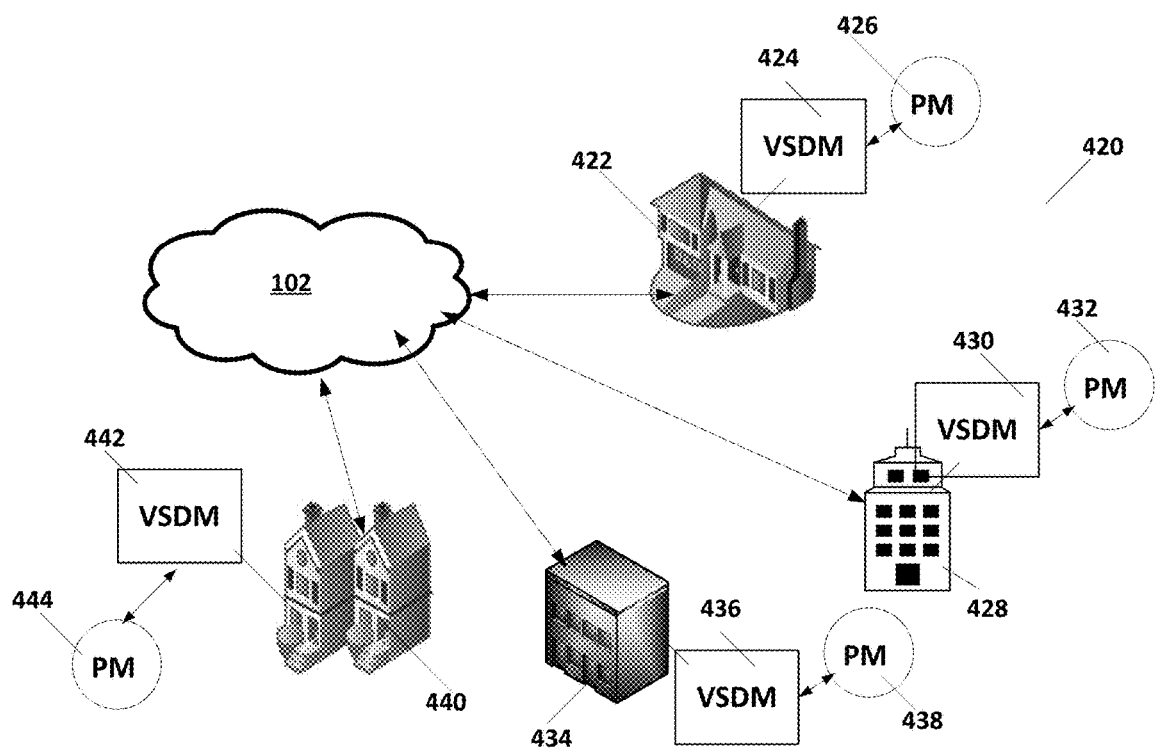

FIG. 4B illustrates a smart meter network 420 according to some embodiments of this disclosure. In accordance with some embodiments, each power meter is coupled to a Virtual Super Device Module (VSDM), which implements a Virtual Super Secure Power Meter (VSPM). As illustrated in FIG. 4B, the home gateway on subscriber 422 is coupled through VSDM 424 to a power meter 426; the gateway on subscriber 428 is coupled through VSDM 430 to power meter 432; the gateway on subscriber 434 is coupled through VSDM 436 to power meter 438; and the gateway on subscriber 440 is coupled through VSDM 442 to power meter 444. Each of VSDMs 424, 430, 436, or 442 can be implemented as a VSPM with power meters. VSDMs can provide the security and management support for devices such as power meters 426, 432, 438, and 444 as illustrated in FIG. 4B. In particular, the VSDMs can be used to create VSPM twins in the home gateway to supplement and upgrade all connected electric meters to provide many of the important smart meter features such as, for example, a Security Shield as discussed above, over-the-air software upgrades, or local processing of meter data. These VSPM digital twins provide a uniform view for all protected power meters in network 420, simplifying the management, protection, and upgrade of those power meters regardless of the capabilities of the individual power meter. Consequently, the need to physically upgrade the existing power meters is minimized.

Figure 5:
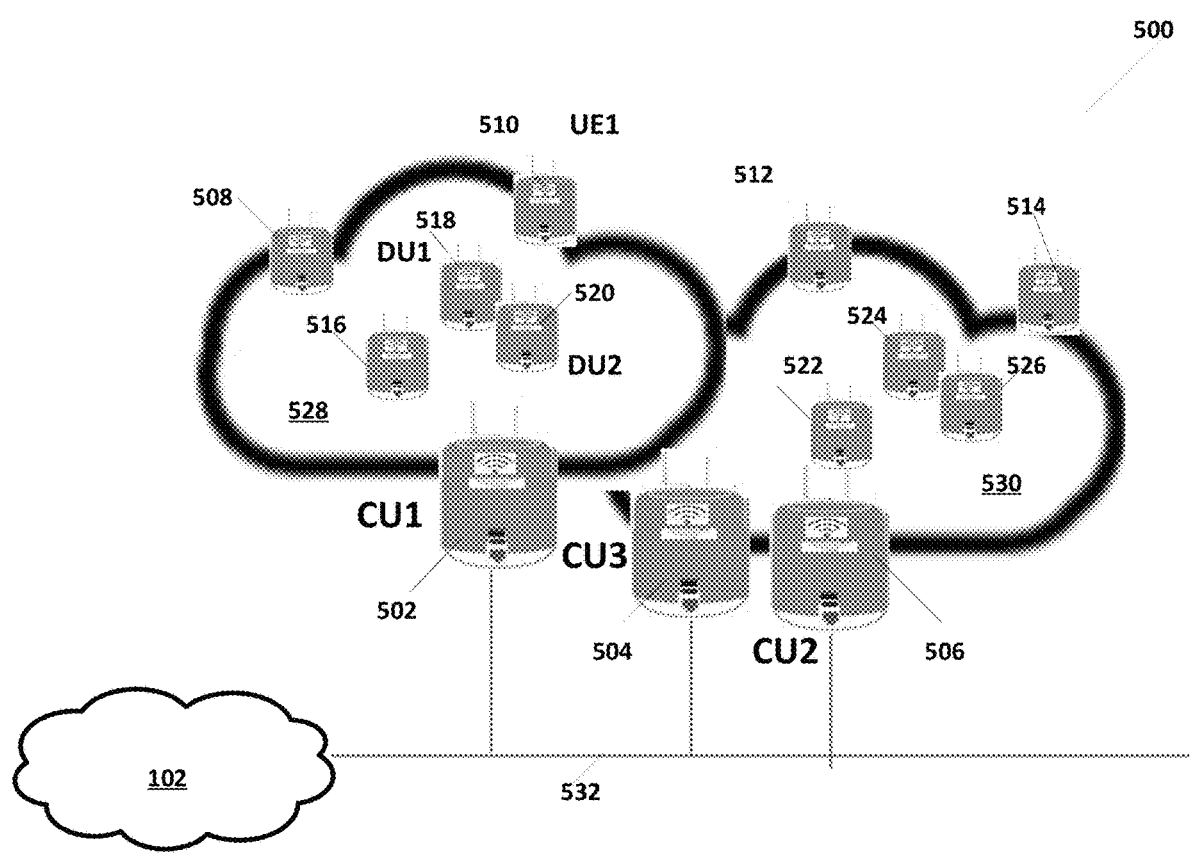
FIG. 5 illustrates another depiction of network as illustrated above with respect to FIGS. 1B, 2B, 3B, and 4B.

FIG. 5 illustrates a depiction of a cluster network 500 according to some embodiments. As illustrated in FIG. 5, distributed virtual device modules (DVDMs) CU1 502, CU2 506, and CU3 504 are coupled to internet 102 through a backbone 532, which for example may be an optical fiber network, a radio network, a wired network (e.g., twisted wire or coax), a satellite network, or a combination of these networks. DVDMs CU1 502, CU2 506, and CU3 504 may represent a network of various radio BS components (CUs in combination with DUs, RUs, and GWs) that are combined in independent, self-contained devices that may be geographically distributed and interacting to execute aspects of this disclosure. A DVDM, for example, can include a collection of networked GWs and other devices to extend service, may refer to a GW with DMs distributed across a particular location, or may include any other arrangement of network devices.

As is illustrated in FIG. 5, CU1 502 manages a cluster 528 that includes devices 516, 518, and 520 to service UE GWs 508 and 510. CU2 506 manages a cluster 530 that includes devices 522, 524, and 526 to service UE GWs 512 and 514. CU3 504 can service either cluster 528 or cluster 530, as needed. For example, CU1 502 with DU1 518 (which may also include a RU) forms a BS to serve UE1 510. DU2 520 and CU3 504 may be included in both cluster 528 and cluster 530. DU2 520 is part of cluster 528 and is managed by CU1 502. However, if CU1 502 fails, then CU3 504 can take over and service UE1 510 and UE 508 through DU2 520. If both CU1 502 and CU3 504 fail, then CU2 506 can take over cluster 528 through DU2 520. If CU2 506 does not have sufficient capacity, then cluster 1 528 can split, partly served by CU2 506 and the rest served by other CUs not shown in FIG. 5.

As is illustrated in FIG. 5, DVDMs 502, 504, and 506 may further be coupled to other DVDMs or GWs, which may also include DMs. As is understood, a DVDM can represent a gateway (home gateway, multi-dwelling gateway, or enterprise gateway) or a UE device. As illustrated in FIG. 5, DVDM DU1 518 is coupled to User Equipment Gateways (UE/GWs) 510 and 508 and, for example, DVDM 524 is coupled to UE/GWs 512 and 514. These devices can be further coupled to a number of UEs, IoTs, energy devices, or other end-point devices, as is further discussed below.

Consequently, as described above, network 500 represents a redundant overlapping network. This results in redundant access to internet 102 through backbone 532 and devices CU1 502, CU3 504, and CU2 506 servicing overlapping clusters 528 and 530. Further, there are redundant virtual BS radios driving in-home WiFi hotspots at each of UE/GWs 508, 510, 512, and 514.

Table IV below illustrates functionalities of an integrated BS UE gateway serving a TE network according to some embodiments. In particular, advanced antenna systems, WiFi radio, Radio Unit (RU) interface, and 10G-PON Fiber Interface are communications Device Modules. UE client, distributed unit (DU), centralized unit (CU), in-home WiFi, transitive energy (TE) network (NW) interface, Secured Fixed Wireless Access (SFWA) management, and Virtual Super Power Meter are Application Device Modules. DVDM management, mesh routing, blockchain security, and dynamic bandwidth management are System Resource Device Modules. As illustrated, DVDM CUs 502, 504, and 506 illustrated in FIG. 5 can all be constructed with Device Modules as illustrated in Table IV. The functional distribution between CU, DU, RU, and UE network entities can be consistent with the 5G Open RAN access network architecture as summarized in E. Jordan, "Open RAN 101-RU, DU, CU Why, what, how, when?," 8 Jul. 2020 [retrieved from https://www.rcrwireless.com/20200708/open_ran/open-ran-101-ru-du-cu-reader-forum on Aug. 8, 2020].

TABLE IV

Integrated Virtual BS UE TE/Gateway Functionality

| Redundant Virtual BS/UE Gateway | |
|---|---|
| 8 × 8:8 Beamforming | 8 × 8:8 Beamforming |
| MU-MIMO | MU-MIMO |
| High Gain AAS | High Gain AAS |
| WiFi 6E 8 × 8:8 radio | WiFi 6E 8 × 8:8 Radio |
| 10G-PON Fiber Interface | |

TABLE IV-continued

Integrated Virtual BS UE TE/Gateway Functionality

Gateway Applications

| | |
|---|---|
| UE Client | DU Applications |
| In-Home WiFi Hotspot | CU Applications |
| TE NW Interface | SFWA NW Management |
| SVDM | |

DSI

| | |
|---|---|
| Dynamic Virtual DM | Mesh Router |
| Blockchain Security (KCN) | Dynamic Bandwidth CU |

As is understood throughout the disclosure, an integrated BS UE gateway (virtual radio BS UE gateway, UE/GW, home gateway, Gateway, GW or other such designation) refers to an equipment that comprise of two entities: 1) a UE entity which, when present and activated, connects all connected devices such as smart entertainment devices, computers, smart phones and connected IoTs devices such as security cameras, smart thermostats, and smart power meters through a radio upstream to a virtual radio BS in a wireless access network; and 2) a virtual radio BS entity which, when present and activated, acts as a radio BS in a wireless access network, connects downstream to other integrated radio BS UE gateways. A virtual radio BS entity may contain a Radio Unit (RU), a Distributed Unit (DU), and a Central Unit (CU). In addition, an integrated BS UE gateway can refer to a home gateway device, a multi-dwelling unit gateway device, an enterprise gateway device, or a network gateway device. In some embodiments, as is discussed further below, gateway devices can provide value-added services to devices attached to the gateway device as well as providing services to downstream gateway devices that are coupled to it.

When needed, radio units, distributed units (DU), and centralized units (CU) in selected integrated BS UE gateways can be activated and configured into virtual radio BSs to form or extend fixed wireless access network rapidly without a traditional radio BS network infrastructure. Consequently, the highly redundant and dynamic network as illustrated here provides for a dynamic distributed network that can grow easily without traditional large infrastructure investments.

Figure 6A:
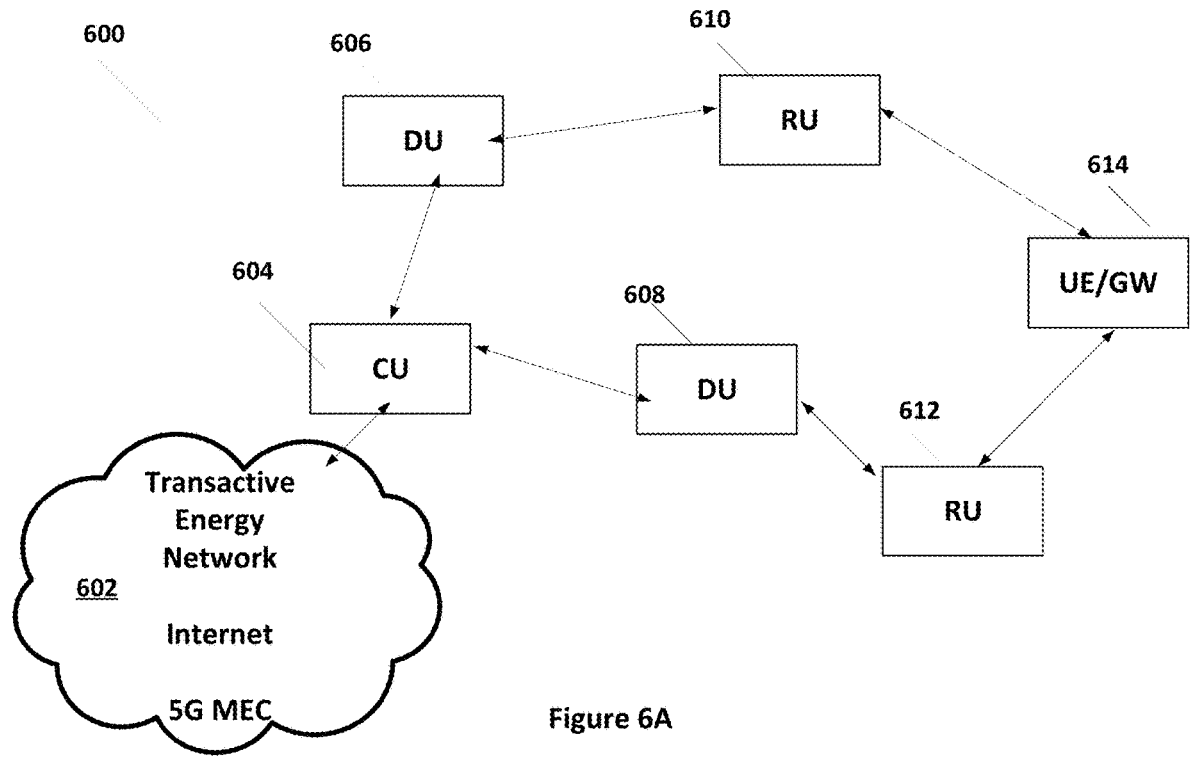
FIGS. 6A and 6B illustrates a distributed, secure radio-based network according to some embodiments.

FIG. 6A illustrates an example radio-based network 600 according to some embodiments that includes a UE gateway 614. As is illustrated in FIG. 6A, UE gateway 614 can be coupled by radio links to multiple RUs, of which RUs 610 and 612 are illustrated. RU 610 is illustrated as being connected through DU 606, which is connected to CU 604. RU 612 is connected through DU 608 to CU 604. CU 604 is coupled to administer Internet and Transactive Energy services from services 602. In some embodiments, CUs, DUs, and RUs can be co-located at one site. As is further discussed below, DMs may be distributed across GWs, RUs, DUs, and CUs to facility operation of the network.

Although there are multiple ways of splitting the networking functionality between network nodes, it is generally considered that the RU handles the digital front end and the parts of the physical layer or digital beamforming. In particular, the RU transmits and receives network traffic using radio. The DU usually sits close to the RU and handles real-time scheduling for data traffic. Operation of the DU is handled by the CU, which is an edge unit and often is located at the cloud-based data center to connect with Internet services. As discussed above, the CU can control the operation of several DUs. In a radio network, each of CU and DU can include RUs for transmission of network data.

As is understood throughout the disclosure, a UE gateway (UE, GW, UE/GW or other such designation) generally refers to a user owned and operated gateway device. Gateways refer to user-based systems that receive and transmit data through the network. In accordance with some embodiments, gateways interact with other gateways and end-point devices such as IoTs, UEs, and PMs. The gateway device can refer to a home installation gateway device, a multi-dwelling gateway device, or an enterprise gateway device. In some embodiments, as is discussed further below, gateway devices can interact with devices attached to the gateway device as well as providing service to downstream gateway devices that are coupled to it.

Figure 6B:
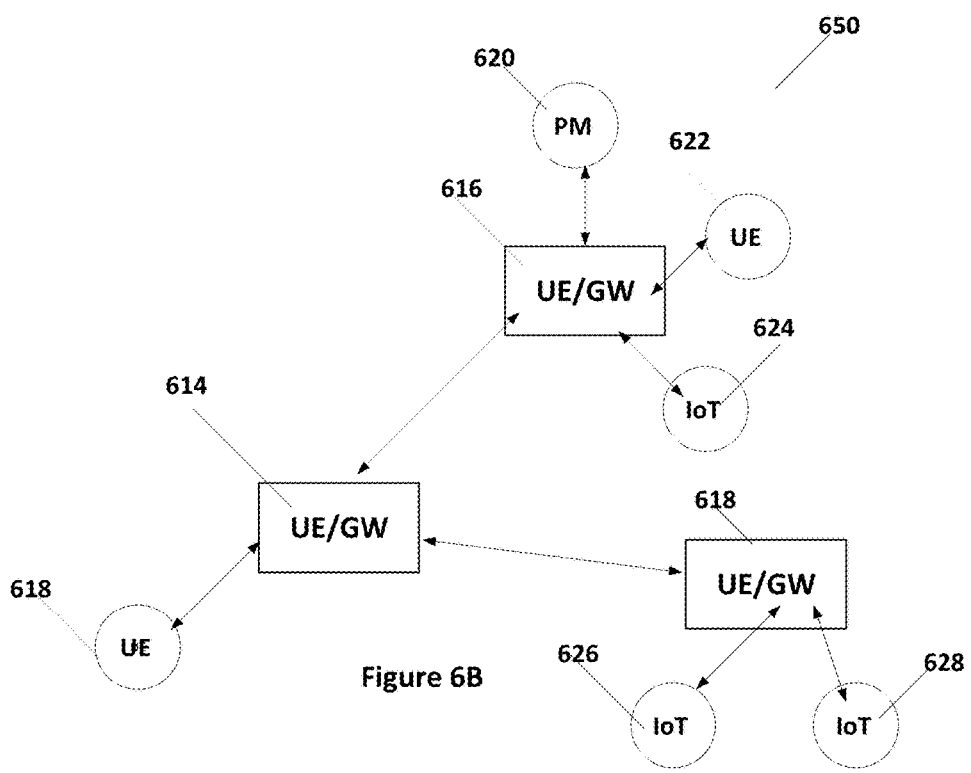

FIG. 6B illustrates a mesh network 650 that can be formed dynamically from UE/GW 614. As is illustrated in FIG. 6B, UE/GW 616 can be coupled by radio link with UE/GW 614. Also, UE/GW 618 can be coupled by radio link with UE/GW 614. Other UE/GW devices can be dynamically incorporated into network 650. Of each UE/GW, a number of devices can be coupled by wireless, radio link, or wired link to each of the UE/GWs. As illustrated in FIG. 6B, UE/GW 614 can be coupled to a UE 618. UE/GW 618 can be coupled to IoTs 626 and 628. UE/GW 616 can be coupled to a Power Meter PM 620, a UE 622, and an IoT 624. All of these devices are connected to internet services through UE/GW 614 with potentially multiple paths through CU 604 as illustrated in FIG. 6A.

As is illustrated in FIGS. 6A and 6B, virtual DMs according to aspects of the present invention can be implemented on UE/GW 614 and distributed across other network devices to perform functions as discussed in this disclosure. Integrated DMs can be included in UE/GW 614 with support from Internet services 602. In some embodiments, UE/GW 614 may implement a secured environment using a Blockchain framework. Such a system can secure all devices connected with UE/GW 614 with Known Communicators Network (KCN) registries and supports irrefutable ledgers for service contracts. The Known Communicators Network registries with smart predictive device profiles can be stored on the UE/GW devices and may further be abstracted on other upstream network devices, for example DU 606, DU 608, and CU 604.

The dynamic secure networks 600 and 650 as illustrated in FIGS. 6A and 6B can be applied in many network applications. For example, networks according to embodiments as described herein can be useful for IoT security and data security (e.g. Big Data Privacy) and is applicable to networks that use satellite communication, fiber networks, mobile cellular, fixed wireless. Further, services such as Transactive Energy or Transactive Communications can be supported through such networks.

As discussed above, one skilled in the art will recognize that data is transmitted between devices in networks 600 and 650 using data packets that are defined by the particular protocols that are being deployed in areas of the network. For example, data may be transmitted between CU 604, DUs 606 and 608, RUs 610 and 612, and UE/GW 614 using data packets as defined by the radio protocols (e.g., 5G NR). Data transmitted between a UE, IoT, or power meter PM and a UE/GW component may be governed by wireless transmission protocols, ethernet protocols, or other protocols that are in use.

In some embodiments according to this disclosure, each CU, DU, RU, and UE/GW illustrated in a radio network such as the radio networks 600 and 650 as illustrated in FIGS. 6A and 6B may be a distributed radio-based network design that supports multi-Gigabit per second data rate with self-organized, self-healed mesh network techniques. Like traditional mesh networks, each radio network node (CU, DU, RU, or UE/GW) assumes distinct mesh gateway, mesh router, and mesh client roles. However, as discussed further below, unlike traditional mesh networks, the network topology can be dynamically reconfigured to create mesh subnets that achieve specific communications bandwidth and other performance characteristics. These reconfigurations can be based on transactive communications connection agreements between service providers and the end users. These mesh subnets, that include one or more transactive communications connections, may dynamically expand and contract, effectively delivering the communications bandwidth with the specific performance to where and when each of the mesh client requires for a period of time specified in the transaction agreement.

As is further discussed below, Blockchain security may be instituted with a Known Communicators Network (KCN) registry, kept in a secure store, can identify and secure all connected devices. These connected devices can include smart energy device endpoints (PMs), entertainment and communications equipment, and smart IoT devices. The Blockchain-based contract ledger capability facilitates three-way secure Power Purchase Agreement contracts between an energy producer endpoint and energy demand endpoint devices, such as an Electric Vehicle (EV) charger and a HVAC air conditioner, via a Transactive Energy network. The same capabilities also enable other secure transaction contracts between interested parties such as communications service providers and communications services consuming devices such as a 4K TV streaming 4K video, or a high-performance gaming PC running an AR network game, or a security camera uploading collected video footage, via a Transactive Communications network.

A Distributed Virtual Device Module (DVDM) architecture framework implemented across all of the network nodes (CUs, DUs, RUs, and gateways) facilitates the interconnection and management of multiple self-contained Device Modules into powerful coherent products rapidly. These DM's may be logical or physical entities. They can be software only DM's, DM's with integrated software and hardware components, DM's integrated on the same PCB board, DM's locally attached to a core system or DM's distributed remotely but managed as an integral part of a product system.

Figure 7:
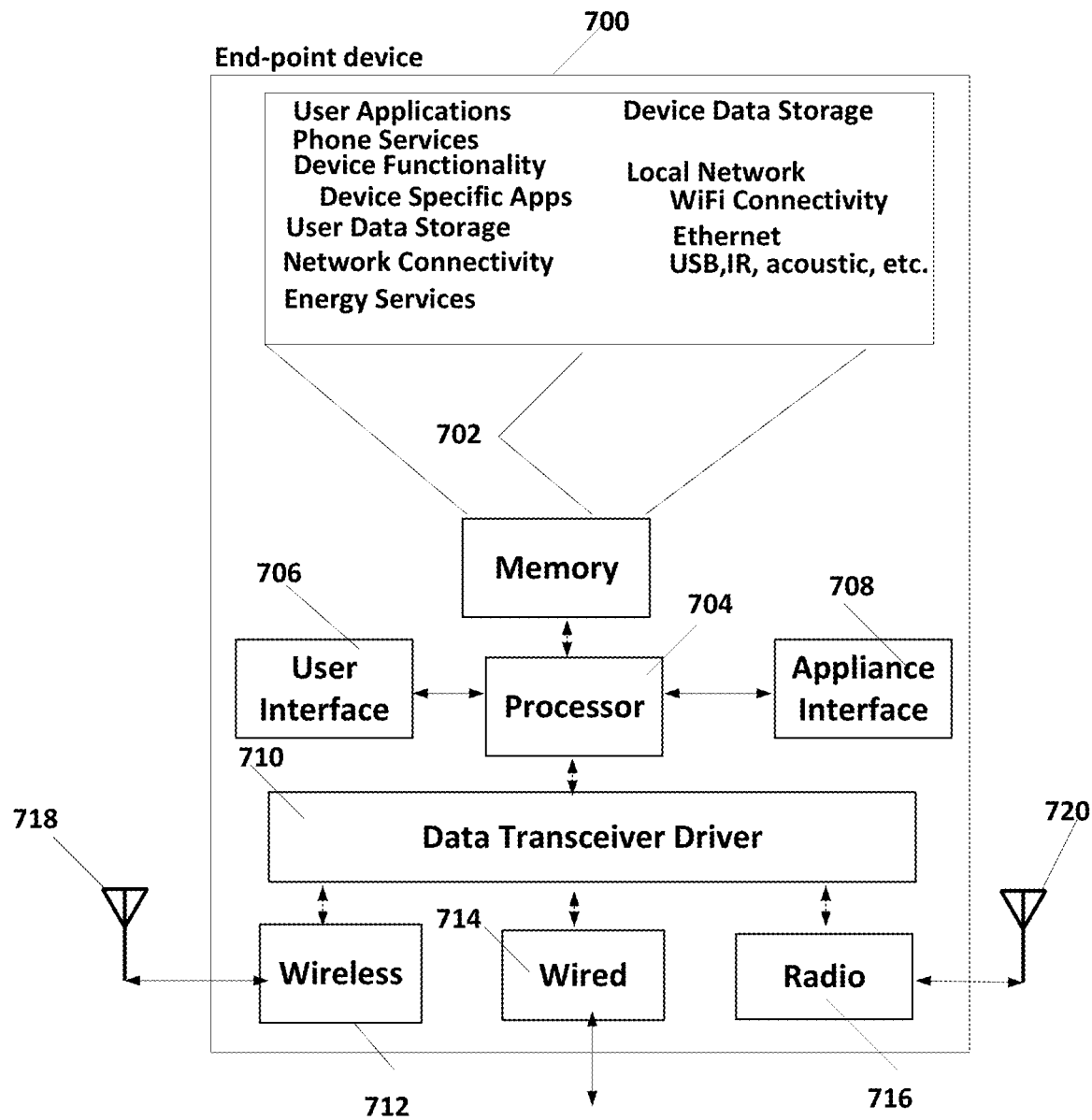
FIG. 7 illustrates an example of an end-point device, for example UE devices, IoT devices, and energy network devices, that are used with networks according to some embodiments.

FIG. 7 illustrate an example end-point device 700 such as, for example, User Equipment (UE) 618 and 622, Internet-of-Things (IoT) 624, 626, 628, and Power Meters (PM) 62 as illustrated in FIGS. 6A and 6B, for example. One skilled in the art will understand that mesh network 650 may support any number of end-point devices such as device 700.

End-point device 700 as illustrated in FIG. 7 may represent, for example, a user equipment, an IoT device, an energy network device, or a roaming energy network device. User equipment can be, for example, a cell phone, a home computer (laptop or desktop), smart TV, gaming console, wearables (e.g., smart watches, medical wearables). IoT devices include internet capable and controllable appliances such as smart door locks, lighting components, wall switches, thermostats, vacuums, video doorbells, video monitoring, garage door openers, water heaters, sprinkler systems, smart refrigerators, or other home appliances. An energy network device can include, for example, a power meter including an internet capable and controllable smart power meter that monitors and reports power usage of a particular site. A roaming energy device can include, for example, an EV charger and the EV. FIG. 7 is a generalized diagram and may not include all of the elements illustrated or may include elements not illustrated. However, end-point device 700 is illustrated for reference in describing interactions with embodiments of the present disclosure.

As illustrated in FIG. 7, end-point device 700 includes a processor 704 coupled to a memory 702. Memory 702 includes any form of data storage, including both volatile and non-volatile memory that stores instructions and data used by processor 708, removable storage such as solid-state memory drives, memory sticks, memory cards, disks, tapes or other storage devices. As is further illustrated, processor 704 may be coupled to a user interface 706. User interface 706 can include any number of user input or display devices, including touch-screens, video displays, indicator lights, keyboards, ball-type pointer devices, gaming input devices, microphones, speakers, or any other device that facilitates communications between end-point device 700 and a user. Processor 704 is further coupled to a data transceiver driver 710 that provides data packet framing and other services to provide for network communications, in particular local area wireless 712, wired networks 714, or radio network services 716. Wireless transceiver 712 is coupled to antenna 718 and is capable of coupling with a wireless network. As such, wireless transceiver 712 can include, for example, a WiFi transceiver, Bluetooth or Bluetooth Low-Energy transceiver, ZigBee or other transceivers capable of wireless communications under any protocol. Radio transceiver 716 is, for example, the cell-phone transceiver and may operate under any of the radio communications protocol, for example 5G NR, 4G, 3G, 2G, LTE, or other radio communications protocol as discussed elsewhere in this disclosure. Radio transceiver 716 is coupled to antenna 720. Furthermore, data transceiver driver 710 can be further coupled to transceiver 714 that can, for example, include optical couplers (e.g. IR optical communications), USB, acoustic or other interface ports, or any device supporting other communications protocols. As discussed above, a particular end-point device may not include all of these interfaces. Further, in some cases (e.g., IoT devices, PMs, etc.) user interface 706 may be very simple or not included.

Processor 704, in some devices 700, can be coupled to an appliance interface 708. If end-point device 700 is an IoT device, for example, appliance interface 708 provides interfacing and control for the IoT appliance, which exchange information with cloud-based services for monitoring and control. If end-point device 700 is a power meter, for example, appliance interface 708 can receive power monitoring signals and, in some devices, provide control signals to power using devices that are monitored by power monitoring signal.

For IoT functionality, appliance interface 708 may include sensor blocks and control circuits for controlling an appliance coupled to appliance interface 708. Appliance interface 708 may include any analog-front-end circuitry required to digitize analog sensor signals and drivers for controlling the appliance. For example, in a smart thermostat appliance interface 708 includes one or more temperature sensors and one or more relays to switch on and off furnaces and air-conditioning units to control the temperatures sensed by the one or more temperature sensors. In a smart television, appliance interface 708 may receive signals from a light sensor, control circuit for adjusting the brightness, and circuitry to receive and provide streaming digital video signals to the television. Consequently, appliance interface 708 depends on the functionality of appliance of the appliance.

For smart meter operation, appliance interface 708 may be used to collect data on power usage, arrange for transactive energy contracts, and provide control of the power usage to allow for time-shifted usage. For example, in combination with an EV charger, some examples of end-pint device 700 may shift charging function to account for times of low power costs. End-point device 700, consequently, is often controllable through Internet services and may provide data for analysis by those Internet services.

Processor 704 can be one or more of a microcomputer, microcontroller, microprocessor, ASIC, or other computational circuit capable of executing instructions stored in memory 702 to perform the functions as described in this disclosure. As is further illustrated in FIG. 7, memory 702 can store instructions and data for various user-downloaded applications, WiFi connectivity, Radio Communications, phone services, device specific applications, user data storage, or any other application for execution on end-point device 700. Many applications stored in memory 702 may use Internet services that are accessed through radio transceiver 712 or through wireless interface 710. In particular, end-point device 700 may be coupled to a UE/GW as described above for access to internet services through a network such as network 600, for example. As illustrated in FIG. 7, memory 702 can include instructions for user applications, phone services, device functionality and device specific applications, user data storage, network connectivity, device data storage, and local networking (e.g., WiFi connectivity, ethernet, USB, IR, acoustic, etc.).

Figure 8A:
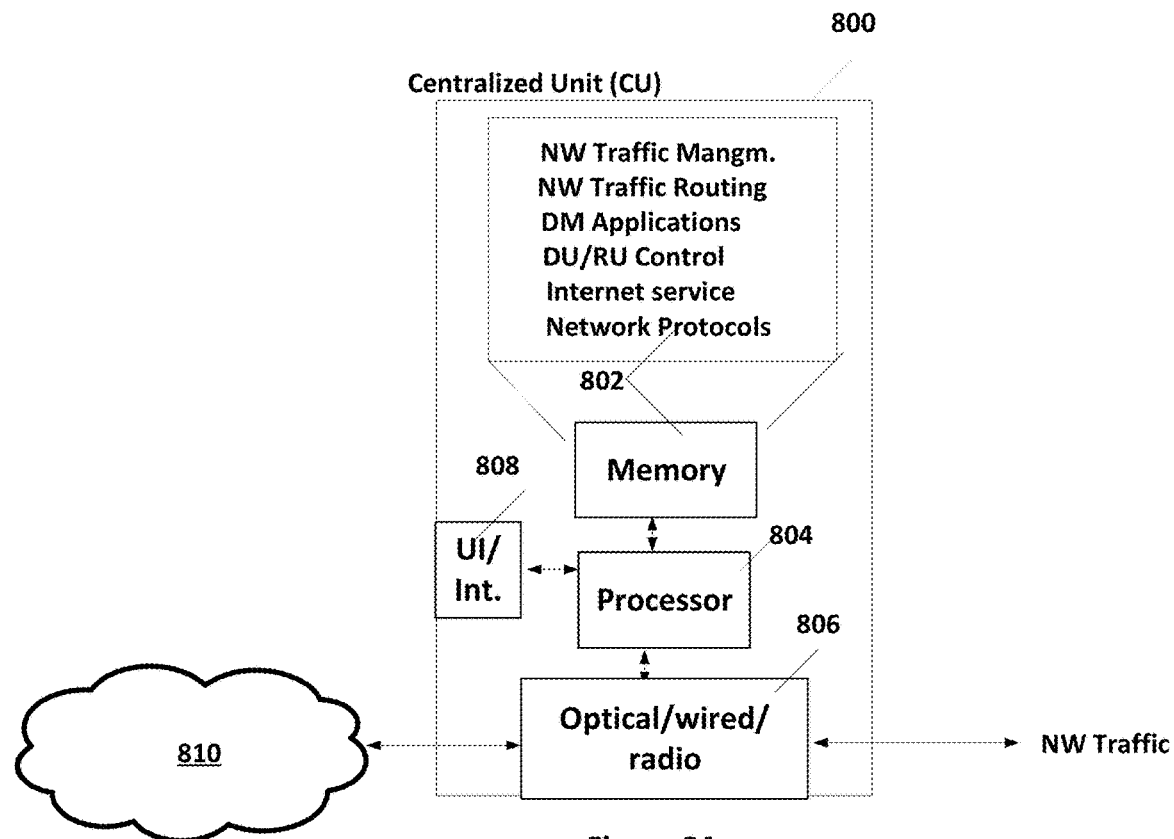
FIGS. 8A, 8B, 8C, and 8D illustrate examples of network nodes such as a central unit (CU), distributed unit (DU), radio unit (RU), and gateway (GW) according to some embodiments.
Figure 8B:
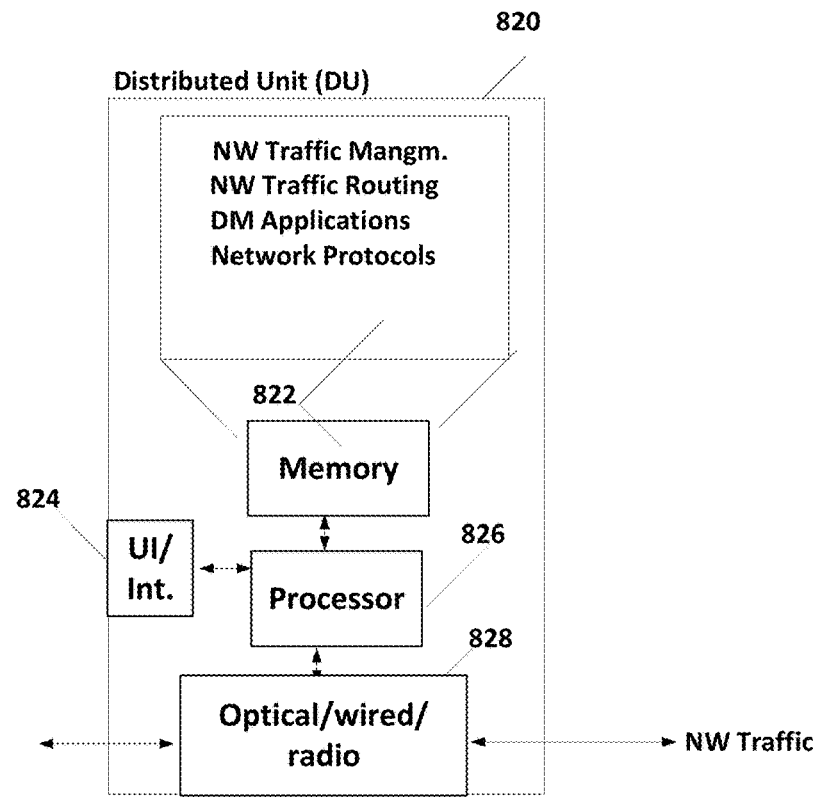
Figure 8C:
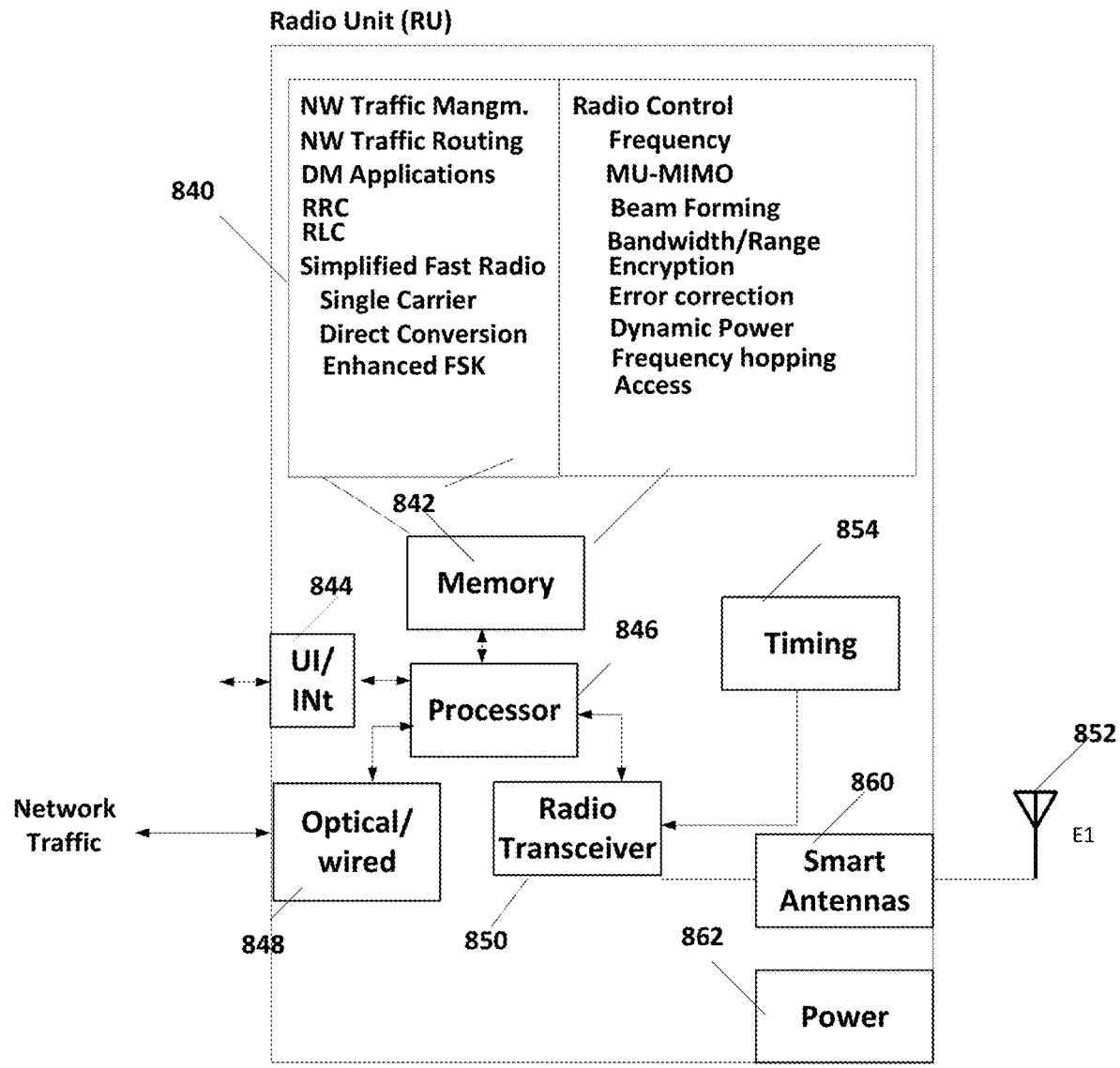
Figure 8D:
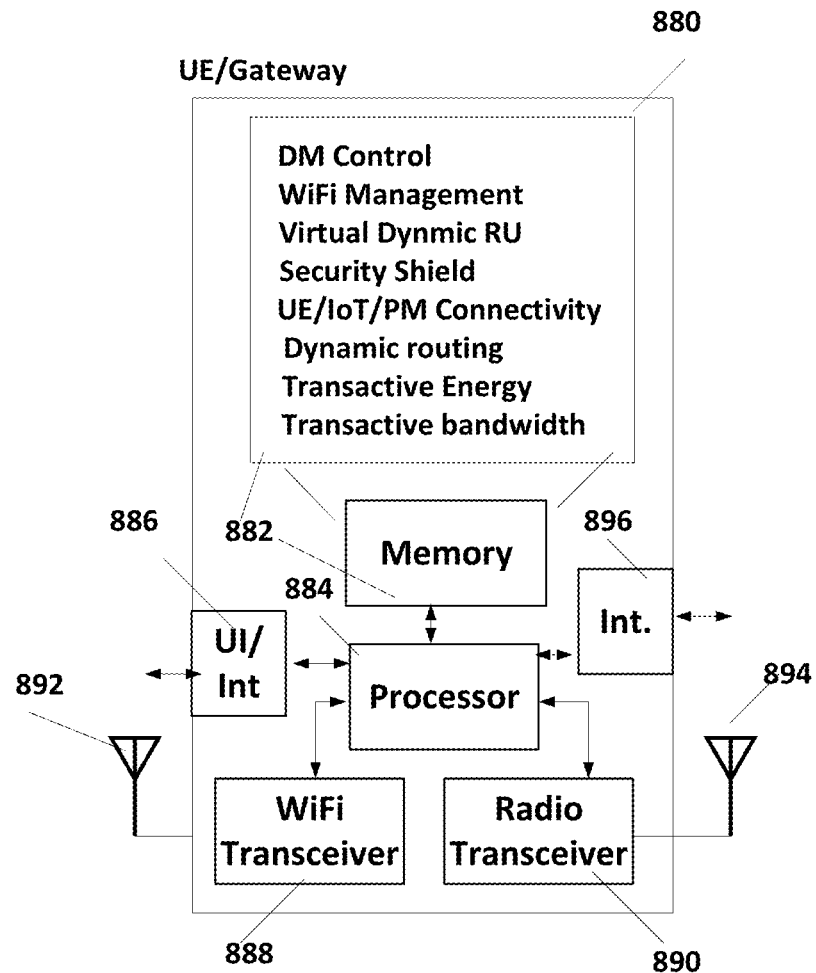

FIGS. 8A, 8B, 8C, and 8D illustrate examples of network components according to some embodiments that are used in radio-based networks. Many examples presented here are applicable to the 5G NR network, however embodiments of the present disclosure can be used in any protocol radio network. As such, the network is structured into Radio Unit (RU), Distributed Unit (DU), and Centralized Unit (CU) components. RU, DU, and CU components can be combined into self-contained Device Modules (DM), as described below. In particular, a radio Base Station (BS) can be formed from a combination of RU, DU, and CU functionality, which may itself be spatially distributed over large distances. Although often, in conventional systems, connections between CU, DU, and RU components can be wired, which presents significant challenges for deployment in developed countries or rural areas. FIG. 8A illustrates an example embodiment of a CU, FIG. 8B illustrates an example embodiment of a DU, FIG. 8C illustrates an example embodiment of a RU, and FIG. 8D illustrates an example embodiment of a gateway (GW) that provide various aspects of network connectivity to UEs and other devices.

FIG. 8A illustrates a CU 800 according to some embodiments. CU 800 is an edge component that is connected to the cloud 810 (backhaul). The functional requirements of CU 800 may be defined by the protocols of network 600. In the 5G protocols, CU 800 provides support for higher layers of the protocol stack. For example, in the 5G NR protocol CU 800 supports high-level operations such as the Service Data Adaptation Protocol (SDAP), the Primary Reference Clock (PRC), and the Packet Data Convergence Protocol (PDCP), for example, among other functions. In the particular example illustrated in FIG. 8A, CU 800 includes a processor 804 that is coupled to a memory 802. Memory 802 includes volatile and non-volatile memory that stores instructions and data used by processor 804 to perform the functions described here. Processor 804 is further coupled to an interface 806. Interface 806 may include any network connection to communicate with the cloud-based services 810. Interface 806 also couples CU 800 to the DU downstream components. Interface 806 may include hardwired interfaces, optical interfaces, wireless connections, or any other interface to transmit data packets to the DU downstream (midhaul) components and communicate with the cloud-based services 810. Interface 806 may also provide connection to cloud-based services 810 to other CU 800, which has somehow lost network connection. In some embodiments, interface 806 may include a radio-based interface. Processor 804 may further be coupled to an interface 808, which may include a user interface or other wired interface for communications with a user. Interface 808 may include optical couplers (e.g. IR optical communications), USB or other interface ports, or any device supporting other communications protocols services. Interface 808 may include any number of user input or display devices, including touch-screens, video displays, indicator lights, keyboards, microphones, speakers, or any other device that facilitates local communications between CU 800 and a user.

Processor 804 can be one or more of microcomputer, microcontroller, microprocessor, ASIC, or other computational circuit capable of executing instructions stored in memory 802 to perform the functions as described in this disclosure. As is illustrated in FIG. 8A, memory 802 can store instructions and data for various applications, including the network traffic management and routing procedures, DM application and interfaces (such as the DU cluster load balancing application, the user specific BS subnet management application, and KCN registry with smart predictive device profile abstraction application), DU/RU routing and control, and interfacing with cloud-services 810 to provide internet services to an end user. As discussed above, memory 802 includes instructions for performing the higher layer network protocols that are expected by a central unit in that network environment.

FIG. 8B illustrates a DU 820 according to some embodiments. DU 820 is an midhaul component that is connected to a CU such as CU 800 illustrated in FIG. 8A and provides traffic to an RU. In the 5G protocols, the DU supports lower layers of the protocol, for example the radio link control (RLC) protocol, the medium access control (MAC) protocol, and the physical layer itself. As illustrated, for example in FIG. 6A, there may be many DUs such as DU 820 coupled to each CU such as CU 800, with the CU controlling traffic through each of the DUs.

As is illustrated in FIG. 8B, DU 820 includes a processor 826 that is coupled to a memory 822. Memory 822 includes volatile and non-volatile memory that stores instructions and data used by processor 826 to perform the functions described here. Processor 826 is further coupled to an interface 828. Interface 828 may include any network connection to communicate between a CU and an RU. Interface 828 may include hardwired interfaces, optical interfaces, wireless connections, or any other interface to transmit and receive data packets from a CU or other network node. In some embodiments, interface 828 may include a radio-based interface. Processor 826 may further be coupled to an interface 824, which may include a user interface or other wired interface for communications with a user. Interface 824 may include optical couplers (e.g. IR optical communications), USB or other interface ports, or any device supporting other communications protocols services. Interface 824 may further include any number of user input or display devices, including touch-screens, video displays, indicator lights, keyboards, microphones, speakers, or any other device that facilitates local communications between DU 820 and a user.

Processor 826 can be one or more of microcomputer, microcontroller, microprocessor, ASIC, or other computational circuit capable of executing instructions stored in memory 822 to perform the functions as described in this disclosure. As is illustrated in FIG. 8B, memory 822 can store instructions and data for various applications, including the network traffic management and routing procedures, DM application and interfaces (such as the RU digital processing support application, the user specific virtual BS connection management application, and KCN registry with smart predictive device profile abstraction application), and network protocols. As discussed above, memory 822 includes instructions for performing lower layer network protocols that are expected by a distributed unit in that network environment.

FIG. 8C illustrates a RU 840 according to some embodiments. RU 840 is a component that is connected to a DU such as DU 820 and provides radio traffic to end users such as a gateway. In the 5G protocols, the RU is coupled to a DU and handles transmission of network data packets over the radio network. As such, RU 840 controls physical layer transmission such as beam formation, power levels, and other functions for transmission of data. As is illustrated in FIG. 8C, RU 840 includes a processor 846 that is coupled to a memory 842. Memory 842 includes volatile and non-volatile memory that stores instructions and data used by processor 846 to perform the functions described here. Processor 846 is further coupled to interfaces 848 and 850. Interface 848 may include any network connection to communicate between with a DU such as DU 820. In some embodiments, DU 820 may be incorporated with or in direct communication with RU 840 through a peripheral component interface (e.g., enhanced PCIe interconnect). In other embodiments, interface 848 may include hardwired interfaces, optical interfaces, wireless connections, or any other interface to transmit and receive data packets between a DU and downstream UE Gateway. Processor 846 is also coupled to radio interfaces 850. Radio interface 850 is a radio-based interface that transmits data across the air according to the radio network protocol. Radio interface 850 can be coupled to a smart antenna module 860 to control operation of the antenna array 852 to facilitate beam-forming and other RU functionality.

Processor 846 may further be coupled to an interface 844, which may include a user interface or other wired interface for communications with a user. Interface 844 may include optical couplers (e.g. IR optical communications), USB or other interface ports, or any device supporting other communications protocols services. Interface 844 may further include any number of user input or display devices, including touch-screens, video displays, indicator lights, keyboards, microphones, speakers, or any other device that facilitates local communications between DU 820 and a user.

Processor 846 can be one or more of microcomputer, microcontroller, microprocessor, ASIC, or other computational circuit capable of executing instructions stored in memory 842 to perform the functions as described in this disclosure. As is illustrated in FIG. 8C, memory 842 can store instructions and data for various applications, including the network traffic management and routing procedures, DM application and interfaces, radio resource control (RRC) protocols, radio link control (RLC) protocols, and general radio control functions. Radio control functions can, for example, include frequency controls, multiple-user multiple input multiple output (MU-MIMO) beam forming, bandwidth/range determination, encryption and error control algorithms, dynamic power control, and network access controls. As discussed above, memory 842 includes instructions for performing physical layer network protocols that are expected by a radio unit in that network environment.

As is further illustrated in FIG. 8C, in accordance with some embodiments RU 840 may include timing circuit 854 that provides timing for radio interface 850. In some embodiments, timing circuit 854 may include a near-zero jitter fast locking phase-locked loop in order to provide highly accurate timing to facilitate high data rate transmission. The high performance PLL circuit that provides a near jitter free, fast signal locking, low bit error signal stream that can be used in radio transceiver 850.

Embodiments of RU 840 according to this disclosure provides a radio design that results in much better data bandwidth and larger signal coverage range for fixed wireless broadband access, addressing both urban and rural coverages. In some embodiments, RU 840 follows the following three principals: 1) radio performance is maximized through intense innovation in selected high impact components coupled with drastic simplification of radio design and architecture to lower radio processing complexity; 2) Common radio system platform using software-designed radio (SDR) techniques for connections for both fronthaul, and midhaul applications.; 3) Dynamically self-organized, self-optimized, self-healed with automatic reconfigured wireless mesh components. Software-designed radio (SDR) processing, MU-MIMO application, and smart antennae technologies can be used to increase the effectiveness of RU 840.

The intelligent use of MU-MIMO with smart advanced antenna systems and coordinated power control with all participating radio devices enables custom beamforming signal streams for each radio communicating partner balancing between bandwidth and coverage range. When applied to base station Radio Units (RU), it maximizes data bandwidth for nearby User Equipment (UE) and reduces data bandwidth for distant UE's to ensure reliable connections are maintained over the longer range-overages needed.

As is discussed in more detail below, RU 840 further includes a power block 862. Power block 862 can receive power from any source in order to power RU 840. In some embodiments, power block 862 can receive power from a DU or GW that is coupled with RU 840. In some embodiments, power block 862 receives power from a solar DM.

FIG. 8D illustrates a gateway (GW) 880 according to some embodiments. GW 880 is an end-point fronthaul component that is connected to a RU such as RU 840 and provides connectivity to end-point devices such as UEs, IoTs, and PMs. As is illustrated in FIG. 8D, GW 880 includes a processor 884 that is coupled to a memory 882. Memory 882 includes volatile and non-volatile memory that stores instructions and data used by processor 884 to perform the functions described here. Processor 884 is further coupled to a WiFi transceiver 888, a radio transceiver 890, and a wired network interface 896. Radio Interface 890 may include any network connection to communicate with an RU such as RU 840 and with other GWs such as GW 880. Interface 896 may include hardwired interfaces, optical interfaces, wireless connections, or any other interface to transmit and receive data packets with local UEs, IoTs, PMs or other devices. WiFi transceiver 888 provides local area wireless networking with local UEs, IoTs, PMs, or other devices.

Processor 884 may further be coupled to an interface 886, which may include a user interface or other wired interface for communications with a user. Interface 886 may include optical couplers (e.g. IR optical communications), USB or other interface ports, or any device supporting other communications protocols services. Interface 886 may further include any number of user input or display devices, including touch-screens, video displays, indicator lights, keyboards, microphones, speakers, or any other device that facilitates local communications between GW 880 and a user.

Processor 884 can be one or more of microcomputer, microcontroller, microprocessor, ASIC, or other computational circuit capable of executing instructions stored in memory 882 to perform the functions as described in this disclosure. As is illustrated in FIG. 8D, memory 882 can store instructions and data for various applications, including DM control, WiFi management, Virtual Dynamic RU services, security shields, UE/IoT/PM connectivity, dynamic routing, transactive energy contracts, transactive bandwidth transactions, and other functionalities.

FIGS. 8A, 8B, 8C, and 8D illustrates various network components that are assembled to form a network according to some embodiments of the present invention. Network components, which may include the CU, DU, RU, and GW components described above are formed at various sites. FIG. 9 further describes a Radio Unit according to some embodiments. FIGS. 10A, 10B, 10C, and 10D further illustrate network devices that are formed with the components discussed above. In accordance with some embodiments of this disclosure, the network nodes can be assembled with virtual or physical device modules (DMs). As is discussed further below, virtual DMs can be distributed across various network node devices to form a distributed virtual device module (DVDM) construction. The network devices described below can be stackable from individual DMs or can be distributed to form virtual device modules. In some embodiments, virtual DMs can be integrated and executable on a single platform. Further, the functions may be virtually integrated to function on the same platform.

FIG. 9 illustrates a radio device 900 according to some embodiments. Radio device 900 includes a radio DM 904. Radio DM 904 can be, for example, as illustrated as RU 840 illustrated in FIG. 8C. As described with FIG. 8C, radio DM 904 includes a radio core 908 that performs the functions of RU 840 as described in FIG. 8C. Radio core 908 is coupled with a number of smart antenna modules, of which modules 906 and 910 are illustrated, that execute the beam forming and other functions described here.

As illustrated in FIG. 9, radio device 900 also includes a solar DM 902. As radio-based network devices such as Gateways, UE's and RU's are deployed in geographically isolated, remote areas or hard to read building locations where power sources are limited. Solar 902 provides solar based power to radio device 900 and may include solar collectors as well as power storage management, power regulation, and other functions related to collecting, storing, and supplying power to radio DM 904.

Figure 10D:
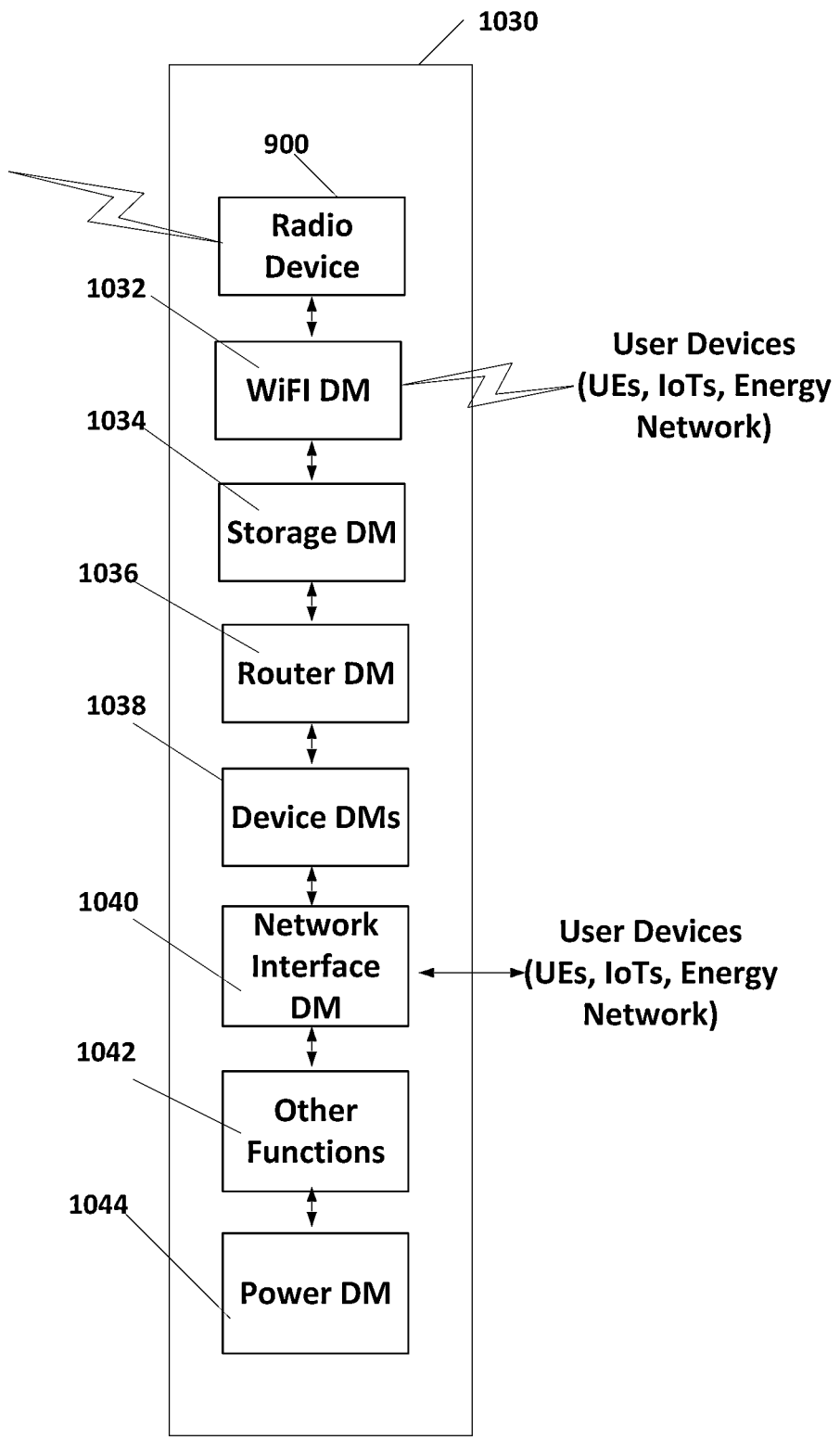

Solar Power DM 902 that are incorporated within radio devices 900 will likely be located on top of building roofs to facilitate ready access to the sun and to maximize the stability of radio signal connections. As is illustrated, solar DM 902 can be coupled with radio DM 904 with any connections, for example peripheral component interconnect express (PCIe) connectors with power connectors. This Radio DM and Solar Power DM stack of radio device 900 illustrated in FIG. 9 can be connected to other components of a separate DM stack, as is described further below, for example as illustrated in FIG. 10D, via a special connector cable. An optional battery pack and DC-DC module may also be included as part of the Solar Power DM 902 or separately in other parts of a DM stack coupled with radio device 900.

FIG. 10A illustrates a network device 1002 that includes radio device 900 coupled with a DU DM 1004. DU DM 1004 is discussed as DU 820 illustrated in FIG. 8B. As such, DU DM 1004 performs the functions as illustrated in FIG. 8B. As is illustrated, radio device 900 and DU DM 902 can be coupled with any connections, for example peripheral component interconnect express (PCIe) connectors with power connectors. Network device 1002 may further include other DMs 1006 that may be virtual or a combination of virtual and physical. As discussed above, radio device 900 may be located on a tower or a roof-top. DU DM 1004 and DMs 1006 may, in some embodiments, be co-located on the tower or roof-top with radio device 900. Alternatively, DU DM 1004 and DMs 1006 may be located in a more sheltered location (e.g., an environmentally controlled server room) and connected with radio device 900 with a cable. Network device 1002 can be referred to as a DU Network Device.

FIG. 10B illustrates a network device 1010 that integrates radio device 900 with a DU DM 1012 and a CU DM 1014. As discussed above, DU DM 1012 is discussed above as DU 820 illustrated in FIG. 8B. CU DM 1014 is discussed as CU 800 illustrated in FIG. 8A. It should be noted that DU DM 1012 and CU DM 1014 can be virtual and integrated into one platform with the combined capabilities. As is illustrated in FIG. 10B, radio device 900, DU DM 1012, and CU DM 1014 can be coupled with any connections, for example peripheral component interconnect express (PCIe) connectors with power connectors. Network device 1010 may further include other DMs 1016 that may be virtual or a combination of virtual and physical devices coupled into network device 1010. As discussed above, radio device 900 may be located on a tower or a roof-top. DU DM 1012, CU DM 1014, and DMs 1016 may, in some embodiments, be co-located on the tower or roof-top with radio device 900. Alternatively, DU DM 1012, CU DMs 1014, and DMs 1016 may be located in a more sheltered location (e.g., an environmentally controlled server room) and connected with radio device 900 with a cable. Network device 1010 may be referred to as a CU Network device because of the presence of CU DM 1014.

FIG. 10C illustrates a network device 1020 that does not include a radio device 900. As illustrated, network device 1020 includes a DU DM 1022 and a CU DM 1024. As discussed above, the DU DM 1022 is discussed above as DU 820 illustrated in FIG. 8B while CU DM 1024 is discussed as CU 800 illustrated in FIG. 8A. DU DM 1022 and CU DM 1024 may be virtual and operating on the same platform. Since network device 1020 does not include a radio device 900, network device 1020 includes wired or optical network communications with other network devices. As is illustrated, DU DM 1022 and CU DM 1024 are either incorporated in the same platform as virtual DMs or can be coupled with any connections, for example peripheral component interconnect express (PCIe) connectors with power connectors. Network device 1020 may further include other DMs 1026 that may be virtual or a combination of virtual and physical.

FIG. 10D illustrates a gateway device 1030 according to some embodiments. Gateway device 1030 can be as described as gateway 880 in FIG. 8D. Gateway device 1030 depicts a modularized depiction of gateway 880. As is illustrated in FIG. 10D, gateway device 1030 can include a radio DM 900 as illustrated in FIG. 9 for communications with the radio-based network. Further, gateway 1030 includes a WiFi DM 1032 that provides wireless networking capabilities to communicate with user devices such as UEs, IoTs, and PMs. Gateway 1030 may further include a storage DM 1034 that can be used to store data. Other DMs, such as the smart predictive device profile that is part of the KCN registry, may be activated to analyze data received from user devices locally. Gateway 1030 may further include a router DM 1036 that handles local and mesh network communications. Device DMs 1038 are DMs that are loaded to handle individual user devices. An additional network interface DM 1040 can function to administer a wired network such as a local ethernet network. Any number of other DMs 1042 can be included with gateway device 1030 for user defined functionality.

Other functionalities can include functionality for monitoring, collecting data from, and controlling PMs. Further, IoTs such as EV charging units may be included. As such, gateway device 1030 includes applications for user device managements, DM management, subnetwork management, wireless management, and functionality for individual device management. Such devices as 3rd party Home Hub DM, connected to gateway device 1030 via either PCIe, Ethernet, or USB-C connection, may receive power from the Router DM 1036, while a 3rd party Smart EV Charger DM connected via WiFi DM 1032 may not. Gateway 1030 can include DMs to operate with any interfaceable device within the network range of gateway 1030.

Gateway device 1030 may further include a power DM 1044. Power DM 1044 manages the power requirements of gateway device 1030 and may receive power from any source. In particular, power DM 1044 may receive solar power from solar DM 902 of radio device 900 or may include a separate solar DM, may receive power from any other power device. Consequently, Power DM 1044 can monitor and control the operation of Solar Power DM 902 or any other solar device and the battery if detected. Depending on the availability of power from the combination of the Solar Power DM and the battery, the Router DM will selectively reduce or shut down power supply to selected connected DM's according to the power system preferences.

Gateway device 1030 illustrates a stackable integration of a Solar Power DM, either as part of radio device 900 or a separate DM of gateway device 1030. Individual DMs of gateway device 950 are either virtual and supported on a common platform or may be stackable individual devices connected by a bus, which may be for example a PCIe. A power supply rail is part of the PCIe connector, which can be run along with the PCIe bus through the center of gateway device 1030. A Solar Power DM can, for example, include a universal DC/DC module to provide a power source to Router DM 1036, which in turn powers all the DM's connected to the Ethernet, USB-C, or PCIe bus power rail within gateway device 1030. It also connects to the PCIe bus for communications with the Router DM 1036. As illustrated, native DM's connect to the Router DM via the center PCIe bus axis extending the device vertically will receive power via the PCIe bus power rail.

As is further understood, GW device 1030 may be integrated to form the functions of any combination of network elements. For example, router DM 1036, in combination with other DMs 1042, may perform any combination of network activities defined by the functions of the CU, DU, and RU as well as the GW functions as described here.

As is illustrated in FIGS. 10A through 10D, each network device utilized in a network is formed from DMs. In some embodiments, DMs from each network device communicate with DMs from other network devices to perform functions. For example, transactive communications DMs can be formed in DU network devices, CU Network devices and UE Gateway network devices to negotiate service contracts to be provided by the network. Consequently, as is discussed further below a transactive communications DM in a Gateway network device can communicate with transactive communications DMs throughout the network to negotiate for connection bandwidth and performance needs. Similarly, energy services can be negotiated through transactive energy DMs in the network. The network devices illustrated in FIGS. 8A through 8D, 9, and 10A through 10D are further discussed below in further detail. In particular, examples of various gateway DM configurations according to some embodiments are further described below with respect to FIGS. 18A through 18C. A home gateway DM configuration is described below with respect to FIGS. 19A and 19B. A multi-dwelling gateway DM configuration is described below with respect to FIGS. 19C and 19D. An example enterprise gateway DM configuration is described below with respect to FIGS. 19E and 19F.

There are two very different types of communications applications requiring very difference kinds of communications resources from a network such as network 600 illustrated in FIGS. 6A and 6B. The majority of the IoT devices regularly collect and send small amounts of data to processing centers in cloud services 602 to be processed. The communications channel these IoT devices require are steady connections with low bandwidth. The other type of applications mainly deals with video, such as downloading large video files, video streaming, and AR/VR applications. These applications require very broad bandwidth but the applications typically are only active for a limited amount of time. The broadband communications channels such applications require are only needed while the applications are active.

As discussed above, under the current monthly subscription charging paradigm, the mobile cellular networks have created the NB-IoT radio with corresponding special subscription to deal with the IoT devices and retained the broadband mobile data plan for the smartphone and broadband data devices. The cable broadband Internet operators typically characterize their service plans by bandwidth and generally do not distinguish what kinds of devices connected through the cable modems.

Figure 11:
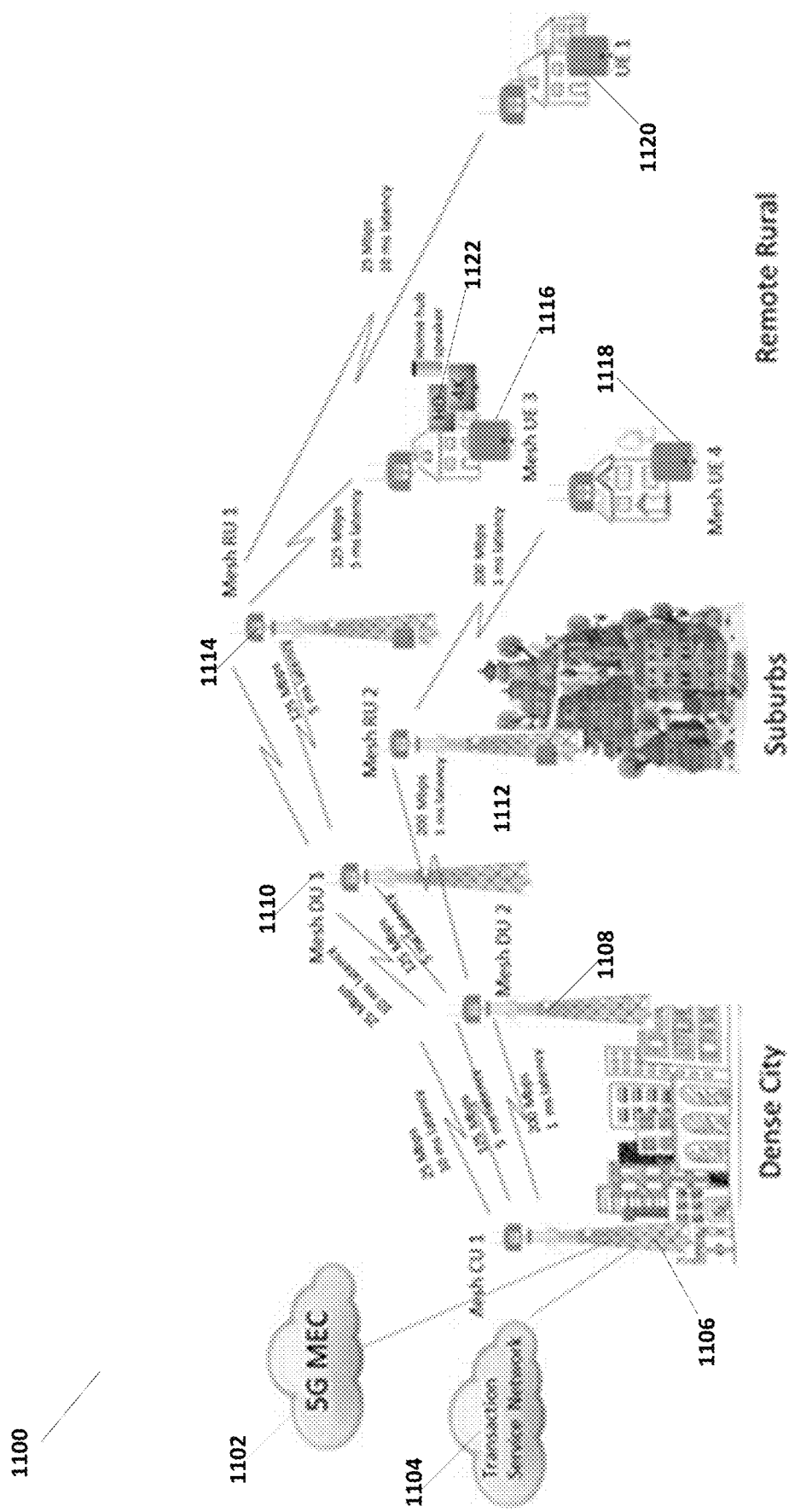
FIG. 11 illustrates an example network assembled according to some embodiments.

FIG. 11 demonstrates an example network 1100 capable of providing a transactive communications service framework according to some embodiments of the present disclosure. Example network 1100 is provided for demonstrative purposes only. A network according to embodiments of the disclosure can be of any size and complexity. Consequently, example network 1100 is provided to demonstrate aspects of this disclosure. Network 1100, as discussed further below, forms a mesh network. As such, network 1100 is self-organized, self-healing, and self-optimized as discussed further below. Further, user subnets are formed and transactive communications services can be performed. FIG. 11 illustrates, for example, how a virtual radio BS is formed by coupling CU1 1106, DU1 1110, and RU1 1114 to form a user subnet supporting 25 Mbps with maximum 10 ms latency to serve UE1 1120. The same virtual radio BS also forms a user subnet supporting 125 Mbps with maximum 5 ms latency to serve UE3 1116. One skilled in the art will recognize that FIG. 11 provides an example only and actual data rates and latencies in other networks will differ.

Network 1100 includes a CU network device CU1 1106, which may be housed in a data site, in contact with services 5G MEC 1102 and transactive network 1104. CU network device CU1 1106 can be, for example, network device 930 as illustrated in FIG. 9C. As further illustrated, CU network device CU1 1106 may be connected by radio link with DU network device DU2 1108 and DU network device DU1 1110. As is further illustrated, DU network device DU2 1108 may also provide radio network transport to DU network device DU1 1110. Both DU device network device DU2 1108 and DU network device DU1 1110 can be, for example, network device 920 as illustrated in FIG. 9B.

DU network device DU2 1108 connects to an RU network device RU2 1112. RU network device RU2 1112 connects with UE gateway UE4 1118. RU network device RU1 1114 can be connected with UE gateway UE3 1116 and UE gateway UE1 1120. UE gateway UE3 1116, UE gateway UE4 1118, and UE gateway UE1 1120 can be, for example, examples of gateway device 950 as illustrated in FIG. 9E.

Network 1100 illustrates an example network according to some embodiments where CU network device CU1 1106, DU network devices DU2 1108 and DU1 1110, RU network devices RU2 1112 and RU1 1114 each provide multiple channels of data transport with an array of data rates and latencies in a mesh network. FIG. 11 illustrates a particular example for exemplary purposes only. In the example illustrated in FIG. 11, network 1100 illustrates a network where CU Network Device CU1 1106 provides a channel with 35 Mbps with 10 ms latency, a 125 Mbps channel with 5 ms latency and a 200 Mbps channel with 1 ms latency. Channels between DU network device DU2 1108 and DU network device DU1 1110 provides two channels, one with 24 Mbps at 10 ms latency and another with 125 Mbps with 5 ms latency. DU network device DU2 1108 provides a single channel with 200 Mbps at 1 ms latency to RU Network device RU2 1112. RU network device RU1 1114 is illustrated as supplying a first channel to gateway network device UE3 1116 at 125 Mbps with 5 ms latency and a second channel at 25 Mbps with 10 ms latency to gateway device UE1 1120. Further, RU network device RU2 1112 provides a channel at 200 Mbps with 1 ms latency to gateway device UE4 1118.

With a Transactive Communications network as illustrated in FIG. 11, the data rate to end users is negotiated for a communications connection that handles the regularly connected and communicating devices such as IoTs and PMs. This negotiation may be accomplished by exchanging data packets with DMs located on gateways 1116, 1118, and 1120 as well as upstream network devices to acquire the appropriate bandwidth. Once negotiated, the steady bandwidth resulting from the connection will be available all the time. Transaction contracts with each of gateways UE3 1116, UE4 1118, and UE1 1120 may be acquired for both a low-bandwidth steady service that provides service to the devices connected to gateways UE3 1116, UE4 1118, and UE1 1120 as well as intermittent high-bandwidth services appropriate for high bandwidth use.

As is further illustrated in FIG. 11, gateway device UE3 1116, for example, supports high bandwidth devices 1122. When the user turns on a smart TV set to watch a 4K movie, a communications channel broad enough to carry the 4K stream may be established for the duration of the movie and the user only has to pay for the additional channel for that specific period of time. When a user needs to download ten 4K movie files, say total to 100 gigabytes, sometime over the next 24 hours, network 1100 can schedule it during traffic low period and allocate the biggest bandwidth channel available and have the files downloaded much faster and at a much cheaper cost to the user. This also helps to maximize the efficiency of network resource utilization for the communications network operator.

In addition, to facilitate easy deployment and achieve high fault tolerant of network 1100, network devices CU device 1106, DU1 1110, DU2 1108, RU1 1115, and RU2 1112 can provide self-healing mesh network capabilities. As illustrated in FIG. 11, for example, if DU1 1110 may receive network traffic from DU2 1108 or directly from CU1 1106. Consequently, network traffic can be routed around DU1 1110 if that device fails. Further, additional network devices performing the CU, DU, and RU functions can be linked into the network. Like a traditional wireless mesh network, each of the network elements performs a distinct role such as a mesh client, a mesh gateway, or a mesh router located somewhere between a mesh client and a mesh gateway. The mesh network according to some embodiments is illustrated by network 1100 illustrated in FIG. 11.

Further, for illustrative purposes, network 1100 is geographically distributed over serval environments. For example, CU device CU1 1106 and DU device DU2 1108 may be located in a dense city. DU device DU1 1110 may be located between a dense city and the suburbs. RU device RU2 1112 may be located in the suburbs. Ru device RU1 1114 may be more rural to service rural UE gateways UE4 1118, UE3 1116, and UE1 1120. It should be understood that FIG. 11 illustrates a portion of network 1100 and other devices (DU, RU, and gateway devices) are located throughout the geographic area. CU device CU1 1106 may provide network traffic throughout network 1100. In some embodiments, the network devices illustrated in FIG. 11 may further be coupled to other CU devices.

Consequently, as is illustrated in FIG. 11, network traffic may be routed through combinations of network devices using individual channels in order route requested services to an end user. In particular, CU1 1106, DU1 1110, and DU 1108 may communicate to appropriately route bandwidth through constructed subnets that are dynamically formed to service each end user. This dynamic construction of subnets in combination with transaction contracting allows network 1100 to configure itself appropriately.

As illustrated in FIG. 11, mesh network 1100 is dynamically configured into subnets with specific performance parameters each serving a user's specific needs at a specific time. For example, in the configuration illustrated in network 1100 of FIG. 11, UE3 has required a communications link of 125 Mbps with latency of no longer than 5 ms from RU1. A subnet connecting CU1, DU2, DU1, RU1, and UE3, supporting 125 Mbps with latency of no longer than 5 ms is assembled to serve UE 3. Similarly, a subnet connecting CU1, DU2, DU1, RU1, and UE1 is assembled to support 25 Mbps bandwidth with no worse than 10 ms latency to serve UE 1's Internet access requirement. These subnets are assembled dynamically within network 1100 to serve individual UE's. The subnet performance parameters are modified as the UE's service needs changed, as is discussed further below. While we used bandwidth and latency as performance parameter in our example, other parameters such as BER can also be added to the subnet channel requirements when appropriate.

Figure 12A:
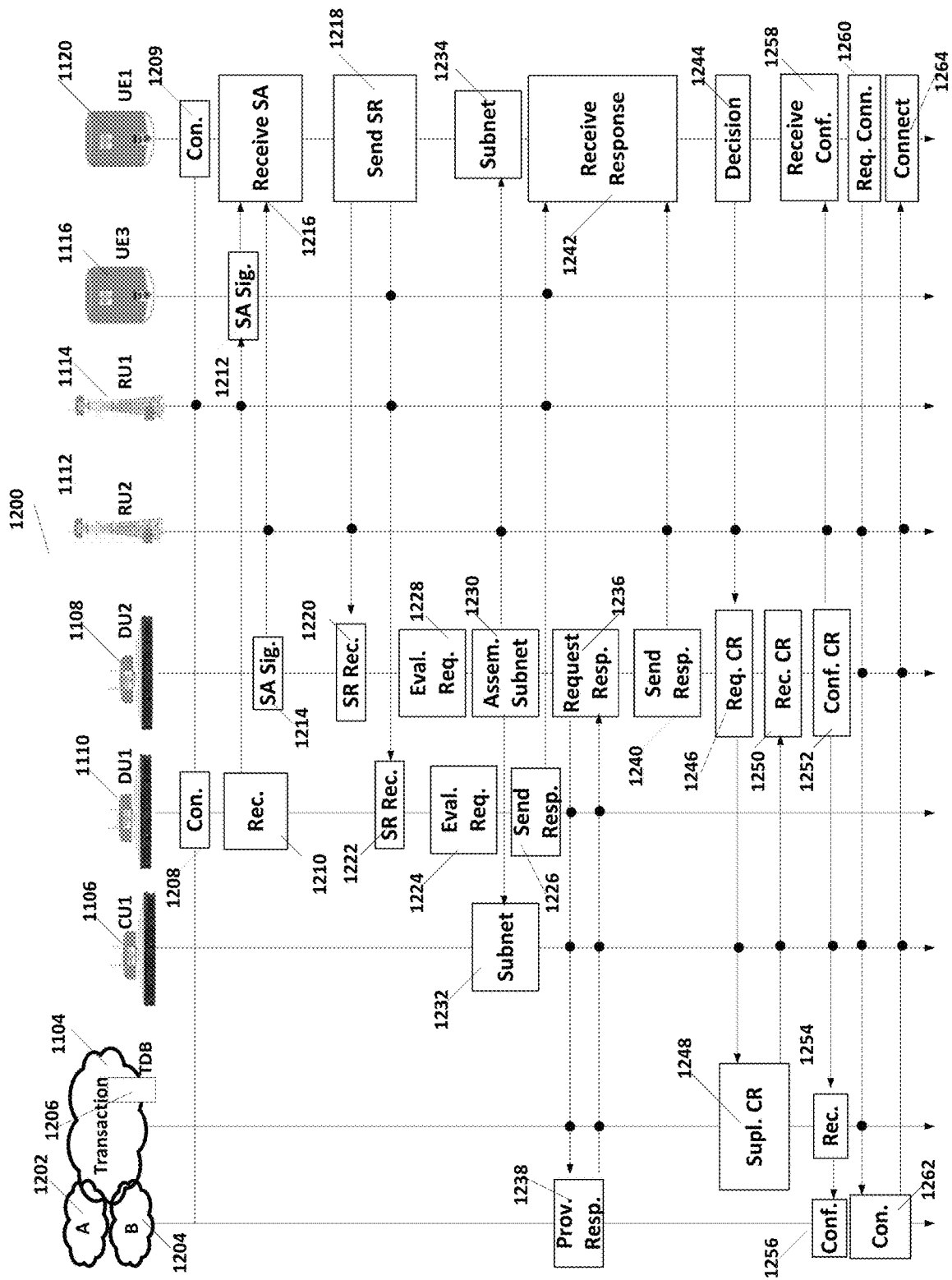
FIGS. 12A, 12B, and 12C illustrates network processes for network repair and requesting new service in the network illustrated in FIG. 11 according to some embodiments.

As has been discussed above, network 1100 according to some embodiments can be a self-organized and self-healed fault tolerant transactive infrastructure. FIG. 12A illustrates an example flow and communications chart 1200 for linking in UE1 1120 using network 1100 as an example. In particular, chart 1200 illustrates linking UE1 1120 into network 1100 for the first time or illustrates the case when the radio link between RU1 1114 and UE1 1120 has become degraded or is blocked for some reason. In that case, UE1 1120 will seek connection paths or alternate connection paths to reconnect UE1 1120 to network 1100

Figure 12B:
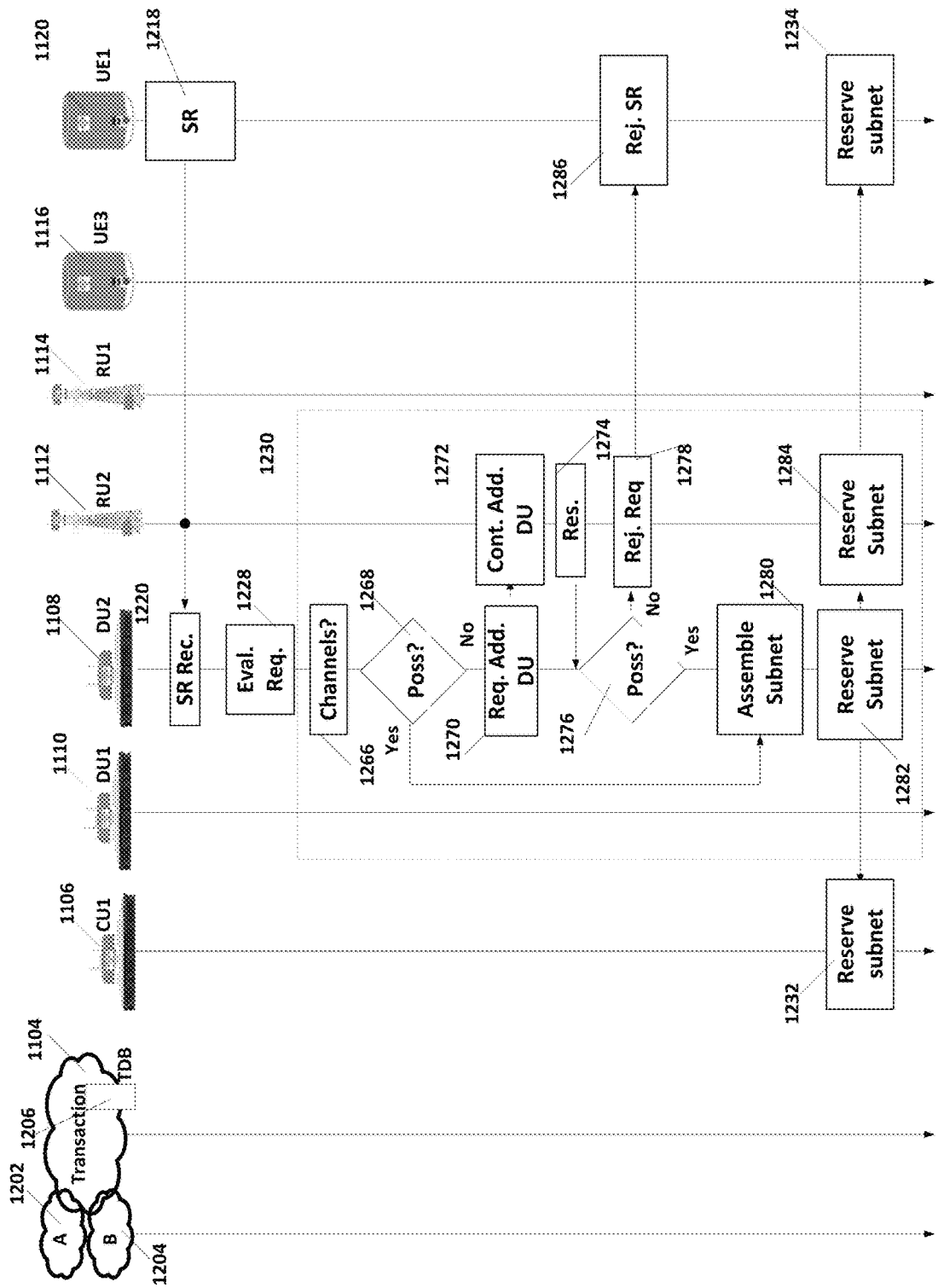
Figure 12C:
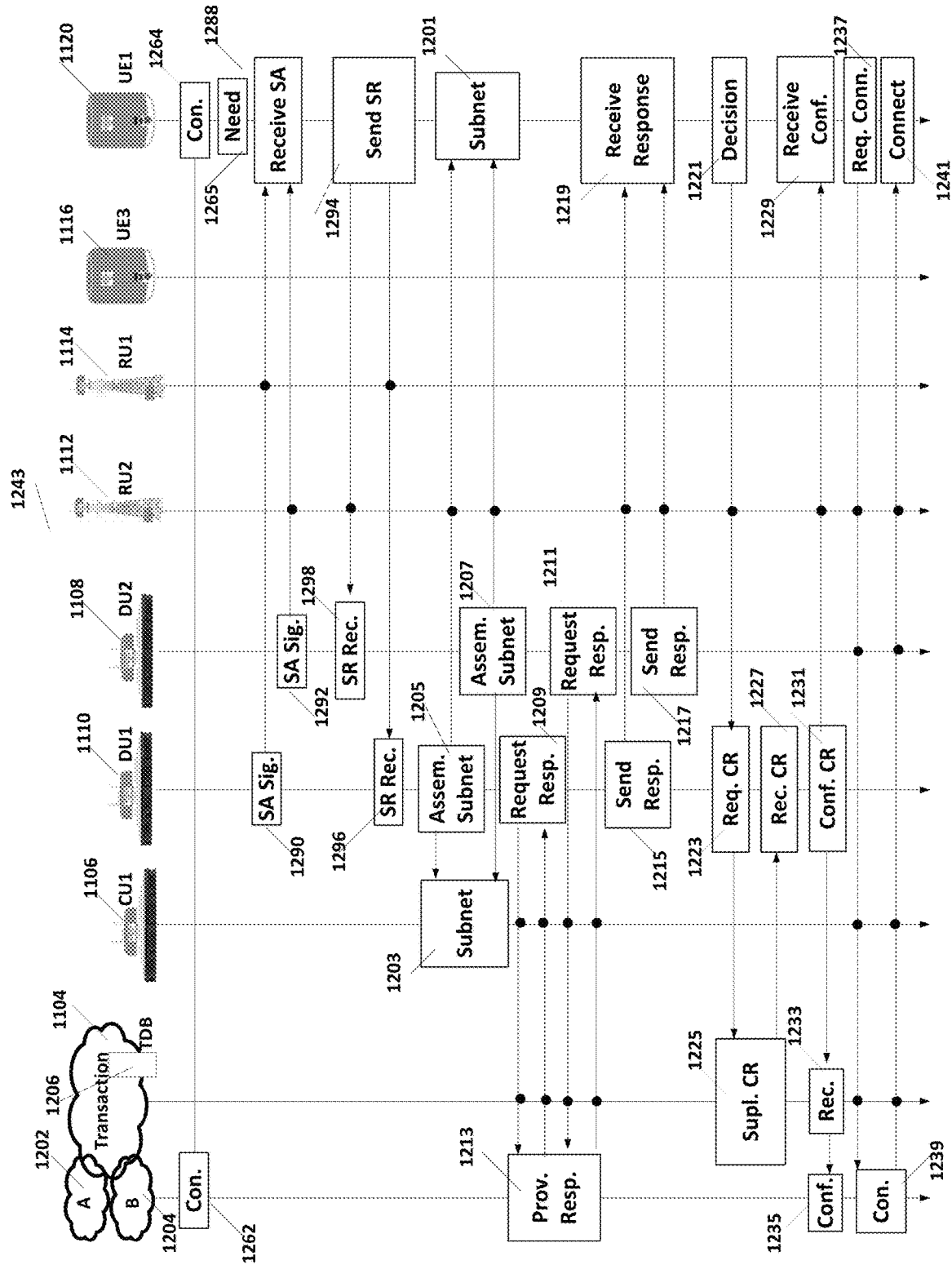

FIGS. 12A, 12B, and 12C illustrate example process flows illustrating self-healing, self-optimization, and requests for new services using the example network 1100 according to some embodiments for illustrative purposes. In particular, process flow 1200 illustrated in FIG. 12A illustrates how network 1100 can be re-organized to recover from lost connection between RU1 1114 and UE1 1120 automatically. Process flow 1200 further illustrates how, in the process of recovering, UE1 1120 may negotiate a cheaper price for the service it requests. A similar process can occur when UE1 1120 is first incorporated into network 1100.

As illustrated in FIGS. 12A, 12B, and 12C, the timelines (increasing in a direction down the page) for operations of each of UE1 1120, UE3 1116, RU1 1114, RU2 1112, DU2 1108, DU1 1110, and CU1 1106 is presented. Operations of each of these network devices is executed by a device module executing on the network device platform and is depicted on a line starting at step 1208 at a first time and increasing in time down the page. As is illustrates, DMs interact between network devices to facilitate operation of network 1100 as a whole. The timings illustrated in FIGS. 12A, 12B, and 12C are not to be considered relatively accurate and timing separations are not considered to scale. The timings illustrated are for illustration only. As is further illustrated in FIG. 11, CU1 1106 is coupled to cloud transaction services 1104. Cloud transaction services 1104 includes a transactions data base (TDB) 1206 that records all of the bandwidth transaction contracts that are operative in network 1100. Further, cloud transaction services 1104 includes service providers, of which service provider A 1202 and service provider B 1204 is illustrated. There may be any number of service providers included in cloud transaction services 1104 to provide networking services to end users represented by UE1 1120 and UE3 1116. Further, in FIGS. 12A, 12B, and 12C, a routing through a network device is designated by a heavy connection symbol "•".

Communications between network devices are provided by packet data communications carrying the indicated messages. The packets sent between devices as discussed below adhere to the packet formats appropriate for network 1100. For example, if network 1100 is a 5G NR radio network, then packets that adhere to the 5G NR protocols are used. Consequently, messages are transmitted between network devices embedded within packets and are acted upon by DMs operating in each of the network devices.

In FIG. 12A, process flow 1200 starts at Step 1208, which in this case is executed by DU1 1110. Relatedly, step 1209, which in this case is executed by UE1 1120, also marks the beginning of process 1200. In step 1208, DU1 1110 detects that the connection between RU1 1114 and UE1 1120 has been disrupted and lost. In step 1208, DU1 1110 executes a recovery attempt to restore service to UE1 1120 under the current contract. Since DU1 1110 no longer sees UE1 1120 in its subnet, indicating that connection is lost, in step 1210 DU1 1110 locates other UE's it serves that are close to UE1 1120 and have mesh router capabilities through which UE1 1120 can be reconnected to DU1 1110. In step 1210, DU1 finds UE3 1116 as a candidate and requests that UE3 execute step 1212 to provide the SA beacon indicating that service is available. In particular, DU1 1110 in step 1210 determines that UE3 1116 has mesh router capabilities and is close to UE1 1120. Step 1210 executed by DU1 1210 then sends an "Activate Service Availability Beacon" request to UE3 1116.

As indicated in FIG. 12A, the "Activate Services Availability Beacon" request is routed through RU1 1114 to be received in step 1212 executed on UE3 1116. In response to receipt of the "Activate Service Avail Beacon" message from step 1210 of DU1 1110, step 1212 activates a "Service Avail Beacon" (SA) to UE1 1120.

Further, other DUs also send "Service Available Beacons" that can be received by UE1 1120. In some embodiments, UE1 1120 may transmit a beacon request signal to initiate transmission of beacons from other devices in Network 1100. As illustrated in FIG. 12A, in step 1214 executed on DU2 1108, a SA on behalf of DU2 is sent to UE1 1120 through RU2 1112.

In step 1209, UE1 1120 detects that the connection to network 1100 is lost and executes step 1216 to receive SAs from available DUs. As illustrated in the example of FIG. 12A, in step 1216, executed at UE1 1120, SAs are received from DU1 1110 through UE3 1116 (steps 1210 and 1212), and from DU2 1108 (provided by step 1214).

When UE1 1120 has received the SAs from available DUs in network 1110, then UE1 1120 executes step 1218. In step 1218, UE1 1120 sends "Service Requests" (SRs) to DU1 1110 via UE3 1116 and DU2 1108. As illustrated in FIG. 12A, in step 1218 UE1 1120 responses to both SAs with the same Service Request (SR), asking for a communications channel with particular characteristics. In particular, the SR requests service with one or more of the following parameters: a maximum of X bandwidth, maximum of Y latency, maximum of Z bit-error-rate (BER), maximum price, start time, and end time. (BW X, Latency Y, BER Z, Price A, start time, end time). Other characteristics of the service may also be requested by UE1 1120. As illustrated in FIG. 12A, step 1218 sends the SR to step 1220 in DU2 1108 and step 1222 in DU1 1110.

When the SR is received in step 1222 of DU1 1110, DU1 1110 evaluates the SR in step 1224. In this example, since DU1 1110 was previously connected to UE 1 1120 an existing service transaction contract exists. In step 1224, DU1 recognizes that the subnet used to serve UE1 is still available, if the SR received in step 1222 falls within the previous contract, DU1 1110 proceeds to step 1226 to send a response via UE3 1116 confirming to UE1 1120 that it can provide the requested service under the previous service transaction contract. If in step 1224, DU1 1110 determines that a new service contract is required, the DU1 1110 follows the process outlined for DU2 1108 below to provide for a new contract. For the purpose of this example, DU1 in step 1224 determines that the SR is fulfilled by the current contract. Also, for purposes of this example, the service contract can be referred to as Contract A with Service Provider A, which is already stored in TDB 1206. Consequently, in step 1226, DU1 sends a response with Contract A to UE1 1120.

However, DU2 does not have an existing contract. Consequently, DU2 executes steps 1228, 1230, 1236, and 1240 to propose a contract for services to UE1 1120. It should be noted, that if DU1 1110 needs to establish a new contract to propose, then DU1 1110 will also follow these steps. It should also be noted that if, instead of a situation where service to UE1 1120 is lost, UE1 is establishing service with network 1100 for the first time, both DU1 1110 and DU2 1108 will execute the steps described below for DU2 1108.

When the SR is received from UE1 1120 into step 1220 of DU2 1108, DU2 1108 proceeds to step 1228 to evaluate the request. In step 1228, DU2 1108 determines that no existing contract exits and proceeds to step 1230 to assemble a subnet to service the SR from UE1 1120. Step 1230 is executed on DU2 1108 in conjunction with CU1 1106 and RU2 1112, as needed. Step 1230 is illustrated in more detail in FIG. 12B.

FIG. 12B illustrates an example of step 1230 to assemble a subnet that fulfills the SR from UE1 1120. As illustrated in FIG. 12B, step 1230 starts with an evaluation of the channels in step 1266. In step 1268, DU2 1108 determines whether or not it has the available resources to fulfill the SR provided by UE1 1120. If yes, then DU2 proceeds to step 1280. If not, then DU2 1108 proceeds to step 1270. In step 1270, DU2 1108 provides a supplemental request through RU2 1112 to another DU in network 1100 capable of providing resources to complete the SR. The supplemental request is provided to step 1272 executed in RU2 1112. In response, RU2 1112 provides a request to another DU (not shown) to determine whether the unfulfilled resources are found. RU2 1112 receives the response from the other DU in step 1274 and provides those results to DU2 1108 in step 1276. Step 1276 determines whether, with the resources located in DU2 1108 and the other DU, the SR from UE1 1120 can be fulfilled. If yes, then DU2 1108 proceeds to step 1280. If not, the DU2 1108 can reject the request and provide that rejection to step 1278 of RU2 1112, which provides it to SR Rejected step 1286 in UE1 1120.

In step 1280, DU2 1108 assembles a subnet to fulfill the SR from UE1 1120. As discussed above, the subnet may include only DU1 or may include multiple other DUs that are located to fulfill the request. The subnet constructed by DU2 1108 in step 1280 is then provided to step 1282. In step 1282 two views of subnets exist: 1) A subnet composed of all the connection provided via DU2 1108 to UE1 1120, which may involve multiple CUs that DU2 uses to support UE1 1120 and multiple DUs with associated CUs also supported UE1 1120; and 2) A subset of the subnet required by DU2 1108 to serve UE1 1120 that is supported by CU1 1106. The subnet in the first view is forwarded to UE1 1120 via step 1284. The second subset of the subnet reservation information is sent to CU1 1106 as part of step 1282. The subnet construction provided by step 1280 can then be stored at CU1 1106, RU2 1112, and UE1 1234 and may be stored at other network devices participating in the subnets. In some embodiments, these subnets can form the basis of network routing tables in each of these devices.

Note that, as illustrated in FIG. 12B, if channel aggregation is supported in UE1 1120 and included in the parameters of the SR from UE1 1120, DU2 1108 may also work with the Transaction Service Network 1104 to reserve as much bandwidth resources as possible as per the SR from UE1 1120 for both uplink and downlink requirements. Consequently, step 1270 may also message CU1 1106 to provide additional resources. In some embodiments, if step 1276 determines that the SR cannot be fulfilled, then DU2 1108 may inform UE1 with a Rej. SR step 1286 message indicating a partial fulfilment of the SR and provide the highest level of service that can be provided. UE1 1120 can then decide if it will take the offer from DU2 1108 and request further services to create and aggregate other subnets, with possible other services from Transaction Services 1104, to form the necessary bandwidth between UE1 1120 and the Service Provider. In this case DU2 1108 will function as the primary DU serving UE1 1120 with the highest-level subnet that can be provided. DU2 1108 may then manage all component subnets in conjunction with UE1 1120 and the Transaction Service Network 1104 to fulfill the service needs of UE1 1120.

Consequently, the ability of a DU to recruit other DUs with associated RUs and CUs to form a composite subnet comprised of multiple virtual radio BS to serve a UE service request eliminates the maximum bandwidth limitation from the Radio BS network. In addition, in some embodiments, a UE can aggregate multiple subnets to form a communications channel as big as it can aggregate and manage. The channel bandwidth can be bigger than any individual Radio BS itself can support, effectively eliminated the maximum bandwidth limitation from the Radio BS network also. The only limitation at that point will be the total bandwidth within radio range of the UE.

With reference again to FIG. 12A, for the purpose of this particular example, in step 1230 has completed successfully and an appropriate subnet is reserved and stored in steps 1234 and 1232 for providing services according to the SR to UE1 1120. Once an appropriate subnet is defined, in Step 1236 DU2 1108 forwards the SR from UE1 to transactions network 1104, and consequently to step 1238 of service provider A 1202 and service provider B 1204, to see if there are service providers who can provide the requested service in the SR. In step 1238 responses are provided from each of the available service providers in transaction service network 1104. In step 1238, for purposes of illustration only, Service Provider B 1204, through Transaction Service Network 1104 provides a response to DU2 1108 with a more favorable Price B for the service requested by UE1 1120, with all other parameters of the SR being fulfilled. In Step 1240, DU2 1108 relay the response from Service Provider B 1204 to UE1 1120. In step 1240, then, DU2 1108 determines the "best" response amongst the various service provided in transaction services network 1104. This can be accomplished, in the example provided here, based on price. Other parameters may also provide comparison, for example overall available bandwidth, lowest latency, lowest BER, or other parameters. Step 1240 may include various requirements for analyzing the "best" response received to forward to UE1 1120

In Step 1242 EU1 1120 receives responses from the multiple SRs transmitted by step 1218. In this case, Step 1242 receives a response from DU1 1110 sent by step 1226 and a response from DU2 1108 send by step 1240 in addition to the subnet construction information received in step 1234. In step 1244, UE1 1120 evaluates the different options and decides on the response that is best. Again, the definition of the "best" response can depend on the various parameters of the responses received, including, for example, price. In this case, for purposes of example, decision 1244 executed in EU1 1120 determines that the response provided by DU2 1108, which is the response from Service Provider B 1204, is better. Consequently, decision 1244 informs DU2 1108 of the winning response. UE1 1120 then engages with DU2 1108, the winning DU, to finalize the transaction with the winning proposed contract.

It should be noted that while UE1 1120 is engaged with DU2 1108 for a new connection with Service Provider B 1204, UE1 1120 can explicitly decline the service offered by DU1 1110 in step 1226 or a response timer in DU1 1110 can expire. When the timer expires, or the response is explicitly declined, DU1 1110 can release the connection resources according to the established subnet associated with UE1 1120. However, in some embodiments DU1 1110 may retain the data for UE1 1120 for future service requests.

Consequently, for the purposes of this example, in step 1244 UE1 1120 provides a "Contract Request" to step 1246 of DU2 1108 requesting a contract for the response provided by DU2 1108. In step 1246, DU2 contacts Transaction Services Network 1104 at step 1248 to obtain the agreement from Service Provider B 1204. In response, in step 1248 of Transaction Service Network 1104, an irrefutable contract with Service Provider B 1204 for the parameters included in SR and Price B is provided to step 1250 of DU2 1108. In step 1252 DU2 1108 provides the contract to step 1258 of UE1 1120 and to recordation step 1254 of Transaction Services Network 1104 and to Service Provider B at step 1256. In Step 1254, the irrefutable contract is stored in TDB 1206 of Transaction Services Network 1104 evidencing the contract. Consequently, the contract is confirmed to UE1 1120, Service Provider B 1204, and stored in TDB 1206. In step 1260, UE1 1120 requests a connection in accordance with the contract. In step 1262 Service Provider B 1204 provides the connection through the subnet in accordance with the contract to UE1 1120. In step 1264 of UE1 1120, the connection is started, and the contracted services begin.

It is worth noting that the SR described above includes a Start Time and an End Time. Depending on the duration between Start Time and End Time, the service agreement can be constructed as a month-long contract, a year-long contract, an hour contract or any other duration contract mutually agreed between UE1 1120 and Service Provider B 1204. This flexibility and in the transactive aspects of embodiments of network 1100 according to the present disclosure.

FIG. 12C illustrates an example process 1243 for requesting additional services according to some embodiments. As has been discussed above, UE1 1120 may request a low level of service in the SR requested in step 1218 of UE1 1120 in order to support the usage of IoT and PM devices coupled to UE1 1120. However, UE1 1120 may also request higher levels of services to support streaming services and other high-bandwidth usages. Since these usages may be of short duration and, in some cases, may be scheduled for future times when rates are lower, an additional SR may be made to fulfill these requests. In that case, UE1 1120 may see rates that are closer to those actually used instead of paying for a large bandwidth that is rarely, if ever, utilized. This arrangement may further release resources to network 1100 that can be used to fulfill additional requests by other UEs.

As illustrated in FIG. 12C, continuing with the example illustrated in FIG. 12A, once connection is made in steps 1262 and 1264 between Service Provider B 1204 and UE1 1120, UE1 1120 may determine a need for additional bandwidth, usually on a temporary basis (e.g. video streaming an event, downloading a series of movies, etc.) in Step 1265. The connection established in step 1264 is maintained throughout to continue support of attached devices.

From step 1265, where it is determined that additional service needs are, or will be, required, UE 1120 proceeds to step 1288 where Service Available Beacons (SAs) are received. In some embodiments, UE1 1120 may request receipt of SAs by pinging network 1100. In the example illustrated in FIG. 12C, SAs are received from step 1290 of DU1 1110 and step 1292 of DU2 1108. In step 1294, UE1 1120 provides an additional service request (SR) to step 1296 of DU1 1110 and step 1298 of DU2 1108. As has been discussed above, the SR request includes one or more of the following parameters: a maximum of X bandwidth, maximum of Y latency, maximum of Z bit-error-rate (BER), maximum price, start time, and end time (BW X, Latency Y, BER Z, Price A, start time, end time). Other characteristics of the service may also be requested by UE1 1120.

From step 1296, DU1 1110 provides a response to the SR. Similar to that described in FIG. 12A, in FIG. 12C DU1 1110 assembles a subnet in step 1205 and provides that successful subnet to UE1 1120 in step 1201 and to CU1 1106 in step 1203 of CU1 1106. Step 1205 may be the same as step 1230 as described in FIG. 12B. After the subnet is identified in step 1205, in step 1209 DU1 1110 requests services from Transaction Services Network 1104. As illustrated in FIG. 12C, step 1209 messages step 1213 of Transaction Services Network 1206 to receive response from the available service providers. In step 1215, DU1 1110 determines the best response from those received in step 1209 and sends the best response to step 1219 of UE1 1120.

From step 1298, DU2 1108 provides a response to the SR. Similar to that described in FIG. 12A, in FIG. 12C DU2 1108 assembles a subnet in step 1207 and provides that successful subnet to UE1 1120 in step 1201 and to CU1 1106 in step 1203 of CU1 1106. Step 1207 may be the same as step 1230 as described in FIG. 12B. After the subnet is identified in step 1207, in step 1211 DU2 1108 requests services from Transaction Services Network 1104. As illustrated in FIG. 12C, step 1211 messages step 1213 of Transaction Services Network 1206 to receive response from the available service providers. In step 1217, DU2 1108 determines the best response from those received in step 1211 and sends the best response to step 1219 of UE1 1120.

In Step 1219 EU1 1120 receives responses from the multiple SRs transmitted by step 1294. In this example, Step 1201 receives a response from DU1 1110 sent by step 1215 and a response from DU2 1108 send by step 1217. In step 1221, UE1 1120 evaluates the different responses and decides on the response that is best. Again, the definition of the "best" response can depend on the various parameters of the responses received, including, for example, price. In this case, for purposes of example, decision 1221 executed in EU1 1120 determines that the response provided by DU1 1110 is better. Consequently, decision 1221 informs DU1 1110 of the winning response. UE1 1120 then engages with DU1 1110 to finalize the transaction.

As discussed above, it should be noted that while UE1 1120 is engaged with DU1 1110 for a new connection according to the response, UE1 1120 can explicitly decline the service offered by DU2 1108 or allow a response timer in DU2 1108 to expire. When the timer expires, or the response is explicitly declined, DU2 1108 can release the connection resources according to the established subnet associated with UE1 1120. However, in some embodiments DU2 1108 may retain the data for UE1 1120 for future service requests.

Consequently, for the purposes of this example, in step 1221 UE1 1120 provides a "Contract Request" to step 1223 of DU1 1110 requesting a contract for the response provided by DU1 1110. In step 1227, DU1 1110 contacts Transaction Services Network 1104 at step 1225 to obtain the agreement from the Service Provider in the response. In response, in step 1225 of Transaction Service Network 1104, an irrefutable contract with the Service Provider for the parameters included in SR and Price B is provided to step 1227 of DU 1110. In step 1232 DU1 1110 provides the contract to step 1229 of UE1 1120 and to recordation step 1233 of Transaction Services Network 1104 and to the Service Provider at step 1235. In Step 1233, the irrefutable contract is stored in TDB 1206 of Transaction Services Network 1104 evidencing the contract. Consequently, the contract is confirmed to UE1 1120, the Service Provider, and stored in TDB 1206. In step 1237, UE1 1120 requests a connection in accordance with the contract. In step 1239 the Service Provider provides the connection through the subnet in accordance with the contract to UE1 1120. In step 1241 of UE1 1120, the connection is started, and the contracted services begin.

The Start Time and End Time of the SR can be used to time provision of the services according to the contract. Depending on the duration between Start Time and End Time, the service agreement can be constructed as a month-long contract, a year-long contract, an hour contract or any other duration contract mutually agreed between UE1 1120 and Service Provider B 1204. This flexibility and in the transactive aspects of embodiments of network 1100 according to the present disclosure. In addition, embodiments that can aggregate multiple devices, or even subnets, to create a virtual per-user subnet with bandwidth potentially bigger than any individual Radio BS system can support. Effectively eliminated the maximum bandwidth limitation of the Radio BS Network.

As illustrated in FIGS. 12A and 12C, embodiments of the present invention support competition between service providers. In the examples presented above, the service requested was of a communications nature specified in terms of BW X, Latency Y, BER Z, Price B, Start Time and End Time, to support Transactive Communications services such as Fixed Wireless Broadband Internet access. The Price parameter enables competition between service providers in a dynamic basis.

Further, in some embodiments, network 1100 can be self-optimized. As an example, consider UE4 1118, which is currently configured as a mesh client sending all traffic up stream to mesh RU2 1112 via its upstream radio DM. In some embodiments, UE4 1118 can periodically monitor other potentially availability upstream connections for better up stream link performance in terms of latency, capacity, and cost. For example, UE4 1118 may ping through RU1 1114 occasionally to perform this assessment. When appropriate, UE4 1118 may explore multiple upstream links, for example by executing the process illustrated in FIG. 12C, to yield a lower data communication latency and or higher transmission capacity, and or lower overall communications costs.

Figure 13A:
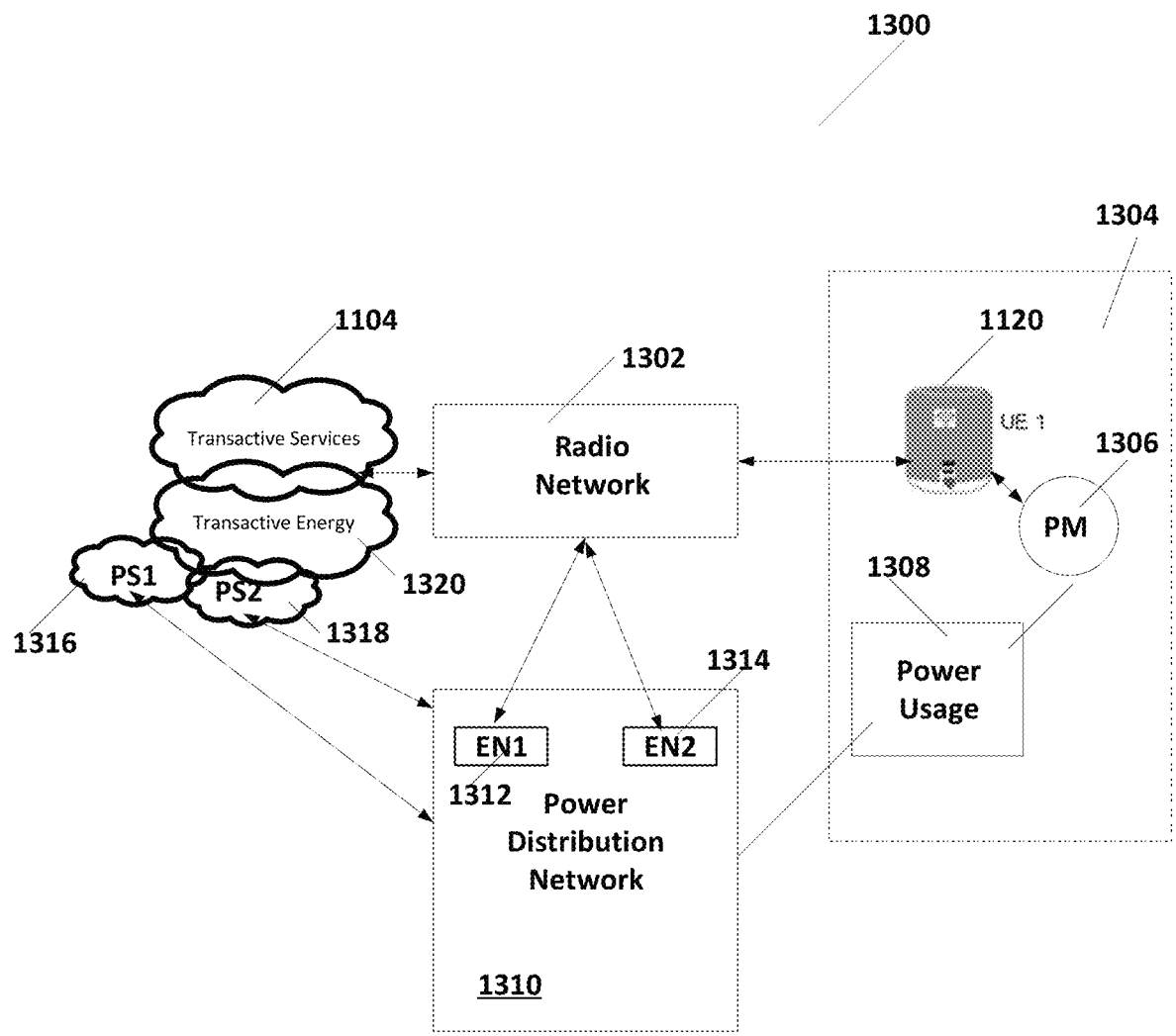
FIGS. 13A and 13B illustrates requesting energy services according to some embodiments.
Figure 13B:
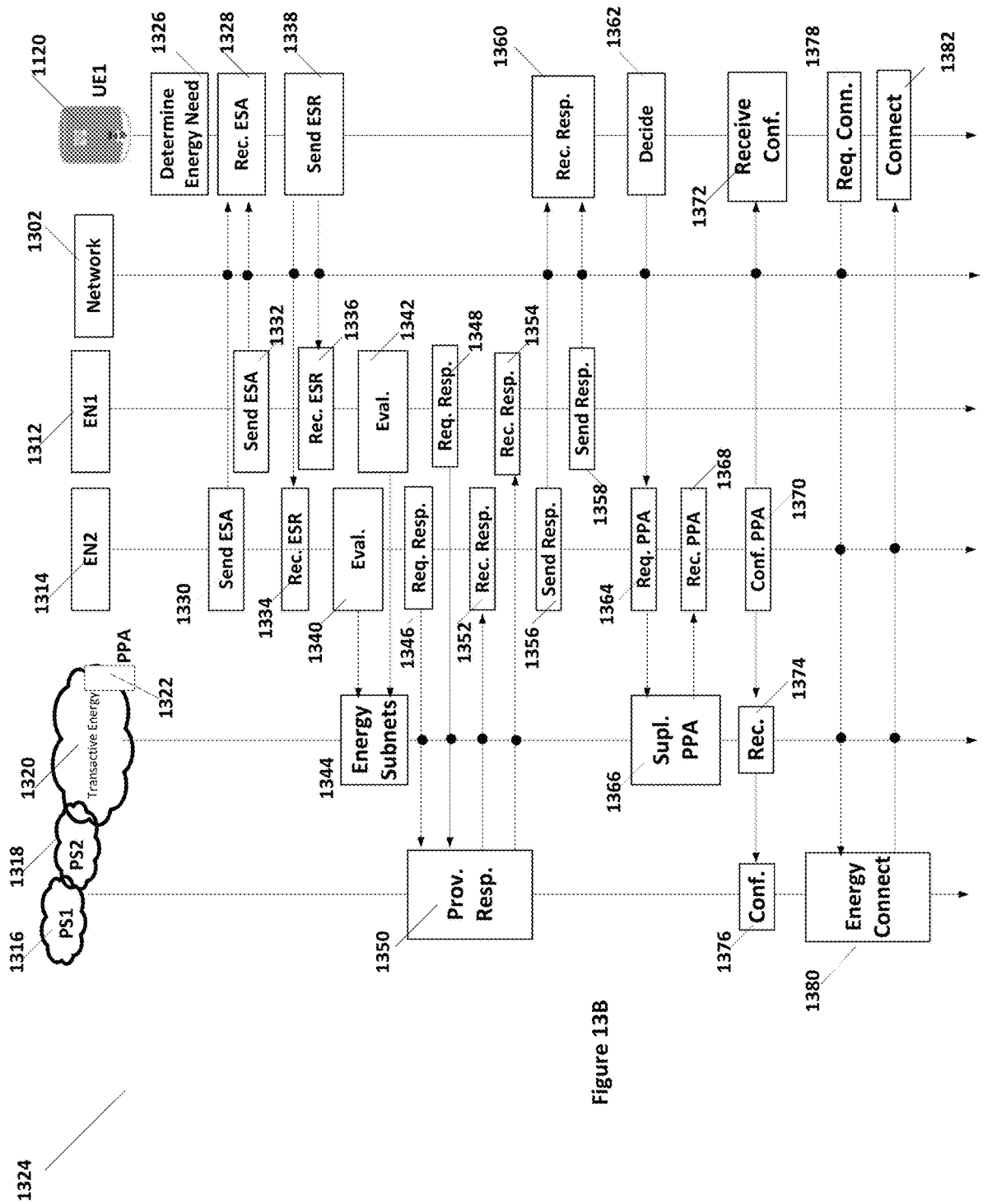

As illustrated in FIGS. 13A and 13B, the same secure and high fault tolerant Communications Platform infrastructure as illustrated in FIGS. 11 and 12A-12C can be used to connect energy supply and demand endpoints to create Power Purchase Agreements (PPA). FIG. 13A illustrates a networking environment that includes energy management according to some embodiments. As illustrated in FIG. 13A, radio network 1302 provides data services between an example UE1 1120 and cloud transactive services 1104. As is illustrated in FIG. 11, radio network 1302, UE1 1120, and transactive services 1104 form the illustrated network 1100.

As is illustrated in FIG. 13A, the example UE1 1120 is located at a particular user site 1304, which also includes power usage 1308. Power usage 1308 refers to the power receiving system for a particular site and may include power distribution panels and other equipment that distributes power to power usage devices (e.g., any device that uses power) throughout user site 1304. As has been discussed above, a smart power meter PM 1306 is coupled between power usage 1308 and UE1 1120 to monitor and report on the power usage at user site 1304.

As is further illustrated in FIG. 13A, a power distribution network 1310 is also provided. Power distribution network 1310 includes all of the power production, power distribution, and power management for a power grid system. As is further illustrated, power distribution network 1310 may include a series of energy nodes (EN) which manage energy devices where power is switched and routed to finally arrive at a power usage 1308 of a user site 1304. Many of the nodes that are included in power distribution network 1310 may include energy devices, such as solar panels, wind power generators, and battery storage devices. In FIG. 13A, EN1 1312 and EN2 1314 are illustrated. Although there may be many such devices in power distribution network 1310, only two are shown here for simplicity. EN1 1312 and EN2 1314 may be network gateway devices such as gateway device 880 illustrated in FIG. 8D and gateway device 950 as illustrated in FIG. 9E. In some embodiments, EN1 1312 and EN2 1314 may be integrated as discussed further below to include network component functionality such as CU, DU, or RU functionality. EN1 1312 and EN2 1314 are coupled to radio network 1302, either directly to RU devices, to DU devices, or to CU devices. EN1 1312 and EN2 1314 are also coupled with power components (e.g., energy producers, energy switching devices, etc.) that route power through a power grid (or Power Network) to an end user.

As is further illustrated in FIG. 13A, transactive services 1104 coupled to radio network 1302 include a transactive energy services 1320 where service providers PS1 1316 and PS2 1318 are connected. Again, there may be many such service providers, however only PS1 1316 and PS2 1318 are illustrated for simplicity.

FIG. 13B illustrates a procedure 1324 operating between UE1 1120, network 1302, EN1 1312, EN2 1314, and transactive services 1104 according to some embodiments. Procedure 1324 is an example process for providing a Power Purchase Agreement (PPA) to provide power to user site 1304. Further, in 13B a routing through a network device is designated by a heavy connection symbol "•".

As illustrated in FIG. 13B, UE1 1120 determines an energy need in step 1326. Since, as discussed above, UE1 1120 monitors the power usage at user site 1304 and can anticipate user power needs. In step 1328, UE1 1120 receives energy service available beacons (ESAs) from network devices in power distribution network 1310. In some examples, UE1 1120 pings for energy services available. In the simplified example of FIG. 13B, EN1 1312 in step 1332 provides an ESA to step 1328 of UE1 1120 and EN2 1314 provides an ESA in step 1330 to Step 1328 in UE1 1120.

In step 1338, UE1 1120 can send an energy service request (ESR) to step 1334 of EN2 1314 and to step 1336 of EN1 1312. The ESR sent in step 1338 can include requested service parameters such as kWh X, Price A, Start Time, End Time and any other parameters necessary to define the energy services. As such, UE1 1120 can request a level of power usage over a long period of time or may request power levels over a short duration, for example providing power to charge an EV at specific times.

As is illustrated in FIG. 13B, once EN1 1312 receives the ESR in step 1336, then EN1 evaluates the request in step 1342. Similarly, once EN2 1314 receives the ESR in step 1334, then EN2 evaluates the request in step 1340. The evaluation performed in steps 1340 and 1342 includes each of EN1 and EN2 determining a subnet of nodes in power distribution network 1310 to route the requested power to user site 1304. Once each of steps 1340 and 1342 arrives at a subnet of nodes that fulfill the ESR, the subnet is transmitted to step 1344 of transactive energy cloud 1320. EN2 1314 the request a service response in step 1346 and EN1 1312 requests a service response in step 1354. As illustrated, the service providers PS1 1316 and PS2 1318 receive the request for a response from step 1346 and 1348 in step 1350 and provides responses to step 1352 of EN2 1314 and step 1348 of EN1 1312.

As illustrated in FIG. 13B, EN2 1314 sends the received response in step 1356 to UE1 1120 and EN1 1312 sends the receive response to UE1 1120 in step 1358. The responses are received by UE1 1120 in step 1360. Then, UE1 1120 decides between the responses in step 1362. Once the decision is made, in step 1362 UE1 1120 sends an acceptance to the winning response. In this example, the response from EN2 1314 is the winning response. Consequently, step 1362 informs step 1364 of EN2. Step 1364 of EN2 then contacts step 1366 of transactive energy 1320 to request a PPA. The PPA is then received in step 1368 of EN2 1314. In some embodiments, the losing responses may be explicitly declined. Alternatively, the gateways with the losing responses may time-out.

Once the PPA is received in step 1368 in EN2 1314, then EN2 confirms the PPA in step 1370. This confirmation is sent to step 1372 in UE1 1120 and to step 1374 of transactive energy 1320 and to step 1376 of service providers 1316 and 1318. In step 1374 of transactive energy 1320, the PPA is recorded in the PPA database 1322, irrefutably recording the contract.

In step 1378 of UE1 1120, UE1 1120 requests commencement of the PPA to step 1380 of the service provider. In step 1380, the winning service provider provides a connect message to step 1382 of UE1 1110 indicating commencement of services according to the PPA.

A set of processes and methods that is presented above in FIGS. 12A, 12B, and 12C with the example network 1100 illustrated in FIG. 11 illustrate the creation and maintenance of dynamic per-user subnets within a wireless access network according to some embodiments. As discussed, each of these subnets are created with specific performance parameters, each serving a user's specific need at a specific time. The subnet performance parameters are modified as the user's service needs changed. Network 1100 dynamically reconfigures the network topology through reconfiguration of network elements to be mesh gateways, mesh routers, and mesh clients with different network connections maintaining all per-user subnets and to redistribute traffic as the network condition require. Such reconfiguration, as discussed above, can rebalance the traffic flow pattern to maximize the mesh network performance. This can also be used to extend the mesh network range coverage. Further, as is discussed above, network 1100 can recover from communication link failures to provide self-organized, self-optimized, and self-healed wireless mesh access network capabilities previously not available in cellular radio access networks.

Further described above is a set of processes and methods to aggregate multiple subnets to form virtual channel bandwidth, which is potentially bigger than any individual Radio BS can support. This effectively eliminates maximum bandwidth limitation from the Radio BS network. With each UE gateway capable of receiving bandwidth from multiple subnets, the maximum bandwidth is limited only by the available bandwidth from network devices that are within radio range of the UE gateway.

Additionally, a set of processes and methods to provide a fault tolerant connectivity infrastructure connecting service providers and service consumers is discussed, with respect to FIG. 12A, for example. These procedures facilitate communication between network elements and enables transactive service agreements between service providers and service consumption endpoints. As is illustrated in FIGS. 12A and 12C, Transactive Communications service agreements, and other transactive service agreements are facilitated. Further, as is illustrated in FIGS. 13A and 13B, the establishment of transactive energy service agreements (e.g., PPAs) is enabled when incorporated with a power distribution network.

In some embodiments, the methods disclosed above may be built on top of a high-performance fast signal locking radio that enables a high-performance radio system that can support multiple per-user subnet channels each with specific performance characteristic such as bandwidth, latency, and BER dynamically balancing between channel performance, bandwidth, and coverage range. Such network devices are enabled in a stackable radio communicating device modules with a center connection core, equipped with a PCIe bus, that can be deployed as part of the host gateway or as a remote unit with or without a companion solar power device module, also stackable with other device modules.

Figure 14A:
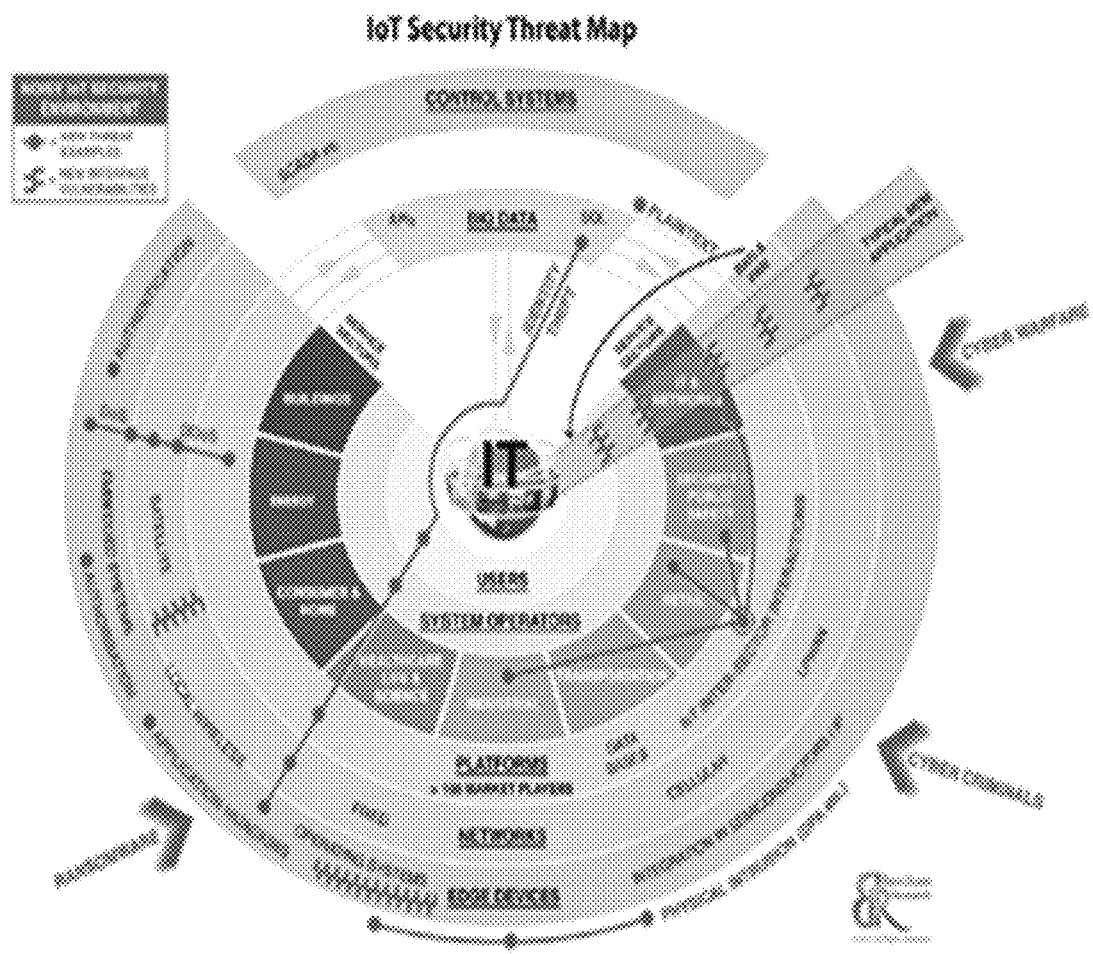
FIG. 14A illustrates network devices exhibiting Open Connectivity Foundation (OCF) communications integrated with a Known Communication Network (KCN) registry according to some embodiments.

Another aspect according to the present disclosure is the institution of security services to a radio network such as radio network 1100 illustrated in FIG. 11. In particular, the linking of IoT devices to UE gateways of radio network 1100 provides a large security risk. In 2015 the IoT Security Foundation was launched to bring industry focus on the security requirements of deploying IoT devices. It released an IoT Security Thread Map which is included here as FIG. 14A, which illustrates an IoT Security Thread Map. (Robin.Duke-Woolley and Syed Zaeem Hosain, "Security for the Internet of Things: Introduction," Beecham Research Ltd., December 2015). It is clear from the map illustrated in FIG. 14A that the IoT security threads are many and complex. Many articles have speculated on how these security issues can be solved, but no practical and cost-effective solutions have come to the market to address the broad issues outlined in FIG. 14A as yet. (Fagan et al., NISTIR 8259). The IoT Security Thread Map of FIG. 14A illustrates various threats to networks from IoT devices connected to the network.

Figure 14B:
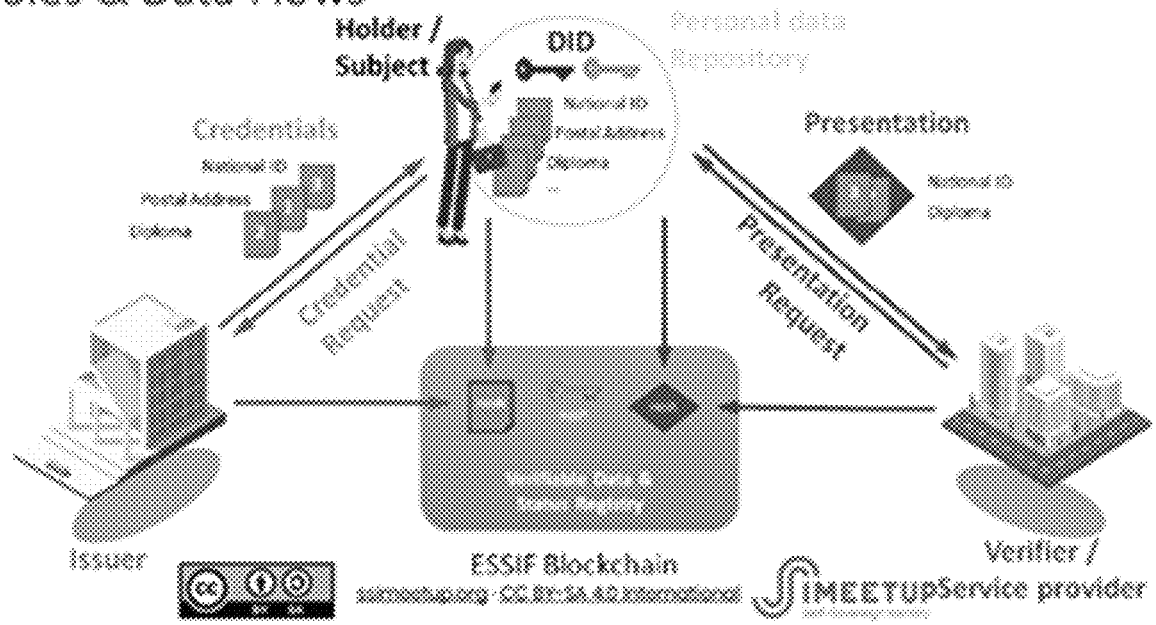
FIG. 14B illustrates the European Self-Sovereign Identity Framework (ESSIF) function overview for providing security involving IoT devices.

FIG. 14B provides an European Self-Sovereign Identity Framework (ESSIF) Functional Overview that summarizes the high-level functional requirements of an ESSIF to create and manage identity including IoT device identities. This was released by the European Blockchain Partnership (EBP) in July 2019. (Daniel.Du.Seuil, "European Self Sovereign Identity Framework," June, 2019 [retrieved from wwwyeesceuropa.eu on Sep. 11, 2020)). It is apparent from FIG. 14B that the focus is rather narrow on identity creation and verification. While identity management is important, it has yet to present solutions to address the broad security issues outlined in the IoT Security Thread Map illustrated in FIG. 14A.

Figure 14C:
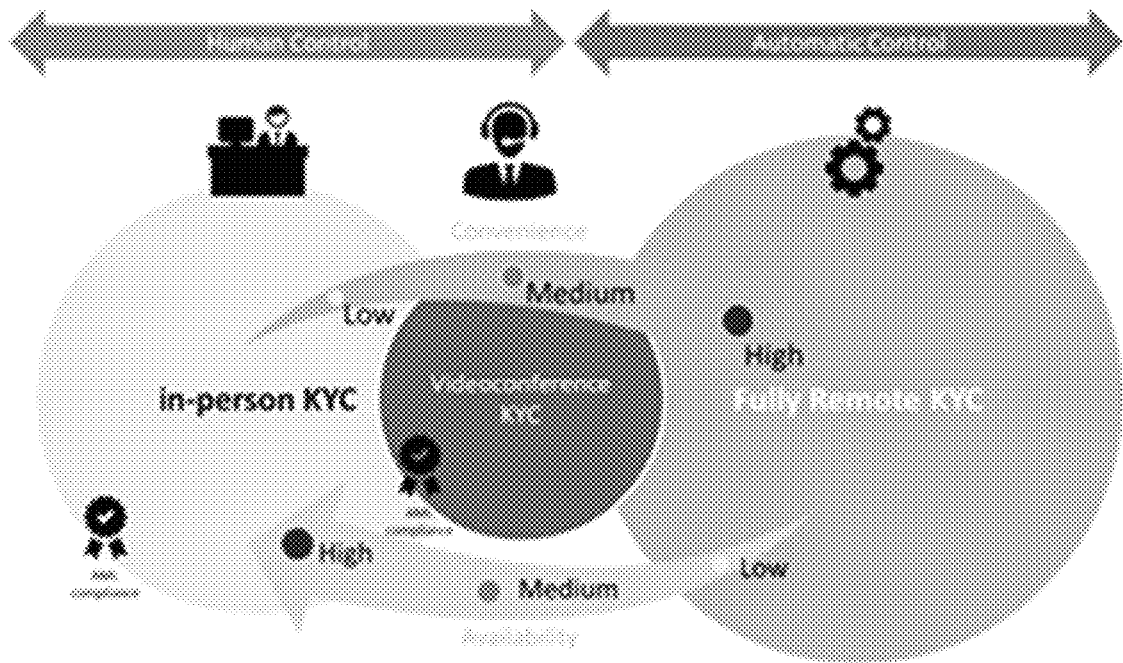
FIG. 14C an in-person Know-Your-Customer (KYC) versus remote KYC approach to security according to some embodiments.

In 2001 Know Your Customers (KYC) laws were introduced as part of the Patriot Act, which was passed after 9/11 to provide a variety of means to deter terrorist behavior and to stop money laundering. In essence, the law was created to urge banks and financial institutions to get closer with their customers and their banking activities to assess if they pose any unusual behavior and represent terrorist thread. While the majority of the KYC practices were done in-person, FIG. 14C (In-Person KYC vs. Online KYC) from Global Banking and Finance Review, "Remote KYC: A Competitive Advantage for Mobile Only Banking," February, 2017 [retrieved from www.GlobalBankingandfinance.com on Sep. 11, 2020], illustrates the feasibility and effectiveness of automating KYC measures online. In view of the broad threat vectors outlined in the IoT Security Thread Map of FIG. 14A, and the narrow focus of the European Blockchain Partnership (EBP) as summarized in the ESSIF Functional Overview illustrated in FIG. 14B, more innovations such as the KYC technique are urgently needed to mitigate the emerging IoT security issues.

Figure 15A:
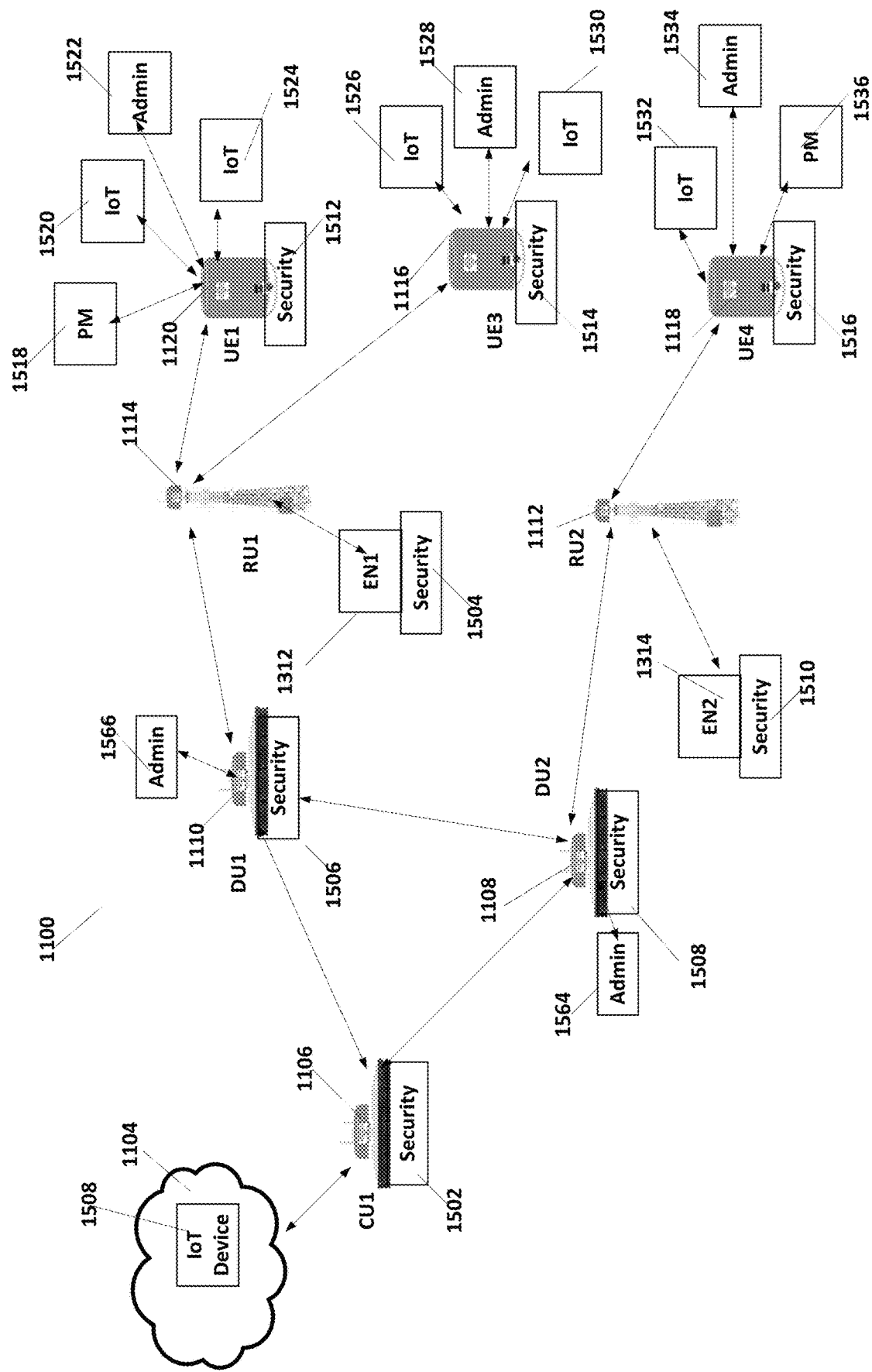
FIG. 15A illustrates security aspects in the network illustrated in FIG. 11 according to some embodiments

FIG. 15A illustrates a secured network environment on network 1100 according to the present invention. The example network 1100 illustrated in FIG. 11 is used for illustration of the security protocols according to some embodiments of the present disclosure. As illustrated in FIG. 11 and FIG. 15A, CU1 1106 is coupled to a cloud service 1104 and to DU1 1110 and DU2 1108. In the example provided here, DU2 1108 is further connected by radio link to DU1 1110. DU1 1110 is connected by radio link to RU1 1114. DU2 1108 is connected to RU2 1112. RU1 1114 is connected to UE1 1120 and to UE3 1116. RU2 1112 is connected to UE4 1118. These network devices have been discussed above with reference to FIG. 11 and FIG. 13A.

As illustrated in FIG. 15A, UE1 1120 is connected to a series of local end-point devices. As shown in the example of FIG. 15A, UE1 1120 is connected to IoT devices 1520 and 1524 and a smart power meter 1518. An administrative device 1522, which is a UE device such as a cell phone, laptop, tablet, or other computer, is also connected to UE1 1120 locally or remotely via network 1100. Similarly, UE3 is connected to IoT devices 1526 and 1530 as well as administrative device 1528. Additionally, UE4 1118 is connected to IoT 1532, PM 1536, and administrative device 1534. As has been discussed above, any of UE1 1120, UE3 1116, and UE4 1118 may themselves be connected to other gateways that themselves are connected to further devices. Those connected gateways can also be included in the security system as described below.

As is further illustrated in FIG. 15A, UE1 1120 includes a security DM 1512. UE3 1116 includes a security DM 1514. UE4 1118 includes a security DM 1516. DU1 1110 includes a security DM 1506. DU2 1108 includes a security DM 1508. CU1 1106 includes a security DM 1502. Each of these security DMs include a security store that stores device IDs and a KCN registry with smart predictive device profiles as is further discussed below. KCN registries can be classified as Root KCN registries and Abstracted KCN registries. In some examples, a Root KCN registry with smart predictive device profiles can be part of security DMs 1512, 1514, and 1516 implemented in each UEs 1120, 1116, and 1118, for example, to protect and manage all connected devices connected to each UE. A Root KCN registry with smart predictive device profiles can also be part of the security DM 1502 implemented in each CU 1106 to protect and manage all DUs, RUs, and UEs connected to CU 1106. An Abstracted KCN registry can be part of the security DM 1508 and 1506 implemented in each DU 1108 and 1110, respectively, to consolidate, summarized, and abstract Root KCN registries associated with UEs connected to the DU. In addition, an Abstracted KCN registry can also be part of the security DM 1502 implemented in CU1 1106 to consolidate, summarize, and abstract Abstracted KCN registries associated with DUs 1108 and 1110 connected to CU 1106.

As is illustrated in FIG. 15A, security DM 1506 of DU1 1110 include a root KCN registry or may be an Abstracted KCN registry. Similarly, security 1508 of DU2 1108 may include a root KCN registry or an abstracted KCN registry. Alternatively, DU1 1110 and DU2 1108 can, for example, be Blockchain "light nodes" and are charged with maintenance of Abstracted KCN registries. Consequently, the KCN block chain registries are administered in DU1 1110 and DU2 1108. Additionally, administrative devices may be attached to DU1 1110 and DU2 1108 to allow a system administrator to access services on DU1 1110 and DU2 1108. In some cases, a physical device may be attached to the DU or the UI of DU may suffice. The Root KCN registries with smart predictive device provides in UE1 1120, UE3 1514, UE4 1118, and CU1 1106 may be Blockchain "full nodes," as is discussed further below. In general, CU1 1106 may include an abstracted KCN registry while gateways UE1 1120, UE3 1514, and UE4 1118 may include root KCN registries, otherwise known as Blockchain "root nodes". In general, all root nodes may be implemented as Blockchain "full nodes" that originate the Blockchain registries.

As is further illustrated in FIG. 15A, energy gateway devices EN1 1312 and EN2 1314 are further illustrated. Energy gateway device EN1 1312 is illustrated as coupled to RU1 1114 while energy gateway device EN2 1314 is illustrated as being coupled to RU1 1114. As is further illustrated, EN1 1312 includes a security DM 1504 and EN2 1314 includes a security DM 1510. The security DMs associated with each of the network devices includes security stores that include KCN registries and device IDs that are coupled to those devices.

Embodiments according to this disclosure may employ the KYC principal in that the devices are known and recorded in a KCN registry. Embodiments may rely on the user at each of gateway devices UE1 1120, UE3 1116, and UE4 1118 to authorize the devices attached to them and to learn from the devices themselves what other devices they typically communicate with. As is discussed further below, UE1 1120 is coupled to administrative device 1522 that functions to register each of the devices. Similarly, UE3 1116 is coupled to administrative devices 1528 and UE4 1118 is connected to administrative device 1534. If someone tries to hack the device, it will likely be originated from outside the usual communication circles. Network 1100 can then detect such a situation and deal with it appropriately. If one of the devices attached to a UE gateway were compromised somehow, for example turned into part of a botnet, used to launch a denial-of service attack (DDoS), or other activity, the affected UE gateway can break communications between the affected device with Network 1100 to disrupt the hacking activity and alert the appropriate user and network operators.

As discussed above, when a UE gateway DM is installed and registered with wireless mesh network 1100, the user administration device, typically a smartphone or PC, is associated with the Gateway DM. The administration device will be consulted, if needed, for authorization of admitting new devices to and protected by the Gateway DM. For example, UE1 1120 is connected to administrative device 1522 which is used by a user to authorize DMs in UE1 1120 as well as devices attached to UE1 1120. Similarly, when a network device such as a UE gateway, an RU, or a DU is seeking authorization to join the network 1100, the associated CU security DM will relay the request to the associated CU administration device. A CU can only be authorized to join the network 1100 by the network 1100 administrator.

As discussed in further detail below, embodiments according to this disclosure provide a collection of methods, processes to maintain a secure identity registry, and a Known Communicators Network (KCN) registry with smart predictive device profiles in a secure data store. As illustrated in FIG. 15A, each of security DMs in the network (e.g. security DM 1512 of UE1 1120, security DM 1506 of DU1 1110) may include a security store that maintains device IDs and KCN registries, either root registries or abstracted registries, to maintain a blockchain. These embodiments control and track all transactions authorizing connected devices to join the identity registry and track the Known Communicators Network (KCN) activities for each of the device admitted to the registry to secure them. The secure data store is implemented with a streamlined Blockchain infrastructure implemented by the security DMs as illustrated in FIG. 15A, as outlined below.

A Blockchain can be rooted in each UE gateway to implement the Root KCN registry with smart predictive profiles to secure all connected devices that each UE gateway serves. A Blockchain can also be rooted in CU1 1106 to implement the Root KCN registry with smart predictive device profiles to secure all connected DUs, RUs, and UE gateways that it serves. In some cases, DUs connected to the UE gateways will join the Root KCN registries rooted in the UEs to summarize, consolidate, and abstract data from the Root KCN registries to form Abstracted KCN registries. In other cases, DUs may form Root KCN registries to manage RUs paired with the DU, UEs that it serves, and CUs that it relies on to connected to the upstream networks. Abstracted KCN registries will be joined by connected CUs to further summarize, consolidate, and abstract the registries at the CU. For example, in network 1100 as illustrated in FIG. 15A, UE1 1120 maintains a root KCN registry with smart predictive device profiles in security 1512. DU1 1110 can itself maintain a root KCN registry in security 1506 to replicate the KCN registry rooted in UE1 1120 or may maintain an abstracted KCN registry in security 1506. Further, CU1 1106 may keep an abstracted KCN registry from the root KCN registries on UE1 1120, UE3 1116, and UE4 1118.

The Blockchains supporting the Abstracted KCNs will operate in "light mode" to keep an essential subset of the transaction data while minimizing processing requirements. As illustrated in FIG. 15A, for example, DU1 1110 in security 1506 maintains the KCN registry in security 1506 to summarize and abstract all KCN transactions captured by EN1 1312 and by UE1 1120 and UE3 1116. As such, DU1 1110 requests registries from security DM 1504 of EN1 1312 and registries from security DM 1512 of UE1 1120 and DM 1514 of UE3 1116. As a consequence, all subtending DM's, and connected IoT devices that connected through UE Gateways are admitted to the network via the UE Gateway. Blockchain pruning can be managed periodically by all KCN registries to contain the processing and storage required to maintain the Blockchains.

Figure 15B:
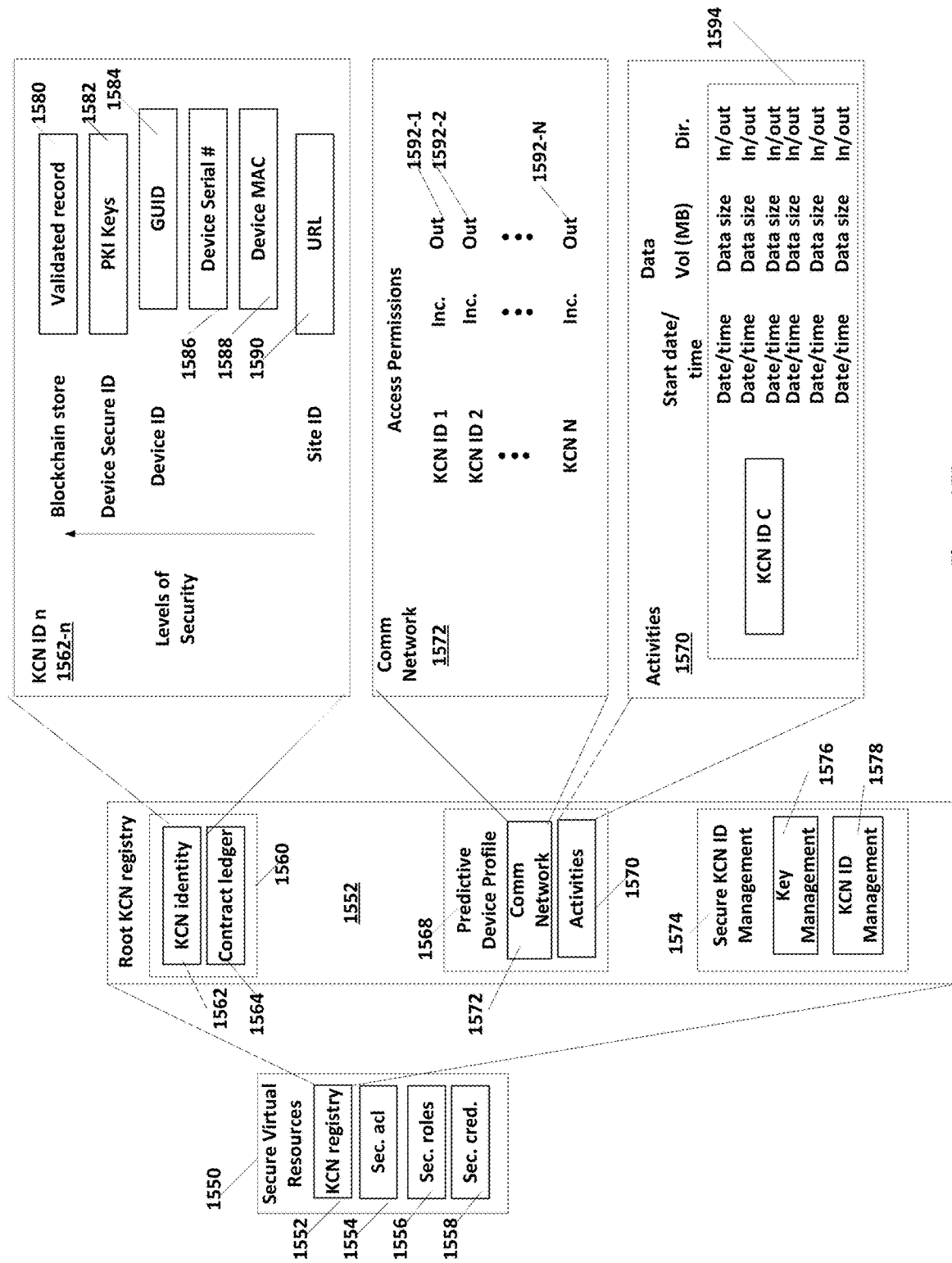
FIG. 15B illustrates a security block as illustrated in FIG. 15A for a root KCN registry according to some embodiments.

FIG. 15B illustrates an example of a security 1550. Security 1550 as illustrated in FIG. 15B illustrates a full node or root node such as security 1512, 1514, or 1516 that is kept on a UE/Gateway such as UE1 1120, UE3 1116, and UE4 1118, respectively, as illustrated in FIG. 15A. Security blocks for other network nodes such as those illustrated in FIG. 15A are discussed further below.

As illustrated in FIG. 15B, security 1550 can include a KCN registry 1552, a security access control list (ACL) 1554, security roles 1556, and security credentials 1558. An ACL 1552 provides a list of access control entities which identifies a entities that are allowed access and specifies the access rights allowed, denied, or audited for that entity. Security roles 1556 define the parameters allowing access to data, particularly defining privileges that are assigned connected devices.

FIG. 15B further illustrates KCN registry 1552 that illustrates a root KCN registry which may be provided on a UE gateway. KCN registry 1552 includes a block 1562 with KCN identities 1562, of which 1562-*n* for device n is specifically illustrated. In block 1562, one KCN ID for each device registered are provided. FIG. 15B illustrates KCN ID 1562-*n*, which provides the identification of a random device n of the N devices. As illustrated, KCN identity 1562-*n* provides identification for each device that includes multiple levels of security. At the low security level, the KCN identity 1562-*n* can include a Uniform Resource Locator (URL) 1590. Increasing in security, KCN ID 1562-*n* may include a device media access control (MAC) address 1588, a device serial number 1586, a globally unique identifier (GUID) 1584, a public key infrastructure (PKI) public key 1582, and a Blockchain validation 1580. KCN identity 1562 includes identifications for each device recorded in Root KCN registry 1552-*n*.

As is further provided in block 1560, KCN registry 1552 includes a contract ledger 1564. Contract ledger 1564 stores all of the contracts (e.g., transactive communications contracts, transactive energy contracts, or other contracts). In Root KCN registry 1552, full copies of the contracts may be stored for each of the devices having a KCN identity stored in KCN identity 1562.

As is further illustrated in FIG. 15B, KCN registry 1552 further includes a predictive device profile 1568. Predictive device profile 1568 includes a communications network list 1572 and an activities log 1570 for each device identified by a KCN identification stored in KCN identity 1562. As illustrated in FIG. 15B, communications network 1572 lists access permissions 1592 for each recorded KCN identification number (one for each communicator that communicates with device n). As an example, in FIG. 15B permissions 1592-1 through 1592-N are listed for KCN IDs 1 through N. As is illustrated, permissions are granted for incoming and output communications from each communicator with device n. In particular, some devices are allowed only sending incoming data to device n, other communicators have permissions for only receiving data from device n, and some are allowed both sending incoming data to and receiving outgoing data from device n.

As is further illustrated in FIG. 15B, activities log 1570 records in block 1594 all activities device n had associated with communicator KCN ID C. As shown in FIG. 15B, each communication with communicator KCN C by device n identified by KCN ID n is recorded by date and time, the amount of data transferred, and whether the data is incoming or outgoing from device n. By tracing the activities of device n with each communicator authorized in the KCN registry, it can be determined if abnormal activities are occurring and steps can later be taken to prevent malignant activities involving the device. Note that depending on the affiliation of the communicator with Network 1100, the associated KCN ID may not have the highest level of security as defined in KCN ID block 1562.

As is further illustrated in FIG. 15B, Root KCN registry 1552 may further include KCN ID management 1574. Management 1574 includes key management 1576 and KCN ID management 1578. Key management includes functions such as assigning unique IDs and security levels for each device. Further, KCN ID management 1578 insures that the device keys and other data are stored in the Root KCN registry 1552 and with registries on other connected devices.

Figure 16A:
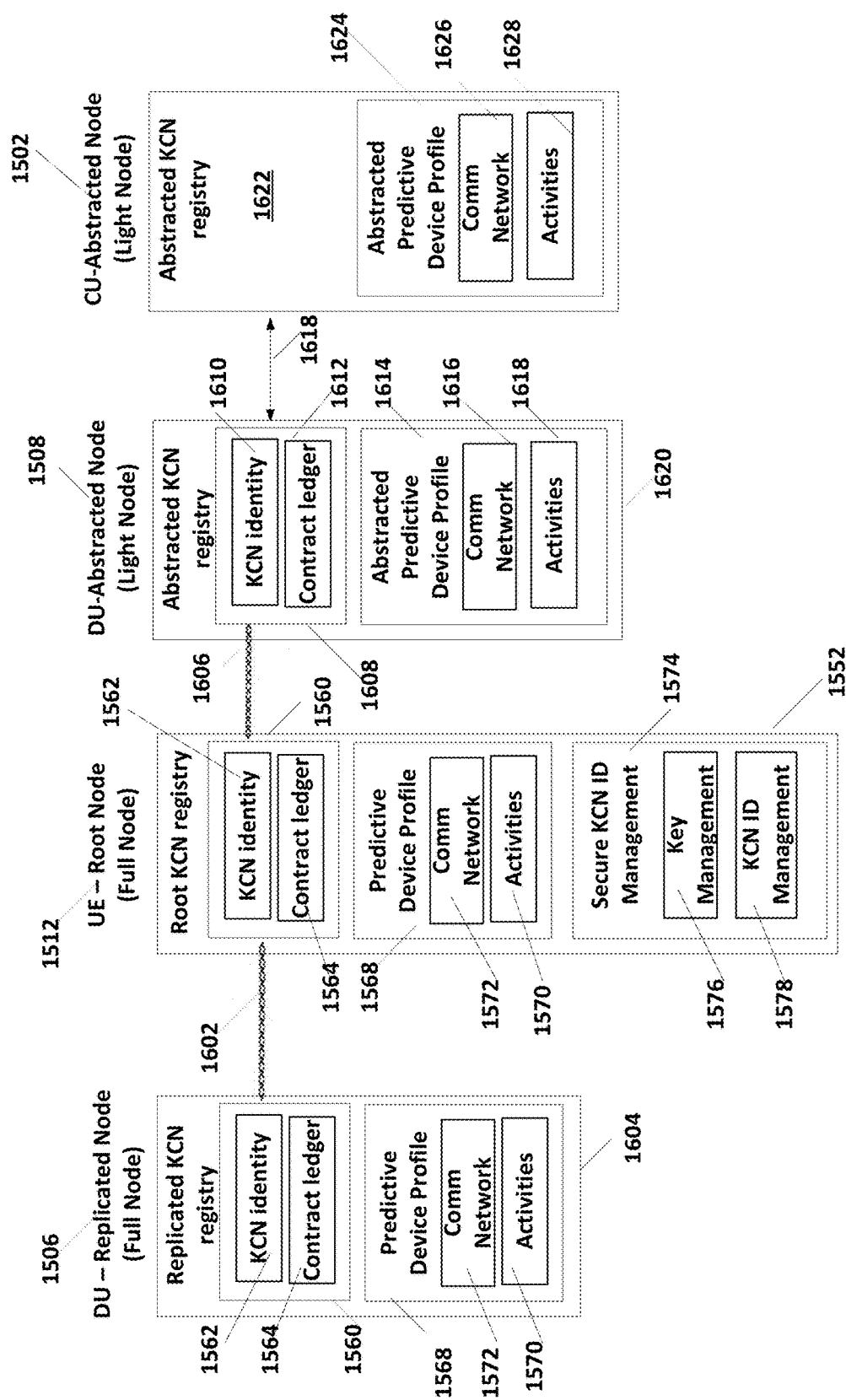
FIG. 16A illustrates secured links between various nodes with the root KCN registry according to FIG. 15B and with abstracted registries or replicated registries according to some embodiments.

FIG. 16A illustrates implementation of security 1550 as illustrated in FIG. 15B on example network nodes as illustrated in FIG. 15A. In the example illustrated in FIG. 16A, a root node 1552 as illustrated in FIG. 15B is implemented in security 1512 of UE1 1120; a replicated full node 1604 is implemented in security 1506 of DU1 1110; an abstracted (light node) registry 1620 implemented on security 1508 of DU2 1108; and a further abstracted light node 1622 implemented on security 1502 of CU1 1106. For privacy preferences, the UE gateway user can select to share all, a subset of, or none of the transaction data on the entire UE gateway or by each protected device coupled to the UE gateway.

As is illustrated in FIG. 16A, security 1512, UE root KCN registry 1552 is implemented with Blockchain "full node." As is illustrated, UE 1120 includes a blockchain secured link 1602 with DU1 1110 that implements security 1506. As discussed above, DU1 1110 implements a registry 1604 that replicates the KCN registry data captured by security 1512 of UE1 1120, which includes a copy of root KCN registry 1560 and predictive device profile 1568.

As is further illustrated, security 1508 of DU2 1108 includes an abstracted (light node) KCN registry 1620. DU2 1108 is coupled to UE 1120 through a Blockchain secured link 1606. As is illustrated, KCN registry 1620 illustrates an abstracted block 1608 with an abstracted contract ledger 1612 and KCN identity 1610. Block 1608 includes not the full data, but a subset of the data that is included in block 1560 of Root KCN registry 1552. Additionally, KCN registry 1620 includes an abstracted predictive device profile 1614 with an abstracted communications network 1616 and an abstracted activities list 1618. Abstracted KCN registry 1620 includes a subset and consolidated or abstracted version of the full data that is included in KCN registry 1552.

Further, in some cases, CU1 1106 includes security 1502 with a further abstracted KCN registry 1622. In the example illustrated in FIG. 16A, abstracted KCN registry 1622 includes an abstracted predictive device profile 1624 with abstracted communication network 1626 and activities list 1628. This abstracted data may be consolidated data without being attributed to a particular KCN ID, consequently data from block 1560 is not present.

Figure 16B:
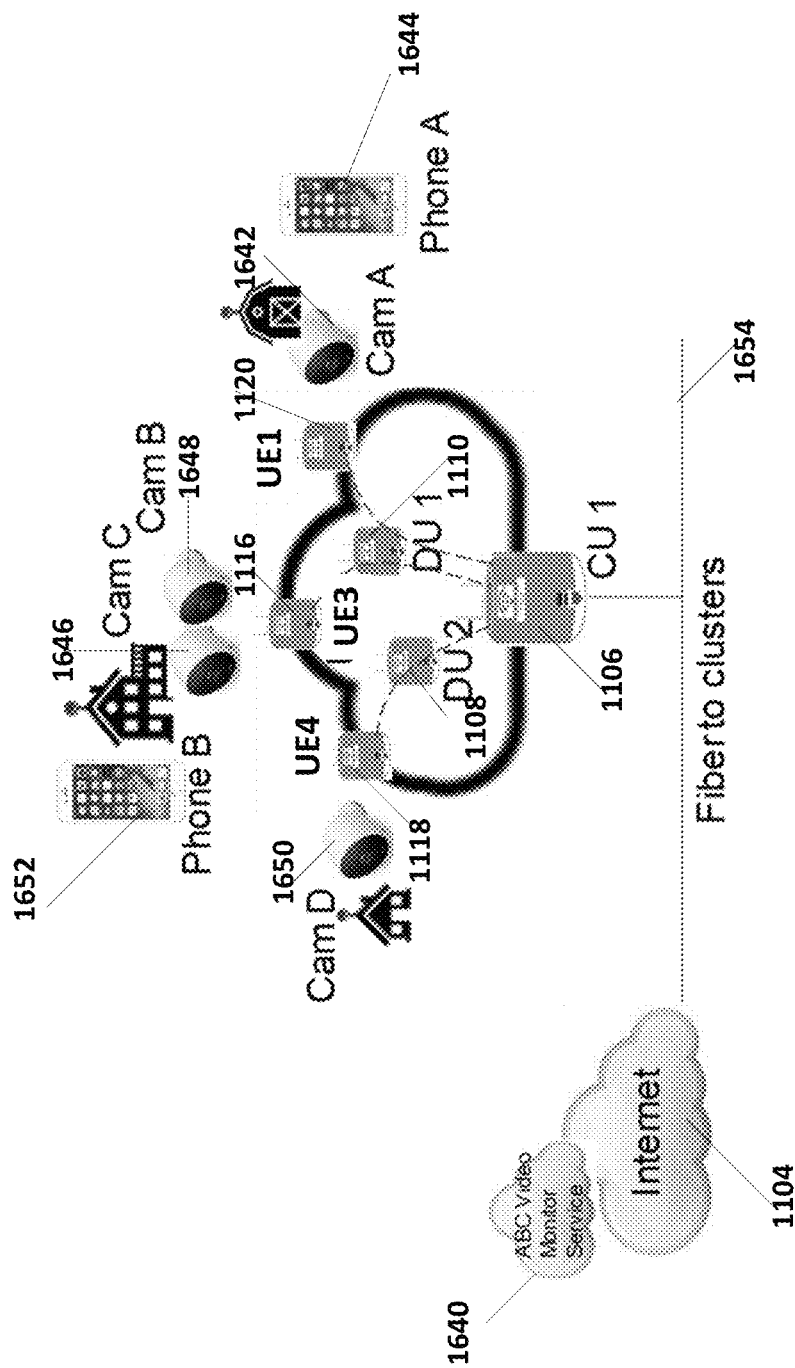
FIG. 16B illustrate an example security with Blockchain registries as illustrated in FIGS. 15B and 16A with an example network as illustrated in FIG. 15A

FIG. 16B further illustrates network 1100 as illustrated in FIG. 15A. As is illustrated, CU1 1106 is coupled through fiber connections 1654 to internet 1104, which includes video monitoring services 1640. As is illustrated in FIG. 16B, UE1 1120 is coupled through DU1 1110 to CU1 1106; UE3 1116 is coupled through DU1 1110 to CU1 1106; and UE4 1118 is coupled through DU2 1108 to CU1 1106. As illustrated in the example of FIG. 16B, UE1 1120 is therefore coupled to Cam A 1642 and to Phone A 1644. UE3 1116 is coupled to Cam C 1646 and Cam B 1648 as well as Phone B 1652. UE4 1118 is coupled to Cam D 1650.

In an example, UE1 1120 includes a root KCN registry 1552 where predictive device profile 1568 includes a profile for Cam A 1642 and therefore includes the device information (e.g., manufacturer, description—indoor/outdoor, model #), KCN ID (serial #, MAC address, etc.), contract services (monitor service 1640), permissions (upload only), network (LAN/WAN) access from phone A 1644, and other data.

UE3 1116 includes a root KCN registry 1552 with profiles for Cam C 1646 and Cam B 1648. The smart predictive profile from Cam C 1646 includes device information (e.g., manufacturer, description—indoor/outdoor, model #), KCN ID (serial #, MAC address, etc.), network (LAN/WAN) access from phone B 1652, OTA SW update from monitor service 1640, and other information. The smart predictive profile from Cam B 1648 includes device information (e.g., manufacturer, description—indoor/outdoor, model #), KCN ID (serial #, MAC address, etc), contract services (monitor service 1630), permissions (upload only), network (LAN/WAN) access from phone B 1652, OTA SW update from monitor services 1640, and other information.

UE4 1118 includes a root KCN registry 1552 with profiles for Cam D 1650. The smart predictive profile from Cam D 1650 includes device information (e.g., manufacturer, description—indoor/outdoor, model #), KCN ID (serial #, MAC address, etc), contract services (monitor service 1630), permissions (upload only), network (LAN/WAN) access from phone A 1644, and other information.

DU1 1110 includes an abstracted profile for Cam A 1642, Cam B 1648, and Cam C 1646. DU2 1108 includes an abstracted profile for Cam D 1650. CU1 1106 includes a further abstracted profile for Cam A 1642, Cam B 1648, Cam C 1646, and Cam D 1650.

Figure 16C:
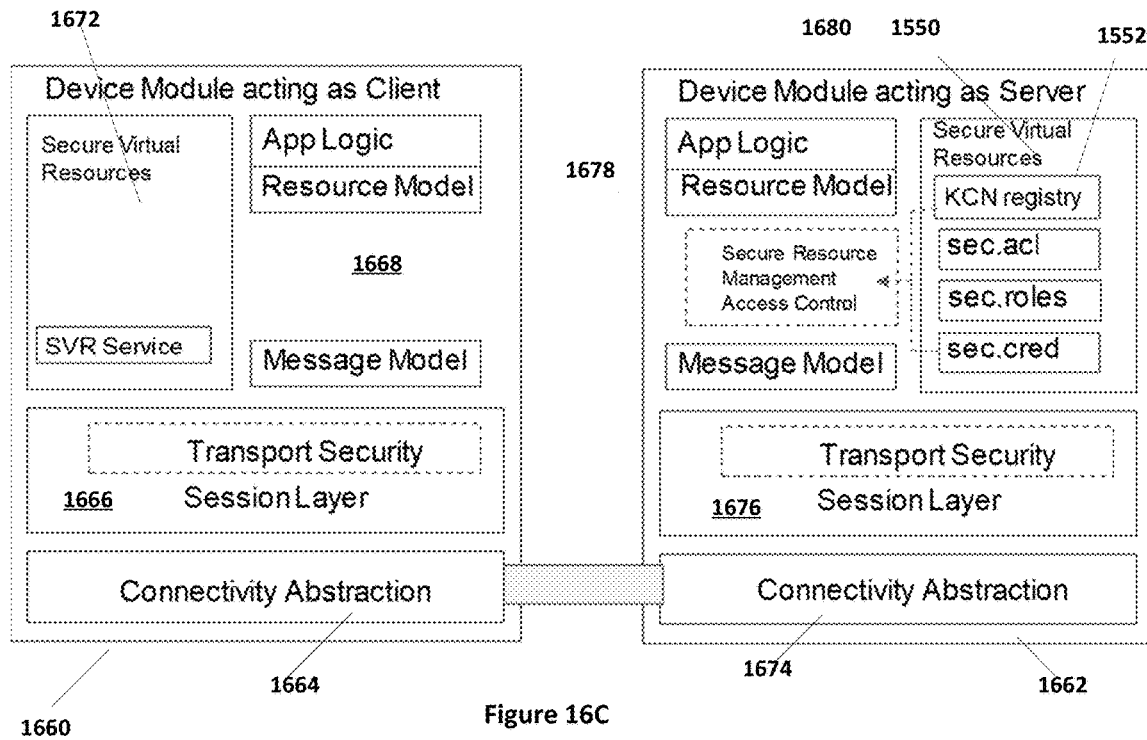
FIG. 16C illustrates network devices exhibiting Open Connectivity Foundation (OCF) communications integrated with a Known Communication Network (KCN) registry according to some embodiments.

In addition to the Blockchain security as illustrated above, communications between nodes can further utilize an Open Connectivity Foundation (OCF) security framework and data model as illustrated in FIG. 16C. The OCF approach to data communications and security is resource oriented, peer-to-peer architecture that abstracts definitions of communicating devices to appropriate transport channels with appropriate data structures. The OCF data model can operate over various communications protocol to transport data securely between devices. The OCF specification for version 2.2.0, released in July of 2020 can be retrieved from Open Connectivity Foundation, Inc. One skilled in the art will recognize that the current description is not limited to using the OCF foundation and that the OCF platform is used for exemplary purposes only. Other platforms for communications between devices can also be used.

FIG. 16C illustrates an example device 1660 interacting with a UE gateway device server device 1662. In this example, device 1660 may be an end-point device and therefore does not include a KCN registry while service device 1662 includes a root KCN registry 1550. Consequently, FIG. 16C may, as an example, illustrate interaction between smartphone as an Admin device 1522 and UE1 1120 trying to access an IoT device 1520, as illustrated in FIG. 15A. In this example, the smartphone Admin device 1522 follows the OCF secure client framework 1660 and UE1 1120 follows the KCN registry over OCF secure server framework 1662.

As is illustrated in FIG. 16C, server device 1662 includes a connectivity abstraction block 1674, a transport security session layer 1676, an application logic block 1678, and a secured virtual resources block 1680. Similarly, device 1660 includes a connectivity abstraction block 1664, a transport security session layer 1666, an application logic block 1678, and a secure virtual resources block 1672. In operation, device 1660 first establishes a network connection with server 1662 between connectivity abstraction 1664 of device 1660 and connectivity abstraction 1674 of server 1662. Device 1660 can then exchange messages, with or without a mutually authenticated secure channel, with server 1662 between transport security session layer 1666 of device 1660 and transport security session layer 1676 of server 1662.

In the case of secured transmission, server 1680 authenticates and maintains security with KCN registry 1552 of security 1552, along with standard OCF security protocols. Application logic 1668 of device 1660 includes a resource model and message model that allows its operation. Application logic 1678 of server 1662 includes resource modeling and message modeling as well as secured resource management to handle Blockchain security 1550. Consequently, in accordance with embodiments of the present invention, as illustrated in FIG. 16C, the Blockchain security is included with the OCF security protocols to provide a Blockchain security link between device 1660 and server 1662.

Figures 17A, 17B, 17C:
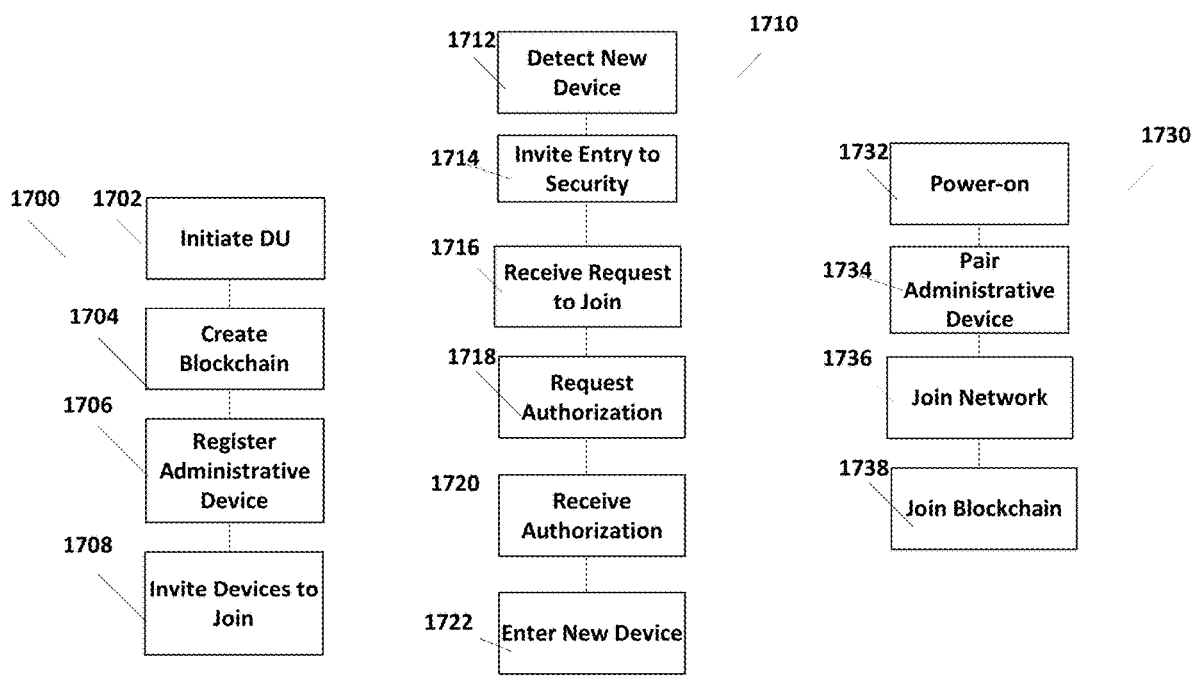
FIG. 17A illustrates initiation of a distributed unit into the security network illustrated in FIG. 15A.
FIG. 17B illustrates operation of the distributed unit to register a new network device according to some embodiments.
FIG. 17C illustrates power-on and onboarding of a gateway device into the security network illustrated in FIG. 15A according to some embodiments.

FIGS. 17A, 17B, and 17C illustrate initialization of devices into the network illustrated in FIG. 15A. At system initiation time of a DU, after the Blockchain is created, registers an administration device. All CU's, DU's, RU's and UE Gateways the DU connects to will be invited to join the DU Blockchain and each of these invitations will be authorized by the DU system administrator through the administration device. FIG. 17A illustrates an initiation process 1700 of a DU, for example DU1 1110 as illustrated in FIG. 15A. As illustrated in FIG. 17A, in step 1702, the DU is initiated. For purposes of discussion, DU1 1110 will be used as an example. In step 1704 the DU creates a Blockchain, which for DU1 1110 includes creating secure virtual resource block 1568 as illustrated in FIG. 15B or 15C including creation of a KCN registry. In step 1706, the DU registers an administrative device that will be used to authorize actions performed on the DU, including initialization of other network devices into the Blockchain. For example, as illustrated in FIG. 15A administrative device 1566 is registered to DU1 1110. This registration process can be accomplished by a network administrator working with DU1 1110. In step 1708, the DU then invites other network devices to join the Blockchain created by DU1 1110.

Step 1708 includes multiple sub-steps. First, the DU will pair itself with accessible RUs and invite them to join. Second, it will announce the combined DU/RU capabilities, such as bandwidth, to join accessible CU clusters. If one CU can serve the combined capabilities, the DU will join that CU cluster and invite that CU to join its KCN registry. Else, the DU will join multiple CU clusters and invite all the associated CUs to join its KCN registry forming the potential virtual radio BSs that the DU is part of. Once that is done, the DU will broadcast Service Available signal to the area and wait for UE requests. The DU will then invite the UE that it is serving to join its KCN registry.

FIG. 17B illustrates a process 1710 for joining further devices to the Blockchain administered by the DU device, for example DU1 1110 as discussed above. As illustrated in FIG. 17B, in step 1712 a new device is requesting service and detected by the DU. For purposes of this example, process 1580 may be operated on DU1 1110 and the detected device that is requesting service can be UE1 1120 and agreement has been reach that DUE 1110 will render to requested service to UE1 1120. In addition, this is the first time DU1 1110 is serving UE1 1120, in step 1714, DU1 1110 invites UE1 1120 to join the Blockchain maintained by DU1 1110. In step 1716, DU1 1110 receives a request to join from UE1 1120. In step 1718, DU1 1110 requests authorization from admin device 1566. In step 1720, the authorization is received from administrative device 1566. In step 1722, DU1 1110 enters UE1 1110 into the Blockchain. It should be noted that steps 1718 and 1720 are only needed if in step 1716 UE1 1120 indicates that this is the first time UE1 1120 is joining the network 1100.

After a UE Gateway such as UE1 1120 has been accepted into the Blockchain of a DU such as DU1 1110, the UE Gateway can then create its own root directory to securely join devices connected through it to the communications network that includes the DU. For purposes of this example, specific discussion of interaction between DU1 1110 and UE1 1120 is provided. However, one skilled in the art will recognize that the processes are applicable to any DU and UE combination.

As has been discussed above, when UE 1120 is first powered up, a Root KCN registry is created and an administrative device 1522 is registered to UE1 1120. Administrative device 1522 is usually a smartphone or a tablet or a PC. At the time the UE is registered and first powered up, the user provides either a cellular number or an email address for the registration of an administration device for the UE. An administration device registration message will then be sent to either the cellular number or email address provided by the user. The user can then register administration devices desired by responding to the administration device registration message. Only a small, limited number of devices will be registered as administration devices for a particular UE such as UE1 1120. All referred devices coupled to the UE need to be authorized by the user via the designated administration device associated with the UE. FIG. 17C illustrates start-up process 1730 of a UE, using UE1 1110 as an example. As illustrated in FIG. 17C, in step 1732 UE1 1120 is powered on. In step 1734, UE1 1120 creates a Root KCN registry and pairs with an administrative device by registering it in the KCN registry as the administration device. As illustrated in FIG. 15A, administrative device 1522 is paired with UE1 1120. In step 1736, UE1 joins network 1100, for example as is illustrated in FIG. 17C. In step 1738, UE1 joins the Blockchain by requesting entry of DU1 1110. Consequently, in step 1738, a gateway DM on UE1 1120 can send a device ID and KCN registry to DU1 1110 to register UE1 1110 to the Blockchain network.

The KCN registry, for example registry 1552 on FIG. 15B, captures all communication partners to and from devices connected to the UE gateway, for example UE1 1120, for a device initialization period as defined in a system configuration preference. Once the period expires, the system will notify the user who authorized the particular device via the designated administration device about the completion of the KCN initialization period, the actual KCN list of known communicators for authorization to lock down the KCN or extend the initialization period. This process is further illustrated below with respect to FIGS. 18A and 18B.

Once the KCN registry for a particular device, for example Cam B 1648 as illustrated in FIG. 16B, is locked down, all communications TO and FROM the Cam B 1648 connected to the UE gateway, UE 3 1116 as illustrated in FIG. 16B, will be checked against the local root KCN registry. If not registered locally, the upstream Abstracted KCN registries in upstream DU1 1110 will be checked. If not registered in any of the upstream DUs that serve UE3 1116, the Abstracted KCN registries of upstream CUs serving UE3 1116 will also be checked. Communications will be allowed if the communicator is listed in any of the KCN registries associated with the specific device, otherwise the communication request may be sent to the user for direction if that is the option the user chose when authorizing the Cam B camera 1642 connected to UE1 gateway 1120. If the communication is found in the Abstracted KCN, the local Root KCN registry will be updated. If the user is contacted and the user explicitly allows the current transaction, the request will go through and the KCN registry updated, otherwise the transaction will be denied, and an exception logged. If the user elected to leave the KCN opened, the system will not LOCK down the KCN and will authorize all transactions and log the activities. This may be useful in the case of a PC device that visits many different sites and the user can look into the KCN table periodically manually if needed.

As discussed above, in some embodiments, the KCN registry is maintained in addition to industry accepted security platforms such as the Open Connectivity Foundation (OCF) security framework that provides device identity management, resource access control and transport security infrastructure. FIG. 16C above illustrates an example infrastructure with a KCN registry incorporated into an OCF security framework. The OCF security framework provides the Secure Virtual Resource infrastructure to support security resources, such as identity management, resource access control and secure transport services. The KCN registry can be integrated as a Secure Virtual Resource accessed through the OCF Resource Model. Alternatively, Blockchain DMs can be standalone without operating within a security platform such as the OCF security framework.

Figure 18A:
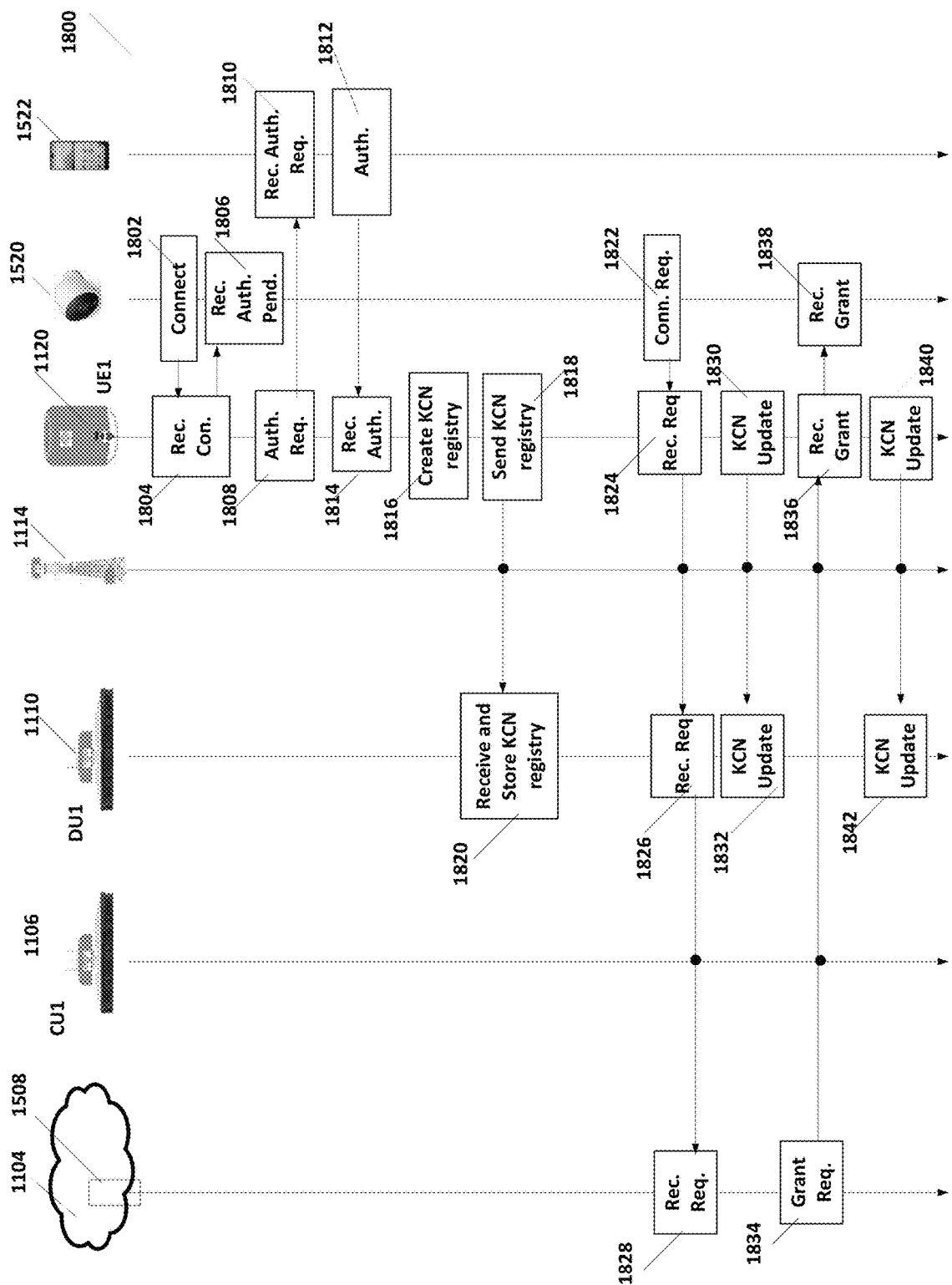
FIGS. 18A and 18B illustrate a process for registering and maintaining an example IoT device in the secured network environment illustrated in FIG. 15A.
Figure 18B:
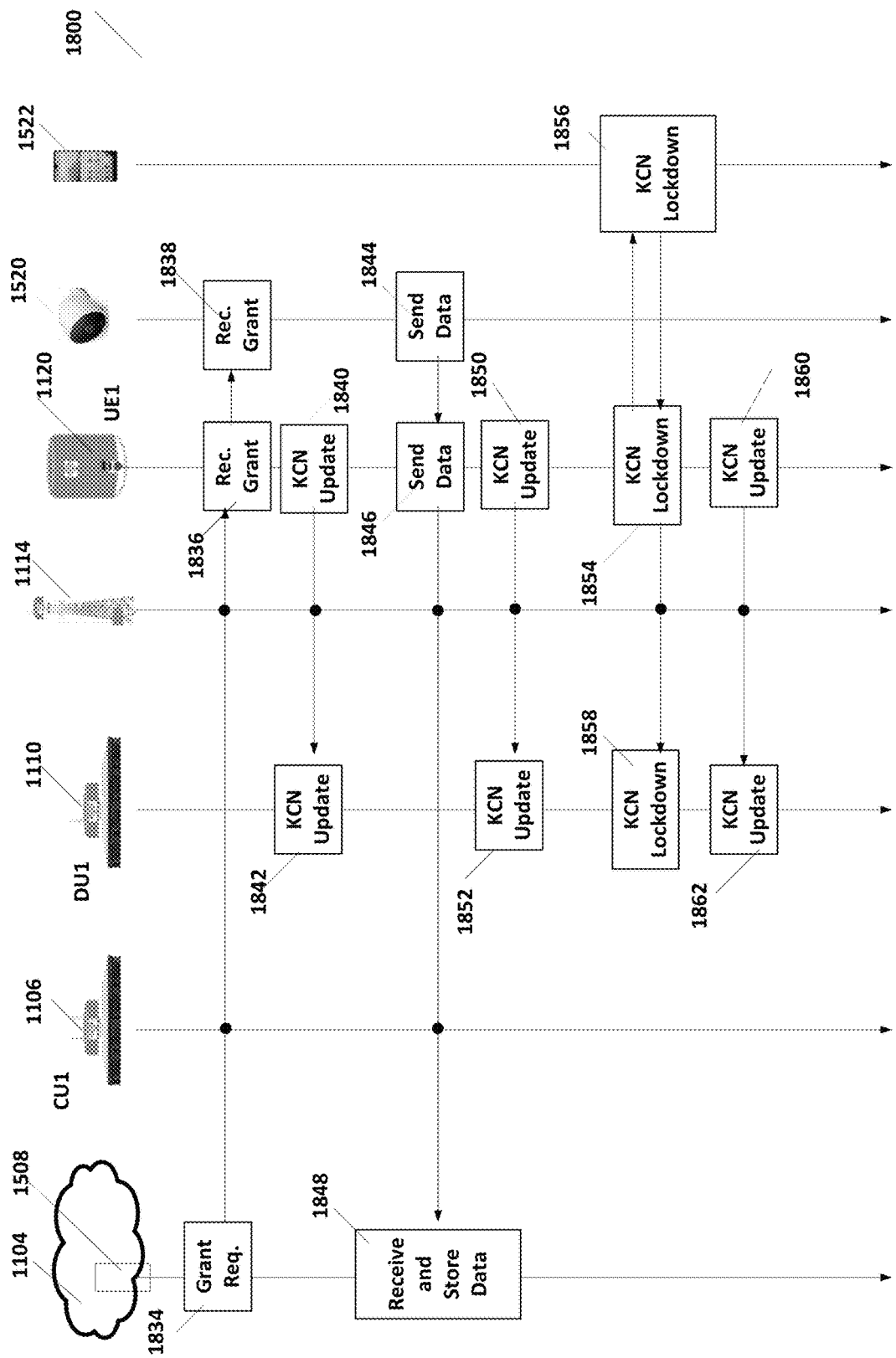

FIGS. 18A and 18B outline an example of on-boarding process 1800 of an IoT device that is connected to a UE gateway device in accordance with the principles discussed above. In particular, for illustrative purposes only, FIGS. 18A and 18B illustrate onboarding IoT device 1520 with UE 1120 to the Blockchain operated by security DM 1512 of UE1 1120 and which includes security DM 1506 operated on DU1 1110. As discussed above, a root KCN registry 1552 is maintained on UE1 1120 while a replicated KCN registry is maintained on DU1 1110. IoT device 1520 may be, for example, a camera system such as a Nest@ camera. As is outlined below, IoT device 1520 can be connected to the Gateway DM in UE1 1120 securely without cumbersome User ID password pairs. As discussed above, a routing through a network device is designated by a heavy connection symbol "•".

As illustrated by process 1800 in FIG. 18A, in step 1802 executed on IoT 1520, IoT 1520 requests a connection to UE1 1120. In some embodiments, IoT 1520 may be connected through the WiFi DM of UE1 1120, however IoT 1520 may be connected to UE1 1120 through other connections (e.g., wired network, Bluetooth, or other connection). In step 1804 executed in UE1 1120 the connection request from IoT 1520 is received by UE1 1120. If a WiFi DM of UE1 1120 is being used for the connection, the WiFi DM may use techniques such as geofencing to minimize the risks of capturing devices from neighbor sites. In some embodiments, the WiFi supported by UE1 1120 is fully open and the connection request can be granted right away. In many cases, there is no need for SSID/password to access since security will be provided via the administration of the secure Blockchain. With regard to IoT devices that require a security step, in step 1804 that security procedure can be followed through UE1 1120 to connect IoT 1520 with UE1 1120. Consequently, in step 1804 UE1 1120 indicates to step 1806 of IoT 1520 that the connection has been made and device authorization is pending. Requesting connection in step 1802 begins an initiation period where devices, for example IoT services 1508, are monitored and logged. During that period, as outlined below, all devices in communication with IoT 1522 is identified. It should be noted that the OCF platform as discussed above with respect to FIG. 16C can be used for the communication between IoT device 1520 and UE1 1120.

In Step 1808 of UE1 1120, UE1 1120 recognizes that this is the first time IoT device 1520 is connected to UE1 1120. Consequently, UE1 1120 alerts admin device 1522, which alerts the user of IoT 1522. In many examples, admin device 1522 is the user's smartphone that has been configured as administration device 1522 for UE1 1120. Note that there is no need for the user to log into UE1 1120, since the system identifies the smartphone as the authorized administrative device 1522 and registered in the KCN registry, as illustrated in FIG. 17C, UE1 1120 will contact the smartphone directly for authorization of device 1520.

The authorization request from step 1808 is received into step 1810 operating on administrative device 1522. In step 1812 on administrative device 1522, the user authorizes the Gateway DM of UE1 1120 to admit IoT 1520 to join the Blockchain of network 1100. Administrated device 1522 then sends the authorization to step 1814 of UE1 1120.

Once the authorization from administrative device 1522 is received in step 1814 on UE1 1120. In step 1816, the Gateway DM of UE1 1120 creates a digital identity, or registry entry, for IoT 1520 with security DM 1512 supporting Root KCN registry 1552 through the OCF Security Framework as described in FIGS. 16A and 16C. A registry entry with the identity and KCN entry in step 1818 is sent to step 1820 of the security DM in DU1 1110. The registry entry transmitted to DU1 1110 may be an abstraction of the registry entry created by UE1 1120 or may be the full registry entry. The device and communication data is now stored in KCN registry 1552 of UE1 1120 and can be replicated in KCN registry 1604 of DU1 1110. It should be noted that an abstracted and consolidated KCN registry such as KCN registry 1620 illustrated in FIG. 16C can be provided. In step 1820, DU1 1110 receives the KCN registry from UE1 1120 and updates the stored replicated KCN registry from UE1 1120. In the particular example illustrated FIGS. 18A and 18B, DU1 1110 receives and stores a replicated KCN registry 1604 as illustrated in FIG. 16A.

Over time, DU1 1110 collects a lot of device information across all Gateway DM's connected to it. From the MAC address, it can gather manufacturer and types of device information. As has been discussed above, the security DM 1506 of DU1 1110 can monitor and record communication activities across multiple UE gateways. In some embodiments, security DM 1506 may employ Machine Learning capabilities that can incrementally refine the identity information and communication activities for each device over time without bothering the users of such devices and able to predict how a particular device is going to behave based on data collected and abstracted from other similar devices connected to it through other UE gateways.

In step 1820 of DU1 1110, DU1 1110 validates and stores the Blockchain transaction and new device information for IoT 1520 in its local replicated identity registry in security 1506 as illustrated in FIG. 16A. Once IoT 1520 is identified in the KCN registry of DU1 1110, then IoT 1520 can communicate through network 1100 to cloud services 1104. Consequently, In step 1822 of IoT 1520, IoT 1520 requests connection to IoT services 1508 in cloud services 1104. If IoT 1520 is a Nest® camera, for example, then IoT 1520 in step 1822 indicates it is ready to connect to the Nest® network to stream some captured video for storage in IoT services 1508. The request from IoT 1520 is received in step 1824 in UE1 1120, which forwards the request to step 1826 of DU1 1110. Since IoT 1520 is now registered in KCN registry of both DU1 1110 and UE1 1120, in step 1826 DU1 1110 forwards the request to step 1828 of cloud services 1104 where IoT device services 1508 can be established.

In step 1830, the Gateway DM updates KCN registry for IoT 1520 to include a TO network entry in activities 1570 of root KCN registry 1552 on UE1 1120. The KCN update is received into step 1832 of DU1 1110, where DU1 1110 validates and stores the Blockchain transaction initiated by step 1822 and updates the activities 1570 of the replicated KCN registry for IoT 1520 stored in DU1 1110, which then replicates the KCN registry 1552 of UE1 1120.

In step 1828, the IoT services 1508 (e.g., the Nest® network) receives the connection request from IoT 1520 and finds an appropriate storage address that IoT 1522 can use to, for example, stream its video. Cloud services 1104 and IoT services 1508, in step 1834, sends the addresses and access grant back to step 1836 of in UE1 1120, which forwards the grant to step 1838 in IoT 1520. Note that for simplicity, the sign-on process, which is device dependent, between IoT 1520 and IoT services 1508, if any, has been omitted in process flow 1800.

As discussed above, in step 1836 of UE1 1120, the Gateway DM of UE1 1120 discovers the grant message from IoT services 1508 and related that message to IoT 1520. In step 1840, UE1 1520 updates the KCN registry for IoT 1520 with a FROM IoT services 1508 entry in activities 1570 of the predictive profile 1568, as illustrated in FIG. 15B. The KCN registry update formed in step 1840 is received in step 1842 in DU1 1110. In step 1842, DU1 1110 validates and stores the Blockchain transaction and updates the KCN registry 1838 for the replicated KCN registry stored in IoT 1520 with the FROM IoT Services 1508 entry.

Switching to FIG. 18B, in step 1844 IoT 1520 transmits data to IoT Services 1508. For example, if IoT 1520 is a Nest® camera IoT 1520 starts streaming captured video to the Nest® storage address it received in step 1838 of IoT 1520. The data is received in UE1 at step 1846 and forwards the streaming data to step 1848 of IoT services 1508 for processing. In step 1850 of UE1 1120, the Gateway DM of UE1 1120 updates the KCN registry with the TO IoT services entry in activities 1570 of the predictive profile 1568. That update sent by step 1850 of UE1 1120 is received in step 1852 of DU1 1110. In step 1852 of DU1 1110, DU1 1110 validates and stores the Blockchain transaction and updates KCN registry stored in DU1 110 accordingly.

In step 1854 of UE1 1120, after a preset system preference of time has passed, the Gateway DM of UE1 1120 is ready to LOCK down the KCN registry for IoT 1520. As discussed above, the root KCN registry 1552 is maintained in UE1 1120 and a replicated registry is stored in DU1 1110. In step 1854, the Gateway DM of UE1 1120 sends a message to step 1856 of administrative device 1522 to alert the user about the expiration of the KCN table initialization period and ask for confirmation to LOCK down the KCN registry entries. In step 1856, the user has the option to lock down the KCN entries or to keep the entries open. If the user authorizes the lockdown in step 1856, then administrative device 1522 notifies step 1854 of UE1 1120 that the user authorized the LOCK down of the KCN registry. In step 1860, the Gateway DM of UE1 1120 updates the KCN registry to LOCK down status by sending a message to step 1862 of DU1 1110. In step 1862, DU1 1110 validates and stores the transaction and updates the KCN registry stored in DU1 1110 to LOCK down status. Further communications between IoT 1520 and IoT services 1508 follow the Blockchain process and is cleared by DU1 1110 through its replicated registry. KCN register 1552 maintained in UE1 1120 may include a record of communications with IoT 1520, however communications with further devices or services from IoT 1520 requires a further request to reopen the KCN registry process to establish new allowed devices that can communicate with IoT 1520.

As has been stated before, with DU1 1110 maintains a replicated KCN registry while UE1 1120 maintains a root KCN registry 1552 as illustrated in FIG. 15B. These registries may be periodically purged of old data and, in some cases where IoT devices have not communicated in a sufficiently long time, with purging of entries for those inactive IoT devices. An IoT device may be reactivated by restarting process 1800 as illustrated in FIGS. 18A and 18B.

Figure 19:
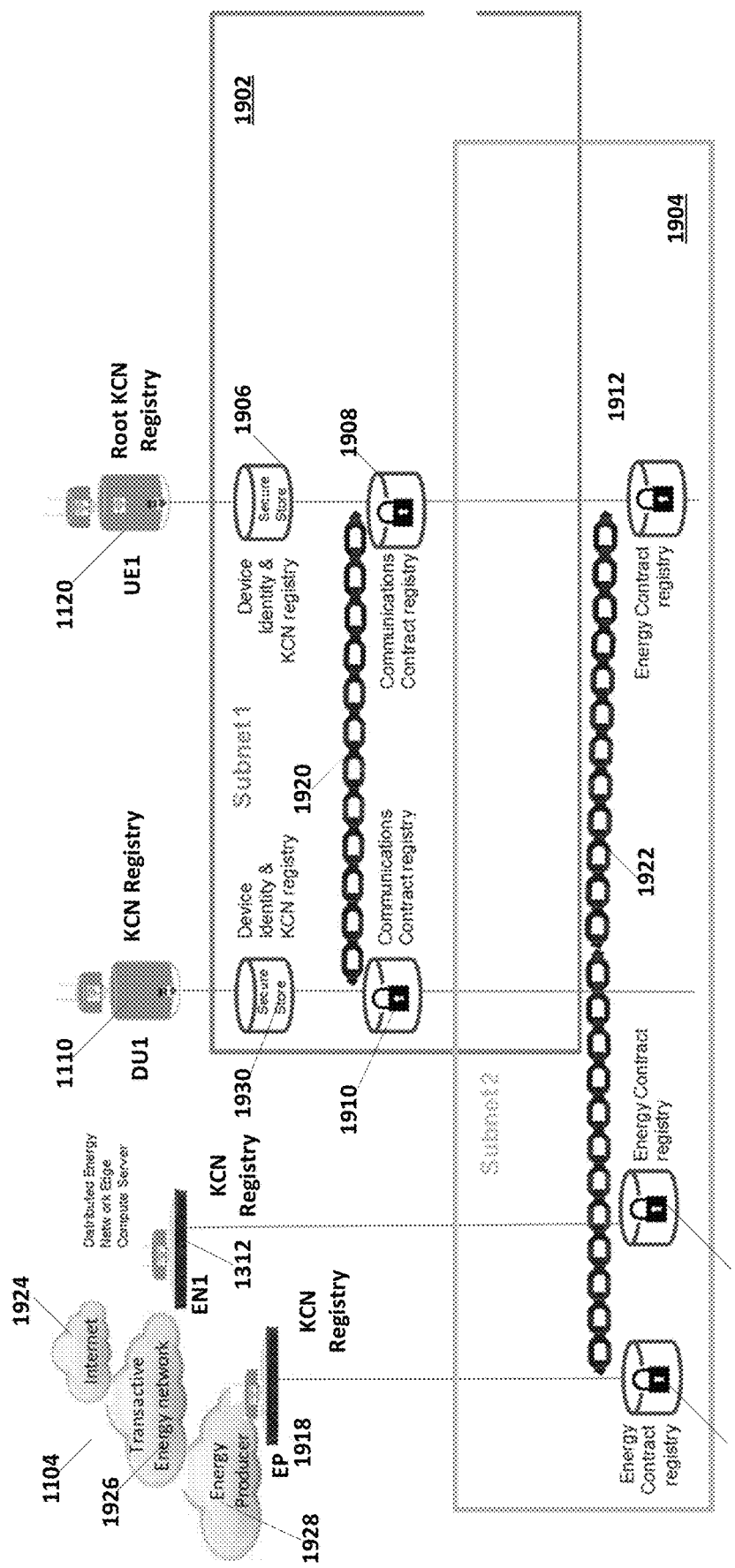
FIG. 19 illustrates a multiple secure registries blockchain framework according to some embodiments.

An individual UE gateway can be included in more than one Blockchain secured subnet. FIG. 19 illustrates an example where UE1 1120, as an example, participates in multiple block chains. As an example, FIG. 19 illustrates an example with two separate and independent Blockchain frameworks, one for subnet 1902 and one for subnet 1904. Subnet 1902 is the data communications network, which as illustrated in FIG. 11 includes CU1 1106, DU1 1110, RU1 1114, and UE1 1120. Subnet 1904 includes energy subnet that includes the electric power subnet, which may include UE1 1120, EN1 1312 and an energy producer network edge device EP 1918. In some examples, subnet DU1 1110 may be coupled to EN1 1312 or EN1 1312 may be coupled through a RU. The example in FIG. 15A illustrates EN1 1312 being coupled through RU1 1114 as an example.

As is illustrated in FIG. 19, DU1 1110 is coupled through CU1 1106 (not illustrated in FIG. 19) to cloud services 1104 that includes internet services 1724. Further, EN1 1312, which may operate as a DU, is coupled through EP 1918, which may operate as a CU, to cloud services 1104 that includes Transactive Energy network 1926 and Energy Producer 1928. As discussed above with respect to FIG. 13B, the subnet proposed by EN1 1312 or EN2 1314 when energy services are first requested includes, in this example, EN1 1312, EP 1918, and potentially an RU such as, for example, RU1 1114 in order to communicate with UE1 1120.

As is illustrated in FIG. 19, security is provided by Blockchain as discussed above in each of subnet 1902 and 1904, both of which terminate at UE1 1120 as an example. As is illustrated, the Blockchain framework according to some embodiments as illustrated in FIG. 19 supports multiple Blockchains that are separate and independent from each other. The Blockchain framework for each subnet can be managed separately to ensure data privacy for each of the subnets 1902 and 1904.

As is illustrated in FIG. 19, the Gateway DM of UE1 1120 supports two separate Blockchains: Blockchain 1920 operating in subnet 1902 and Blockchain 1922 operating in subnet 1904. Blockchain 1920 and Blockchain 1922 protect two separate secure contract ledger registries. As discussed above with respect to FIG. 15A, all devices requiring communications service is coupled through the Gateway DM of UE1 1120. Further, as was discussed above with respect to FIGS. 13A and 13B, all energy demand endpoints such as smart meters, smart EV charges, and smart appliances are connected through and protected by the Gateway DM of UE1 1120 through an energy network illustrated as subnet 1904.

As is illustrated in FIGS. 15B and 16A, for example, the KCN registry can be rooted on UE1 1120 for both subnet 1902 and subnet 1904. As such, KCN registry 1552 of UE1 1120 includes secure store 1906 with device identities and communications contract registry 1908 for subnet 1902 and energy contract registry 1912 for subnet 1904. DU1 1110 includes either an abstracted or replicated registry as is illustrated in FIG. 16A. In either case, the KCN registry on DU 1110 secure store 1930 includes the KCN identification for communications devices included in secure store 1906. Communications contract registry 1910 includes either a replicated or abstracted version of communications contract registry 1908. Similarly, EN1 1312 includes a replicated or abstracted registry 1914 of energy contract registry 1912. Further, energy producer network edge device EP 1918 includes a replicated or abstracted registry 1916 of energy contract registry 1912 to form blockchain 1922.

As discussed above, subnet 1902 and Blockchain 1920 establish and protect a communications service network. As has been illustrated, for example in FIG. 15A, subnet 1902 may include CU1 1106, DU1 1110, RU1 1114, and ending at UE1 1120. Consequently, UE1 1120, as discussed with respect to FIGS. 15B and 16A, establishes a secure store 1906 that includes the Device Identity and KCN registry for each device, for example IoT 1520 as discussed above. Blockchain 1920 established a secured link with DU1 1100, which also includes a secure store 1930 that includes the Device Identity and KCN registry as discussed above. As has been discussed above, DU1 1110 is a replicated or abstracted node and maintains the KCN registry with respect to the root KCN registry stored in secure store 1906 and communications contract registry 1908. As discussed above UE1 1120 is a Blockchain "full node" while CU1 1106 is a "light node" since they communicate device IDs and KCN entries but do not maintain a complete registry.

Subnet 1904 and Blockchain 1922 establish and protect communications within an energy services subnet. As has been discussed above and illustrated in FIG. 19, subnet 1904 includes UE1 1120, EN1 1312, and EP 1918. As discussed above, EP 1918 may operate as a CU device that is itself coupled to cloud services 1104 and particularly to transactive energy network 1926 and energy production services 1928. As such, UE1 1120 includes an energy contract registry 1912, which includes the contract identification and KCN registry for that network. EN1 1312 further includes energy contract registry 1914 and EP 1918 includes energy contract registry 1916. As illustrated in FIG. 17, EN1 1312 and EP 1918 can include a replicated or an abstracted node while UE1 1120 is a root node for Blockchain 1922.

As is illustrated in FIG. 19, Blockchain 1920 provides for Blockchain-secured contract registries rooted in DU1 1110, which may be part of the BS Access Network 1100 as illustrated in FIGS. 11 and 15A. Blockchain 1920 maintains all three-way contracts between the Communications Service Provider in cloud services 1104, the Gateway DM of UE1 1120 representing all devices requiring communications services, and the BS Access Network that includes DU1 1110. As in the case on the Transactive Energy, these three-way contracts may also be constructed as two separate two-way contracts, one between the Communications Service Provider in cloud services 1104 and the BS Access Network 1100, the other between the BS Access Network 1100 and the Gateway DM of UE1 1120. The Gateway DM of UE1 1120 provides necessary communications network protocol and blockchain interface for all the communicating devices coupled to it.

As is further illustrated in FIG. 19, Blockchain 1922 provides for Blockchain-secured contract registry rooted in Transactive Energy Network 1926 of cloud services 1104, maintaining all three-way contracts between the Energy Producer, the Gateway DM of UE1 1120 representing all energy demand endpoints, and the Transactive Energy Network 1926. These three-way contracts may be constructed as two separate two-way contracts, one between the Energy Producer 1928 and the Transaction Energy Network 1100, the other between the Transactive Energy Network 1100 and the Gateway DM of UE1 1120. The Gateway DM of UE1 1120 provides necessary Transactive Energy network protocol and blockchain interface for all the energy demand endpoints.

Consequently, as described above embodiments of a method to allow user to register administration devices via blockchain technology to administer user gateway UE devices securely without using user id, password pairs is disclosed. In accordance with some embodiments, an administration device can be registered with the gateway DM of a UE gateway to validate and administer activities, which are then captured irrefutably via Blockchain.

Further, some embodiments of a method to allow users to authorize and onboard devices to access the home gateway easily without cumbersome user id password pairs, and gradually learn more about the device identity and communications profile of the device automatically, is also disclosed. The disclosed embodiments create irrefutable transaction ledger on user authorization of devices to gain access to the home gateway and on communication endpoints to and from the authorized device. Embodiments of the method identify unusual communications patterns. The method also included machine learning on data collected on similar devices and profiles to form a KCN registry that identify vulnerable devices and untrustworthy communication endpoints. This method enables a system which improves security over time automatically. The disclosed methods facilitate simplification of device onboarding and security without using burdensome user ids and passwords.

Some embodiments of network devices according to the present disclosure exhibit a Distributed Virtual Device Module (DVDM) architecture, which enables a collection of independent self-contained device modules potentially geographically distributed and interacting to perform functions as described in this disclosure. Individual DMs can be specifically manufactured to easily interact with network elements according to embodiments of this disclosure or may be manufactured by different vendors. Some embodiments may include native gateway DMs cooperating with unaffiliated devices to interface to those unaffiliated devices and protect the protected devices. For example, a coherent virtual device such as a Home Gateway that supports a native gateway WiFi DM and an unaffiliated Smart Home Hub DM to interface and protect a Smart Meter and a Smart Electric Vehicle (EV) Charger. All DM's are secured by the Secure Blockchain Framework as discussed above and all access activities to each DM are validated and stored via the Secure Blockchain framework with the associated KCN table as described above.

Figure 20A:
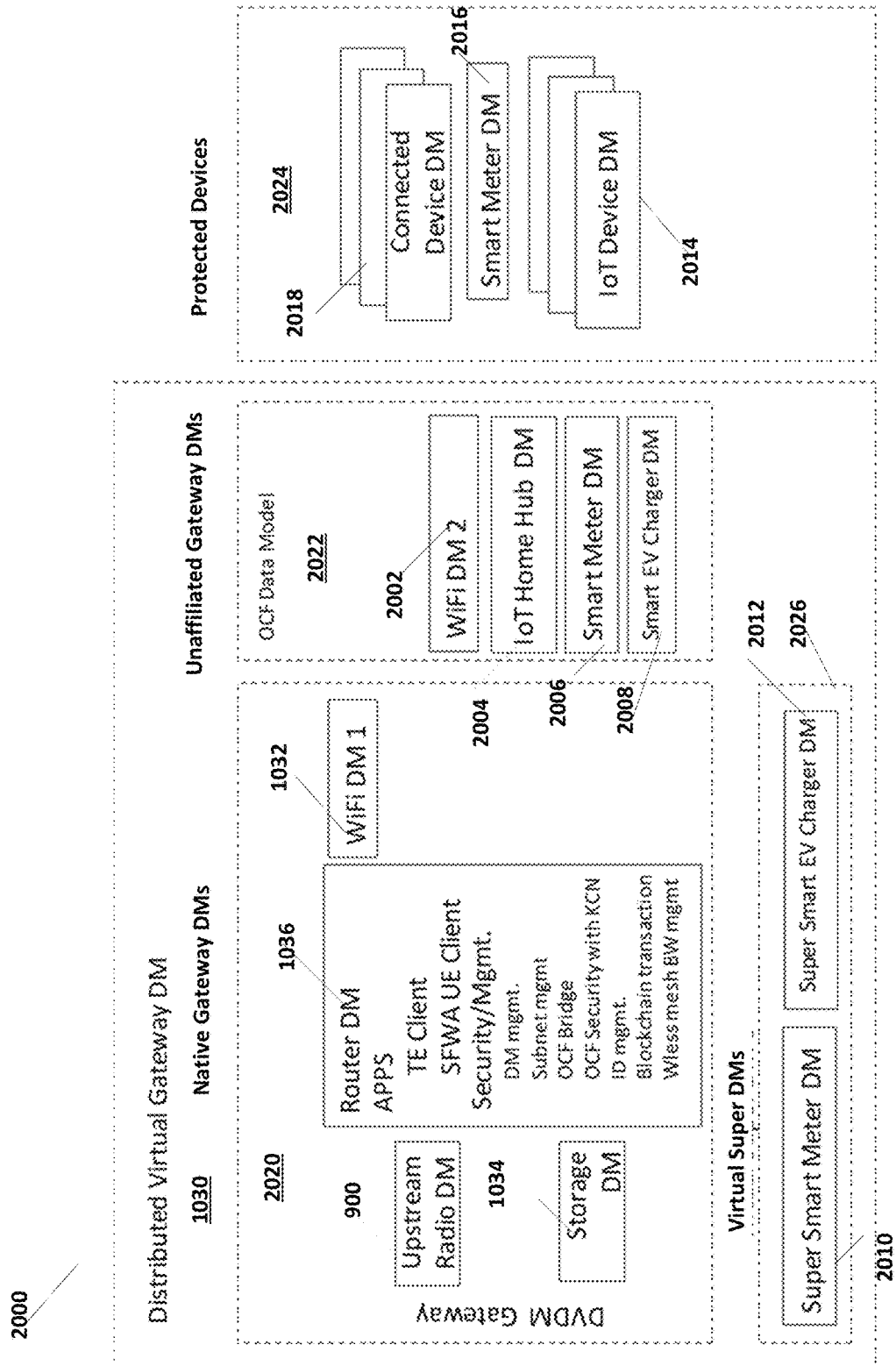
FIGS. 20A, 20B, and 20C illustrate example configurations of a gateway DM configuration according to some embodiments.

FIG. 20A illustrates a high-level DVDM architecture framework 2000, and in particular a high-level DVDM architecture framework 2000 for a gateway 1030 such as that described above, for example, with FIG. 10D and gateway 880 of FIG. 8D. As discussed below, the high-level DVDM architecture framework 2000 provides a flexible architecture to assemble various DM's to form a Distributed Virtual Gateway. There are three different types of DM's illustrated in DVDM gateway framework 2000, namely native gateway DMs 2020, unaffiliated gateway DMs 2022, and Virtual Super DMs 2026. These components can be distributed geographically, but together form the logical gateway device 1030.

Native Gateway DMs 2020 refer to DMs that are designed and manufactures to operate within embodiments of the present disclosure. These DMs are highly interoperative and therefore can be tightly coupled and managed as a set. In the example illustrated in FIG. 20A, Native Gateway DMs 2020 includes a radio DM 900, a storage DM 1034, a router DM 1036, and a WiFi DM 1032. These DMs have been previously discussed with respect to FIG. 10D.

Native Gateway DMs 2020 are often physically located together and are interconnected on physical busses, for example a PCIe bus, located physically in the center of a packaged device, however they may also be physically separated. Native Gateway DMs 2020 are held together through a common data mode, which can in some embodiments be a combination of the standard OCF data mode and the Native DM data model. Such a data model has been discussed above with respect to FIG. 16C. The native gateway DMs 2020 include a router DM 1036, on which core functionality of gateway device 1030 is operated. Router DM 1036 may operate on any computing platform and, as illustrated, may operator Router DM apps such as a Transactive Energy (TE) app, a SFWA UE Client app, and security and DM management apps. The Security and DM management apps may include DM management, Subnet management, OCF bridge, OCF security with KCN and ID management, Blockchain transaction management, and Mesh network bandwidth management. Each of these functionalities have been discussed above.

Native Gateway DMs 2020 communicate, using data packets, using a Native DM data model standard, which is a combination of a standard data model such as the OCF data model plus additionally data element definitions as discussed here. The Native DM model allows for tight communications and controls between Native Gateway DMs 2020.

In some embodiments, some of the Native Gateway DMs 2020 are not co-located with Router DM 1036. As has been discussed above, DMs may be co-located in a single package or may be separated and interfaced with one another. For example, Radio DM 900 can be remotely deployed and configured for upstream communication with the network or downstream communications to other gateway devices. As discussed above, all Native DMs conform to a Native DM Data Model, which as discussed above may combine a standard data module such as an OCF Data Model with other data elements and functionality such as KCN Registry control. Other standard data models may be used.

Unaffiliated Gateway DMs 2022 typically support at least one standard data model such as the OCF data mode that the Native Gateway DMs support. However, in some examples, Native Gateway DMs can be provided to interface with Unaffiliated Gateway DMs 2022, even if a standard data model is not supported. In general, unaffiliated gateway DMs communicate with other Native Gateway DMs through the common standard data model to form a Distributed Virtual Gateway DM 2000.

Protected Devices 2024 are controlled and managed by Native Gateway DMs 2020 and Unaffiliated Gateway DMs 2022, depending on the device. As is illustrated, Protected devices can include IoT devices 2014, smart meters 2016, or any other connected device 2018.

Virtual Super DMs 2026 are DM modules that act as DM proxies to which unaffiliated gateway DMs 2022 can be bound. Virtual Super DMs bring functionality of the Distributed Virtual Gateway Native DMs 2020 described above to unaffiliated gateway devices through standard data models, for example, the OCF Data Model. FIG. 20A illustrates a Super Smart Meter DM 2010 and a Super Smart EV Charger DM 2012. For example, Super Smart Meter DM 2010 can interface with and add features to unaffiliated gateway Smart Meter DM 2006 while Super Smart EV Charger DM 2012 can interface with and add features to Unaffiliated Device DM 2008. Virtual Super DM 2026 can also be used to add features to protected devices 2024. However, since the protected devices 2026 may or may not conform to any standard data model that the Distributed Virtual Gateway DM 2000 supports, the scope of new features can be added may be limited.

In some embodiments, any of the Unaffiliated Gateway DMs 2022 that do not adhere to the standard Data Model protocols used in the Native Data Models of Native Gateway DMs 2020 may be interfaced into gateway 1030 with a super virtual DM 2026. A super virtual DM 2026 can also interface with a virtual DM 2026 that operate according to a standard Data Model to interface and add features to those unaffiliated devices. Gateway 1030, through Native Gateway DMs 2020, manages and controls unaffiliated devices as if they are Native DM's as much as possible. In the example illustrated in FIG. 20A, a WiFi DM 2002, an IoT Home Hub DM 2004, a Smart Meter DM 2006, and a Smart EV Charger DM 2008 is illustrated. These DMs may or may not adhere to the Native DM Data Model and may utilize super virtual DMs 2026 to operate according to the capabilities of Distributed Virtual Gateway DM 1030.

Figure 20B:
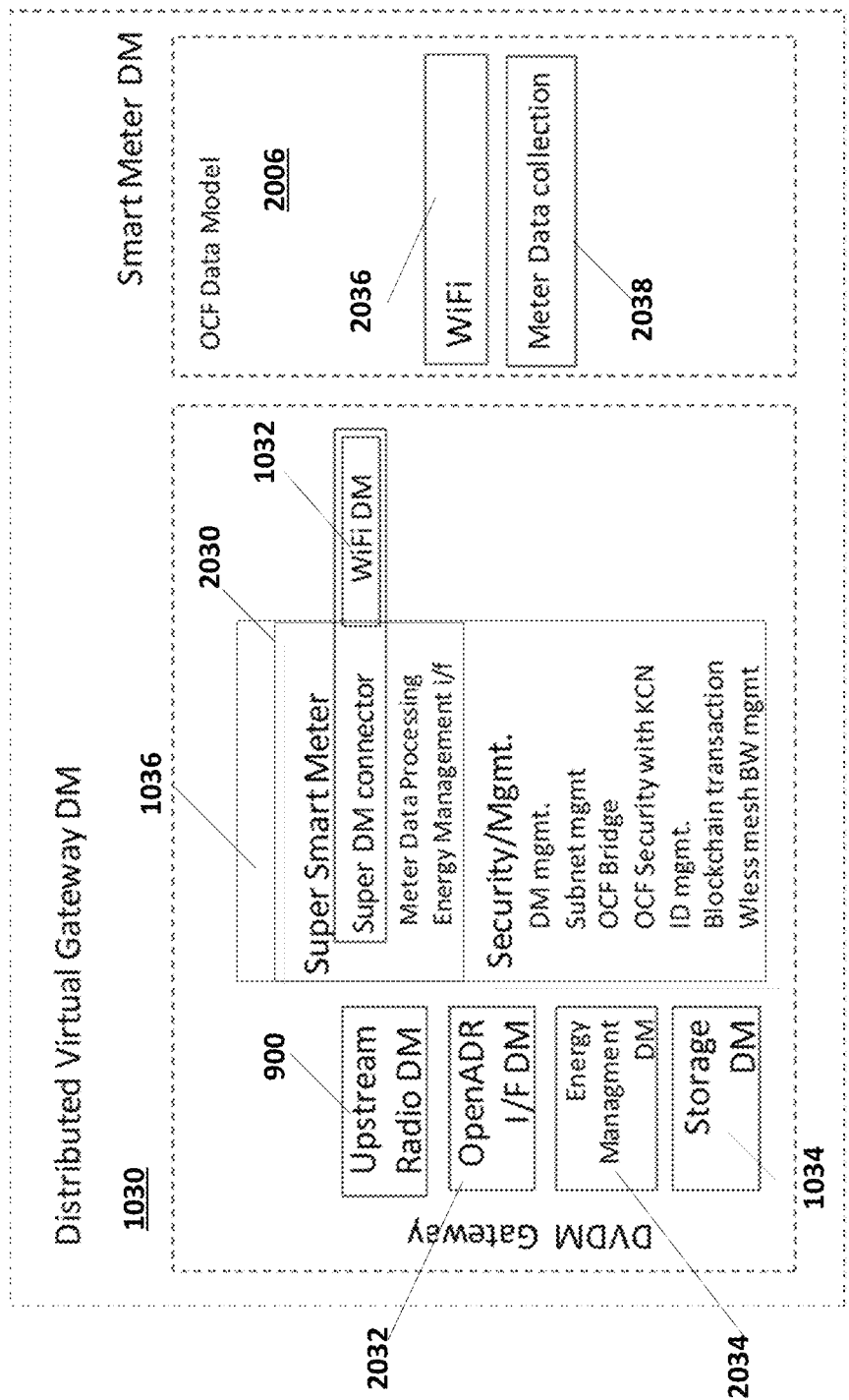

FIG. 20B illustrates an example of a virtual Super DM, in this case a Virtual Super Smart Meter DM that was illustrated in FIG. 20A as Virtual Super Smart Meter DM 2010. As is further illustrated in FIG. 20B, the functionality of Virtual Super Smart Meter DM 2010 is implemented as Super Smart Meter 2030 in router 1036 and energy management DMs 2032 and 2034. These DMs supplement the operation of Unaffiliated Smart Meter 2006. As an example, management block 2032 may be provide services according to the Open Automated Demand Response (OpenADR) standard according to the OpenADR Alliance. Energy Management DM 2034 may provide secured PPA contracts as discussed above with FIGS. 13A and 13B.

As is further illustrated in FIG. 20B, smart meter DM 2006 supports basic meter data collection 2038 and provides a WiFi interface 2036. As illustrated, smart meter DM 2006 in this example conforms to the standard Data Model, for example the standard OCF data model. As is illustrated, Super Smart Meter 2030 of Virtual Super Smart Meter 2010 connects to Smart Meter 2006 using Native WiFi DM 1032, WiFi functionality 2036, and the standard Data Model. Through this connection a Supper Smart Meter DM is created combining the features supported by the Virtual Super Smart Meter DM 2010 with the Smart Meter 2006. As is illustrated in FIG. 20B, Super Smart Meter 2030 of Virtual Super Smart Meter DM 2010 provides for data connection, data processing for data received from Smart Meter 2006, and Energy Management.

As has been discussed above, an OCF Security with KCN registry infrastructure conforming to the native data model can be provided through the Virtual Super Smart Meter 2010 protecting the Smart Meter 2006. The meter data collected by Smart Meter 2006 is processed by the Meter Data Processing function in router 1036 in conjunction with the Energy Management DM 2034. If appropriate, some data collected may be processed and consumed locally while some data collected may be sent upstream for further processing. For example, active energy used, voltage, current flow, and the temperature of smart meter 2006 may be collected periodically (e.g. every 15 seconds). If, based on the Meter Data Processing function logic, the values of all these data elements are as expected and the same as the data values that had been forwarded through the uplink previously, the data may be consumed locally, and nothing is forwarded upstream. However, if data is out of the normal (e.g. the temperature of Smart Meter 2006) that is recorded is out of the specification (e.g., the temperature exceed a threshold setting), the data collected may be forwarded through the network (e.g., network 1100) to cloud services together with other diagnostic data generated by Virtual Smart Meter DM 2010 for further processing. As illustrated, data from Smart Meter 2006 after processing by Super Smart Meter 2030 may be stored by Storage DM 1034.

As has been discussed above, DMs do not need to be in the same physical housing and can be assembled logically. As an example, a logical Gateway Device can be formed by connecting all the smart meters DMs controlled by an Independent Power Producer to a CU DM. As such, data over a wide area of user sites can be monitored and process by the power producer.

Figure 20C:
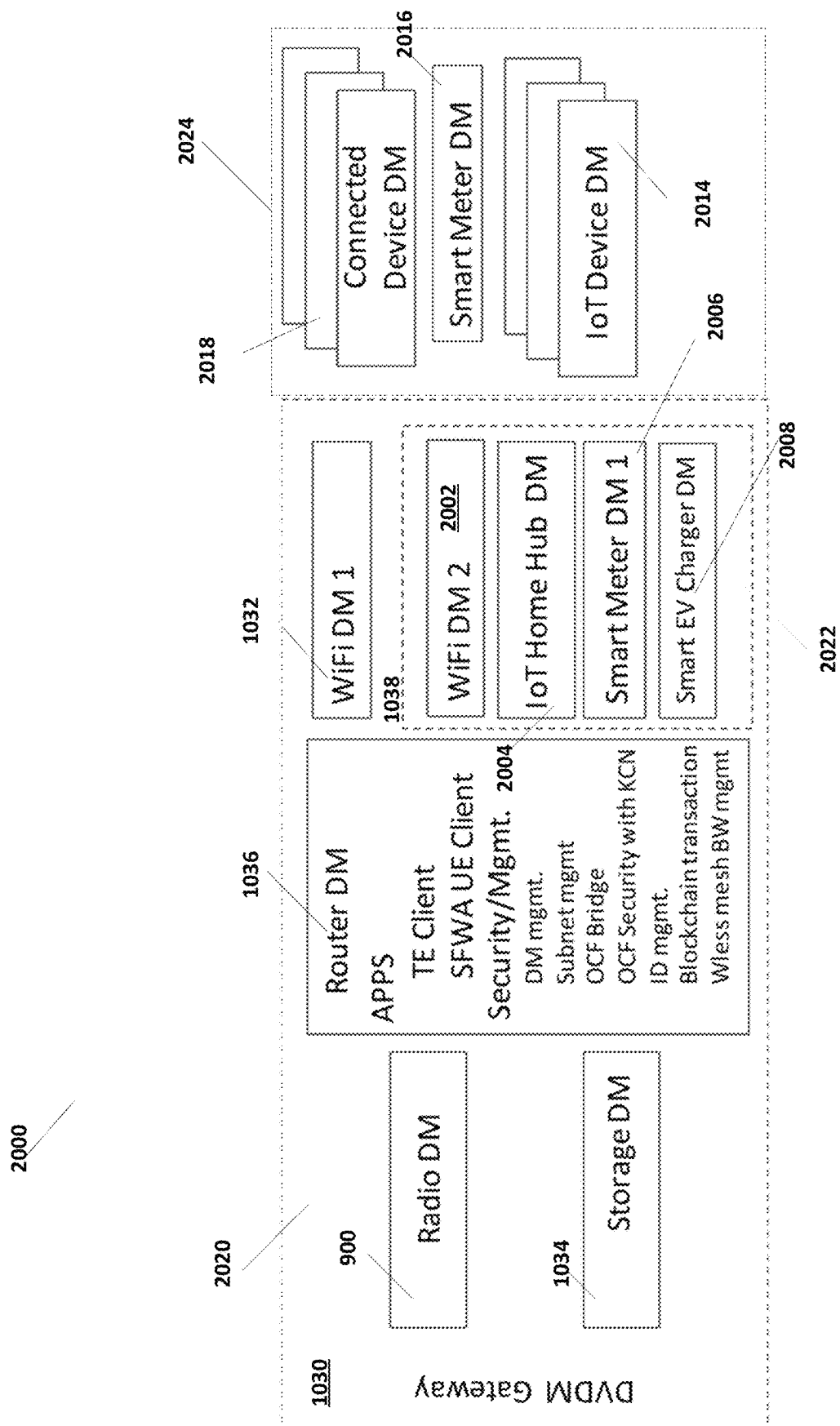

As has been discussed above, all DM's are detected, authorized, and assembled into part of the Distributed Virtual Gateway DM dynamically. All non-Gateway DM devices connected and classified as protected devices. These devices may or may not conform to the DM Data Model (e.g. the OCF Data Model). FIG. 20C illustrates how unaffiliated gateway devices 2022 can be integrated as part of a DVDM Gateway 1030 together with Native gateway DM 2020 and the different rolls they play in the DVDM architecture 2000 from the specific perspectives of selected DMs.

From the perspective of WiFI DM 1032, which is a native gateway DM 2020 and therefore is fully accessible by gateway DM 1030 using the native data model, the rest of the Gateway has full and special access to WiFi DM 1032. Access to WiFi DM 1032 is performed with the native data model according to some embodiments. Specifically, the Wireless Management module of Router 1036 is capable of performing specific controls of WiFi DM 1032. These controls can include asking WiFi DM 1032 to scan and report the WiFi channel occupancy conditions, for example. Router DM 1036 may also request WiFi DM 1032 to ping a connected device from a specific radio band and channel to determine the local latency performance. Router 1036 may also request WiFi DM 1032 to collect other link performance data useful for the operation of gateway 1030, which is not commonly available from unaffiliated devices. In particular, the capabilities of the native WiFi DM 1032 in combination of the management control from router DM 1036 may not be defined in any of the standard data models, and therefore is unavailable, from unaffiliated WiFi DM 2002.

In essence, while Native WiFi DM 1032 and unaffiliated WiFi DM 2002 are connected to the Gateway as WiFi DM's and connected devices can be onboarded via either one of them, WiFi DM 1032, a native DM, is much more tightly coupled with router DM 1036 of Gateway 1030 than is WiFi DM 2002. From the perspective of unaffiliated Smart Meter DM 2016, it may operate as an unaffiliated Gateway Smart Meter if it conforms to the standard Data Model. Smart Meter 2016 may be controlled by Gateway 1030 via the standard data model (e.g. the OCF data model) that gateway 1030 supports to perform various operations. These operations can, for example, be turning smart meter DM 2016 on and off at specific times, providing a Transactive Energy Network interface between it and a Transactive Energy Network with irrefutable transaction ledgers as described above, and other operations. However, if Smart Meter DM 2016 does not support the standard data mode (e.g., the OCF data model) that gateway 1030 supports, it may connect to gateway 1030 via either of Native WiFi DM 1032 or Unaffiliated WiFi DM 2002, then Gateway 1030 can only protect Smart Meter DM 2016 as a generically connected IoT device, and not an integrated Gateway Smart Meter DM. Therefore, from DVDM Architecture perspective, Smart Meter DM 2016 would not be part of the DVDM Gateway but one of the connected devices protected by the DVDM Gateway.

Figure 21A:
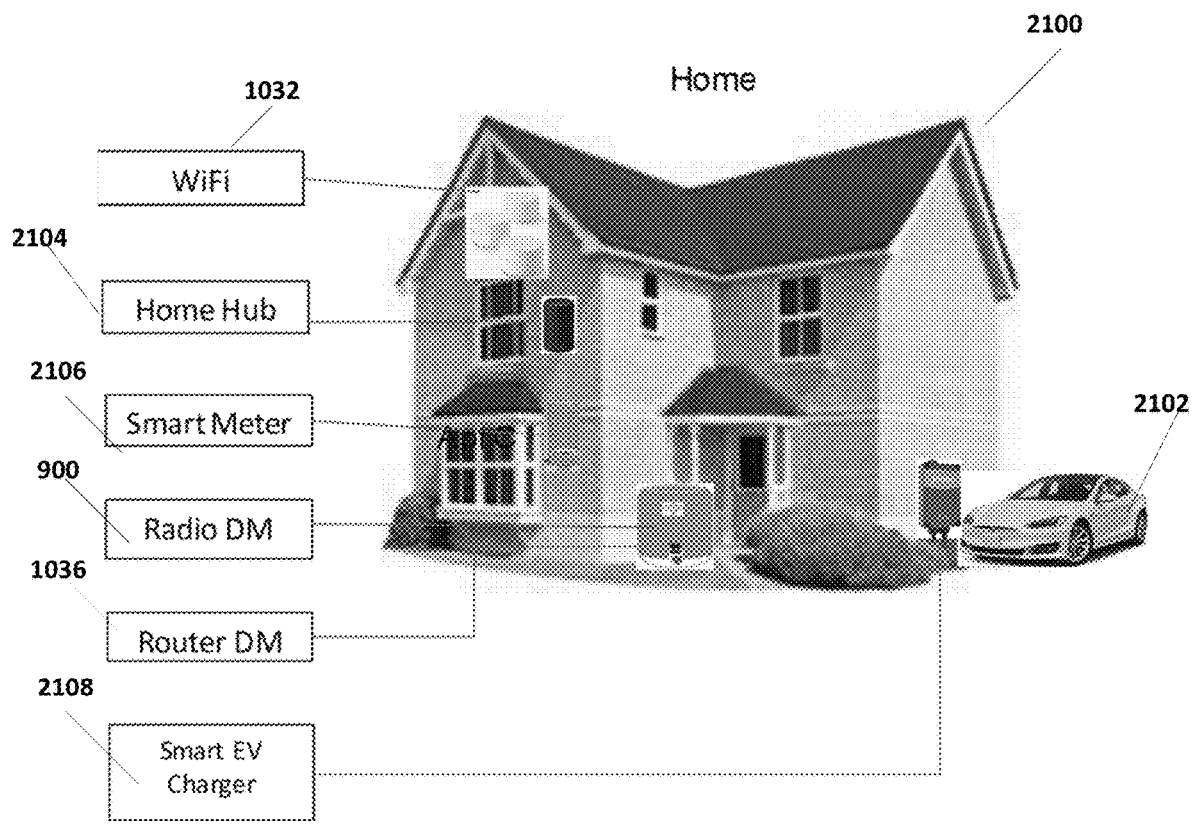
FIGS. 21A and 21B illustrate an example configuration of a home gateway DM according to some embodiments.
Figure 21B:
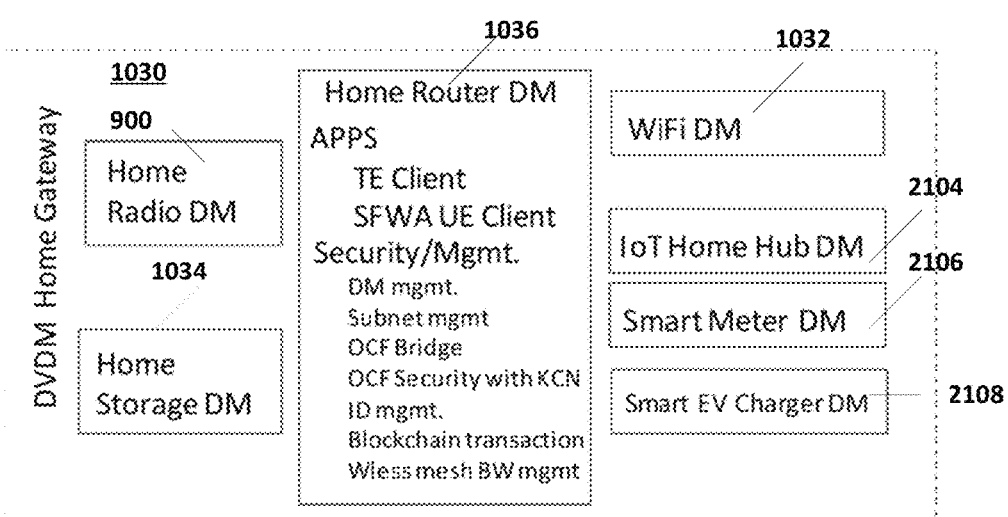

FIGS. 21A and 21B illustrate deployment of a DVDM architecture of a home gateway 1030 according to some embodiments. FIG. 21A illustrates a physical layout of gateway devices at a user home residence. FIG. 21B illustrates the logical arrangement of home gateway 1030 according to some embodiments. FIGS. 21A and 21B illustrate how a single Home Gateway can be constructed with Native radio DMs and other native and unaffiliated gateway DMs deployed in a Home 2100 and managed as a coherent Home Gateway 1030.

As is illustrated in FIG. 21A, router DM 1036 and radio DM 900 are located within the residence 2100. In some embodiments, radio DM 900 may be mounted to the roof of residence 2100. As is further illustrated, a smart EV charger 2108 is mounted on residence 2100 proximate to an electric car 2102. As is further illustrated, a home hub 2104 is located on the second story of residence 2100 while WiFi DM 1032 is located also on the second story of residence 2100. As is illustrated, gateway DMs are distributed throughout residence 2100 using the DVDM architecture as described above with respect to FIGS. 20A, 20B, and 20C to form a powerful, multi-function system useable as a coherent Home Gateway. As has been discussed above, these DMs may be native gateway DMs, unaffiliated gateway DMs, or devices connected and protected by the DVDM gateway. The logical arrangement of these DMs according to the DVDM architecture is illustrated in FIG. 21B.

Figure 21C:
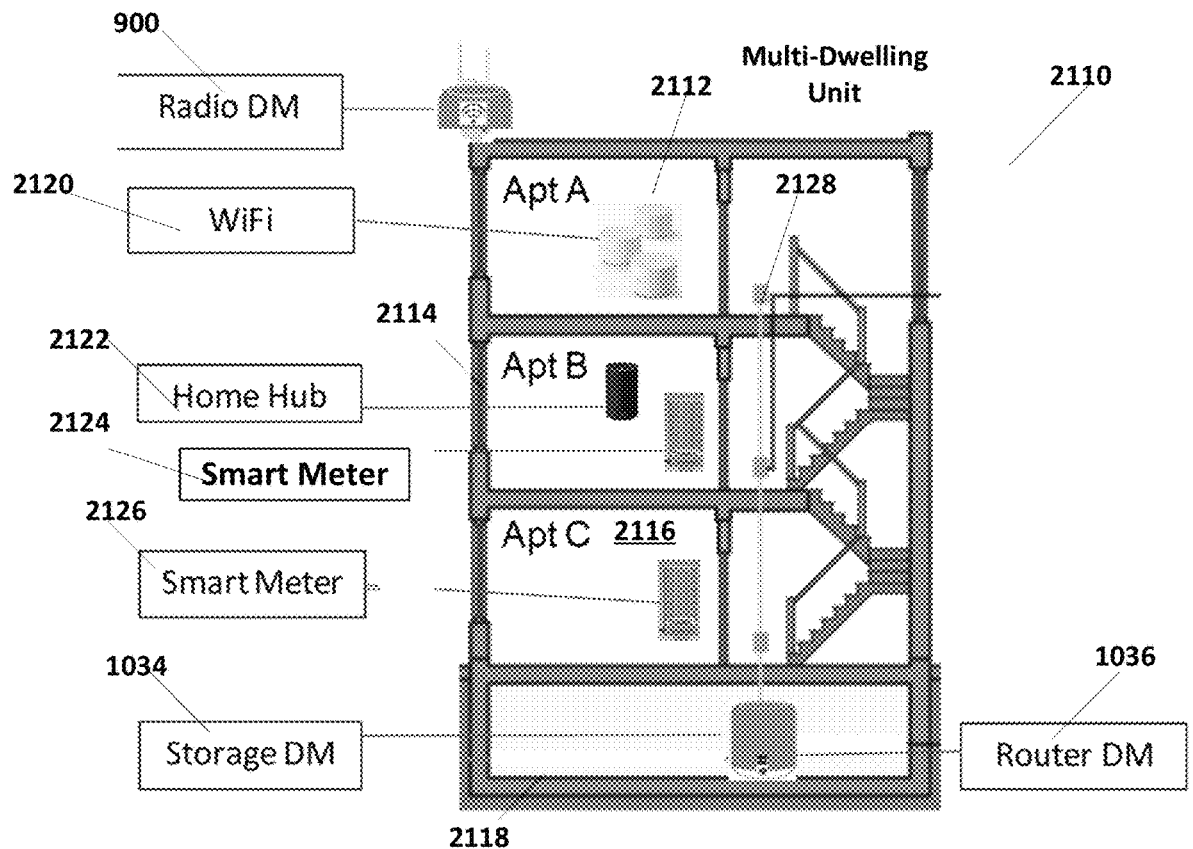
FIGS. 21C and 21D illustrate an example configuration of a multi-dwelling gateway DM according to some embodiments.
Figure 21D:
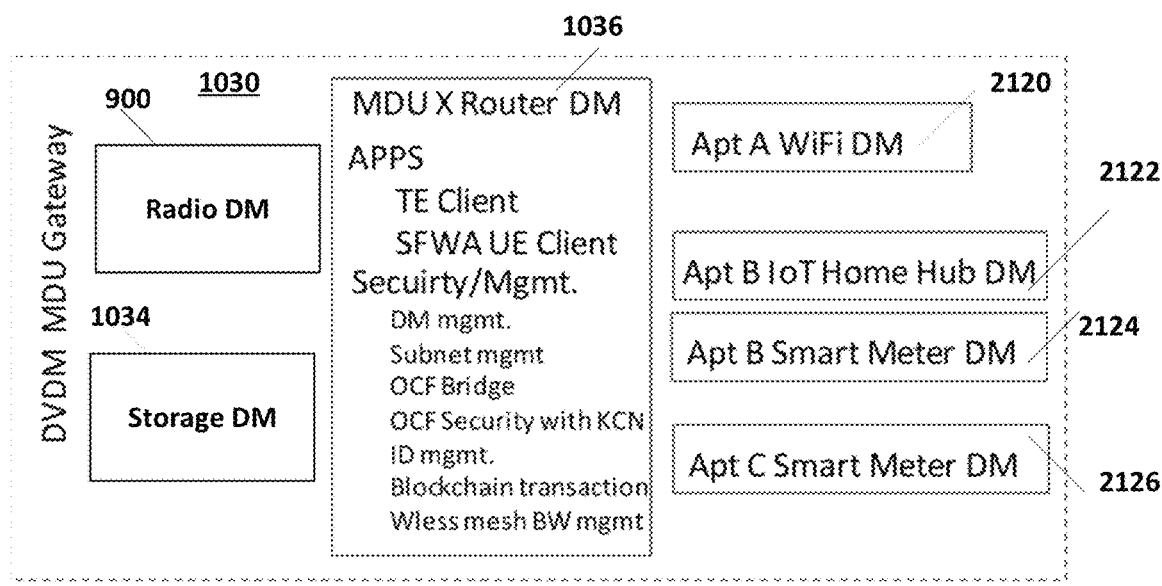

FIGS. 21C and 21D illustrate deployment of a DVDM architecture in a multi-dwelling unit 2110. FIG. 21C illustrates a physical layout of gateway devices at multi-dwelling unit 2110. FIG. 21D illustrates the logical arrangement of gateway DMs to form a gateway 1030 in multi-dwelling unit 2110 according to some embodiments. FIGS. 21C and 21D illustrate how a multi-dwelling unit gateway 1030 can be constructed with multiple native gateway radio DMs and other native and unaffiliated gateway DMs deployed in a building serving multiple apartments of a multi-dwelling unit 2110 and managed as a coherent Multi-Dwelling Gateway 1030.

As illustrated in FIG. 21C, the example multi-dwelling unit 2110 includes a multi-level structure with an Apartment A 2112 on the third floor, Apartment B 2114 on the second floor, Apartment C 2116 on the first floor, and a basement level 2118. As is illustrated, Router DM 1036 and Storage DM 1034 may be integrated and housed at basement level 2118. Apartment C 2116 may include a smart meter 2126. Apartment B 1914 may include a smart meter 1924 and a IoT Home Hub 1922. Apartment A 1912 may include a WiFi DM 2120. Radio DM 900 may be mounted on the roof. Cabling 2128 may be provided throughout the multi-dwelling unit 2110 to facilitate networking with router DM 1036. As is illustrate in FIG. 21D a single logical multi-dwelling unit gateway 1030 is constructed with Native and unaffiliated DMS deployed through multi-dwelling unit 2110 and servicing multiple apartments. It should be noted that, in some embodiments, a multi-dwelling unit may be serviced by more than one multi-dwelling unit gateway deployed throughout the structure. As has been discussed above, these DMs may be native gateway DMs, unaffiliated gateway DMs, or just devices connected and protected by the DVDM gateway. The Logical arrangement of these DMs according to the DVDM architecture is illustrated in FIG. 21D.

Figure 21E:
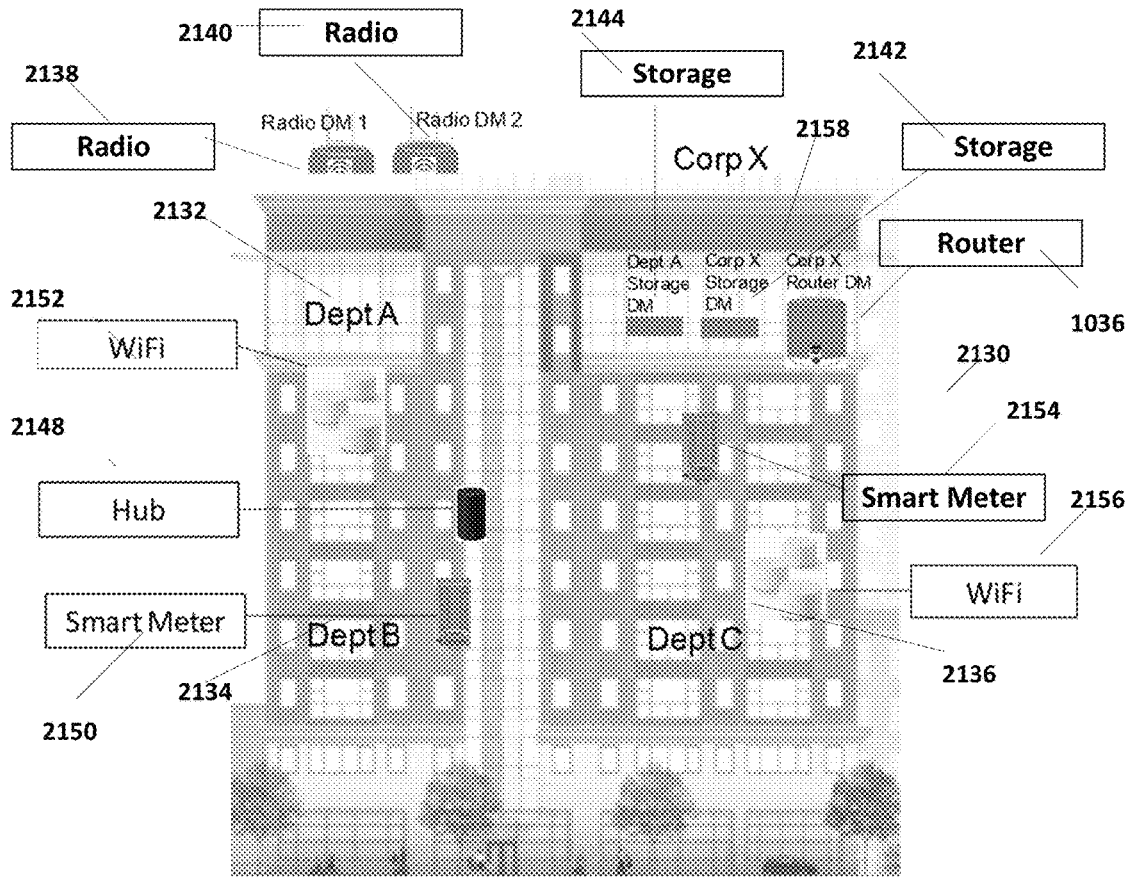
FIGS. 21E and 21F illustrate an example configuration of an enterprise gateway DM according to some embodiments.
Figure 21F:
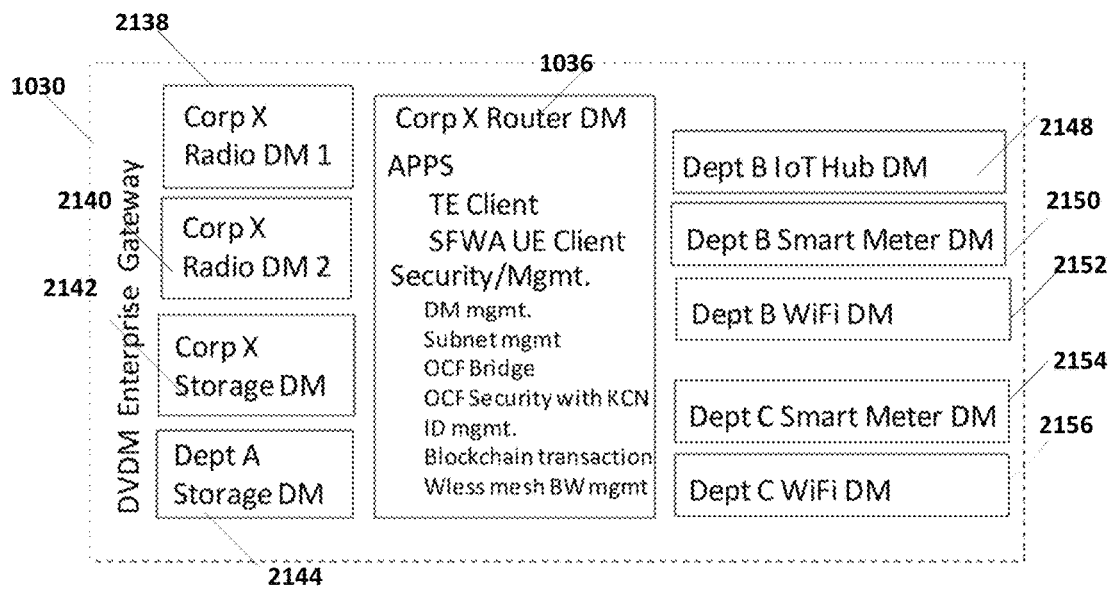

FIGS. 21E and 21F illustrates deployment of a DVDM architecture in an enterprise setting. FIG. 21E illustrates a physical layout of gateway devices in a company to form an enterprise 2130 setting. FIG. 21F illustrates the logical arrangement of Enterprise Gateway 1030 in enterprise 2130 according to some embodiments. FIGS. 21E and 21F illustrate how a single Enterprise Gateway 1030 can be constructed with multiple Native radio DMs and other native and unaffiliated DMs deployed in a building serving multiple departments of an enterprise 2130 and managed as a coherent Enterprise Gateway 1030.

As illustrated in FIG. 21E, enterprise 2130 includes a multi-level structure that houses department A 2132, Department B 2134, and Department C 2136. Enterprise 2130 may also include a server room 2158 that houses components of gateway 1030. As is illustrated, a radio DM 2140 and radio DM 2138 can be mounted on the roof. Radio DMs 2140 and 2138, for example, may be radio device 900 as illustrated in FIG. 9. Server room 2158 may house storage DM 2144, storage DM 2142, and router 1036. Storage 2144 may, for example, provide dedicated storage to, for example, Department A 2132 of enterprise 2130. A WiFi DM 2156 may be housed in Department C 2136 along with a smart meter 2154. Department B 2134 may house a IoT Hub 2148 and a WiFi DM 2152. As has been discussed above, these DMs may be native gateway DMs, unaffiliated gateway DMs, or just devices connected and protected by the DVDM gateway. The logical arrangement of these DMs according to the DVDM architecture is illustrated in FIG. 21F.

Figure 22A:
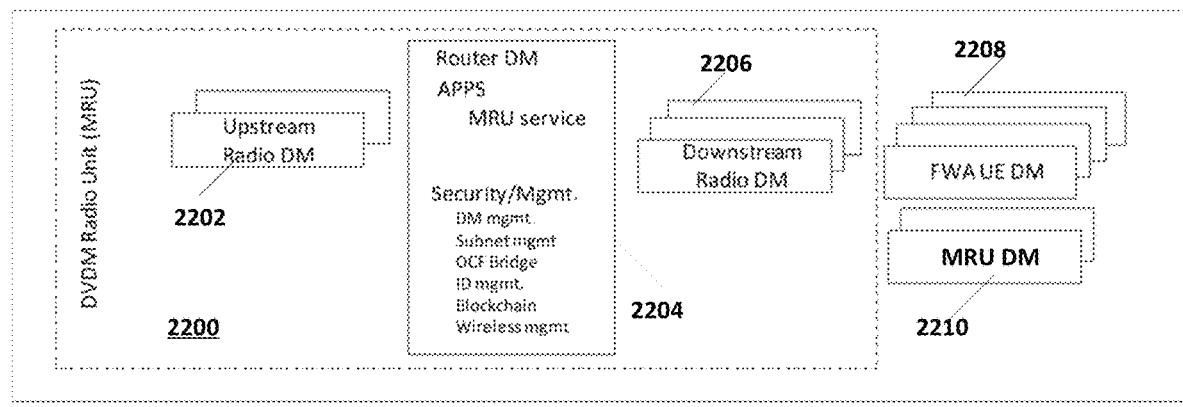
FIG. 22A illustrates an example distributed virtual device module (DVDM) architecture of mesh radio unit (MRU) according to some embodiments.

FIG. 22A illustrates a Mesh Radio Unit (MRU) 2200 according to a DVDM architecture according to some embodiments. MRU 2200 can be an example of RU 840 illustrated in FIG. 8C. As illustrated in FIG. 22A, MRU 2200 includes upstream radio DMs 2202 as well as downstream radio DMs 2206. Radio DMs 2202 and 2206 may be radio devices 900 as illustrated in FIG. 9. MRU 2200 further includes router DM 2204, which includes applications for MRU services as well as security and DM management functionality. MRU 2200 provides control for fixed wireless access DMs 2208 or further MRU DMs 2210 that are linked to MRU 2200. FIG. 22A illustrates how an MRU can be constructed using the DVDM architecture according to some embodiments. In particular, multiple Native Radio DMs 2202 can be connected to the upstream side of Router DM 2204 to communicate with the network upstream and connecting multiple Native Radio DMs 2206 to the downstream side of Router DM 2204 to communicate with the fixed-wireless access (FWA) UE DMs 2208 such as the gateways discussed above. MRU 2200 may also communicate with other MRU DMs 2210.

As is illustrated, MRU 2200 can operate as an RU unit in a network such as network 1100 described above with respect to FIGS. 11 and 15A. Further, the flexible DVDM architecture to form MRU 2200 can also facilitate a mix of different radios, using point-to-multipoint radio for near-by endpoints and use point-to-point radios to connect to distant end points. It can also employ low-power narrow band radio to connect with simple IoT devices all controlled through the Router DM 2204. Router DM 2204 may be any platform capable of performing the functions, for example the platform illustrated in FIG. 8C. Further, with regard to FWA UE DMs 2208, these functions may be performed by a Fast Radio DM.

Figure 22B:
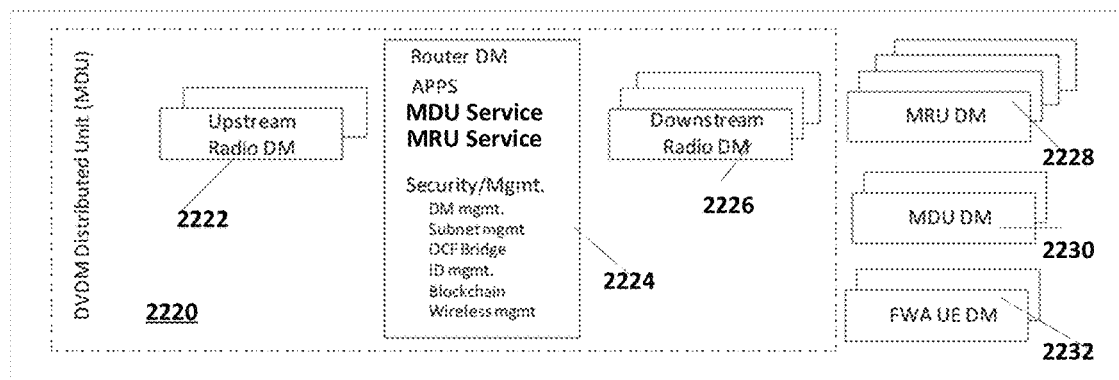
FIG. 22B illustrates an example DVDM architecture for a mesh distributed unit (MDU) according to some embodiments.

FIG. 22B illustrates a DVDM architecture that can be used to construct a Mesh Distributed Unit (MDU) 2220 according to some embodiments. MDU 2220 can be an example of DU 820 has been discussed above with respect to FIG. 8B and DU 1002 illustrated in FIG. 10A. As is illustrated in FIG. 22B, MDU 2220 includes upstream radio DMs 2222 and downstream radio DMs 2226. As discussed above, these may each be radio device 900 as illustrated in FIG. 9. Each of upstream DM 2222 and downstream DM 2224 are connected to upstream and downstream networks by router DM 2224. Router DM 2224 may provide both MDU services as well as MRU services. MDU 2220 may be constructed where radio DMS 2222 and 2226 are Native Radio DMs. Further, router 2224 of MDU 2020 can be performed on any platform, as is described with DU 820 illustrated in FIG. 8B.

As is further illustrated in FIG. 22B, MDU 2220 can provide control and communications with MRU DMs 2228, MDU DMs 2230, and FWA UE DMs 2232. Consequently, MDU 2220 performs the functions described above for operation as a DU within a network such as Network 1100 as described with respect to FIGS. 11 and 15A.

Figure 22C:
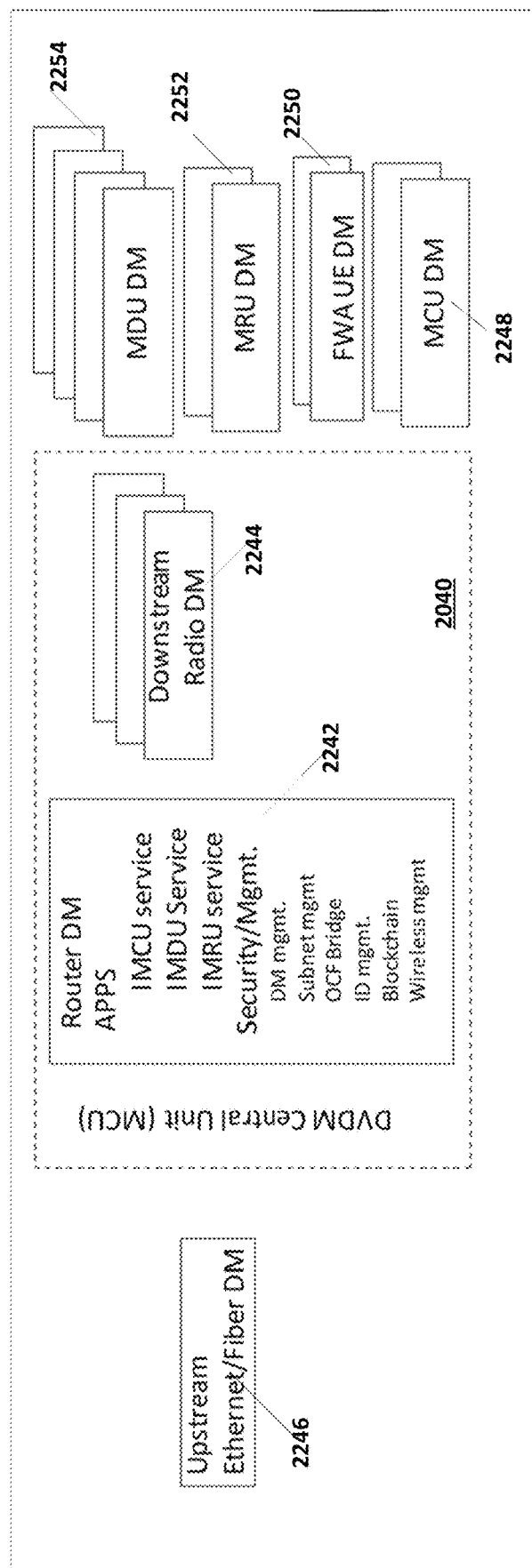
FIG. 22C illustrates an example DVDM architecture for a mesh central unit (MCU) according to some embodiments.

FIG. 22C illustrates a DVDM architecture that can be used to construct a Mesh Centralized Unit (MCU) 2240 according to some embodiments. MCU 2240 can be an example of CU 800 illustrated in FIG. 8A and CU unit 1010 as illustrated in FIG. 10B. As is illustrated in FIG. 22C, MCU 2240 includes router DM 2242 and downstream radio DM 2244. Router DM 2242 provides MCU services, MDU services, and MRU services in order to operate with a network such as network 1100 described above with FIGS. 11 and 15A and to perform the functions of a CU as described above. As is illustrated, Router DM 2242 is coupled to an Ethernet DM 2246 for upstream communications and native radio DMs 2044 for downstream communications. Ethernet DM 2246 may be a native DM, but is likely to be an unaffiliated DM. As is illustrated, MCU 2240 is connected downstream to any combination of MDU DMs 2254, MRU DMs 2252, FWA UE DMs 2250, and other MCU DMs 2248. Connection with other MCU DMs 2248 may be useful to provide connection in the event that the wired ethernet link provided by Ethernet DM 2246 fails. In that case, MCU 2248 can continue to provide service through MCU DMs 2248.

As is illustrated above, MRU 2200, MDU 2220, and MCU 2240 are DVDM network devices as described previously. As such, MRU 2200, MDU 2220, and MCU 2240 can operate within networks such as network 1100 as illustrated in FIGS. 11 and 15A. Further, MRU 2200, MDU 2220, and MCU 2240 can perform the networked functions to provide transactive internet services to downstream gateways as in FIGS. 12A through 12C or transactive energy services as described with FIGS. 13A and 13B, and Blockchain secured services as described with FIGS. 15A, 15B, 15C, 16A, 16B, 16C, 18A, and 18B. Further, MRU 2200, MDU 2220, and MCU 2240 can operate to provide services to DVDM based gateways as illustrated in FIGS. 20A through 20C and 21A through 21F as described above.

Figure 23A:
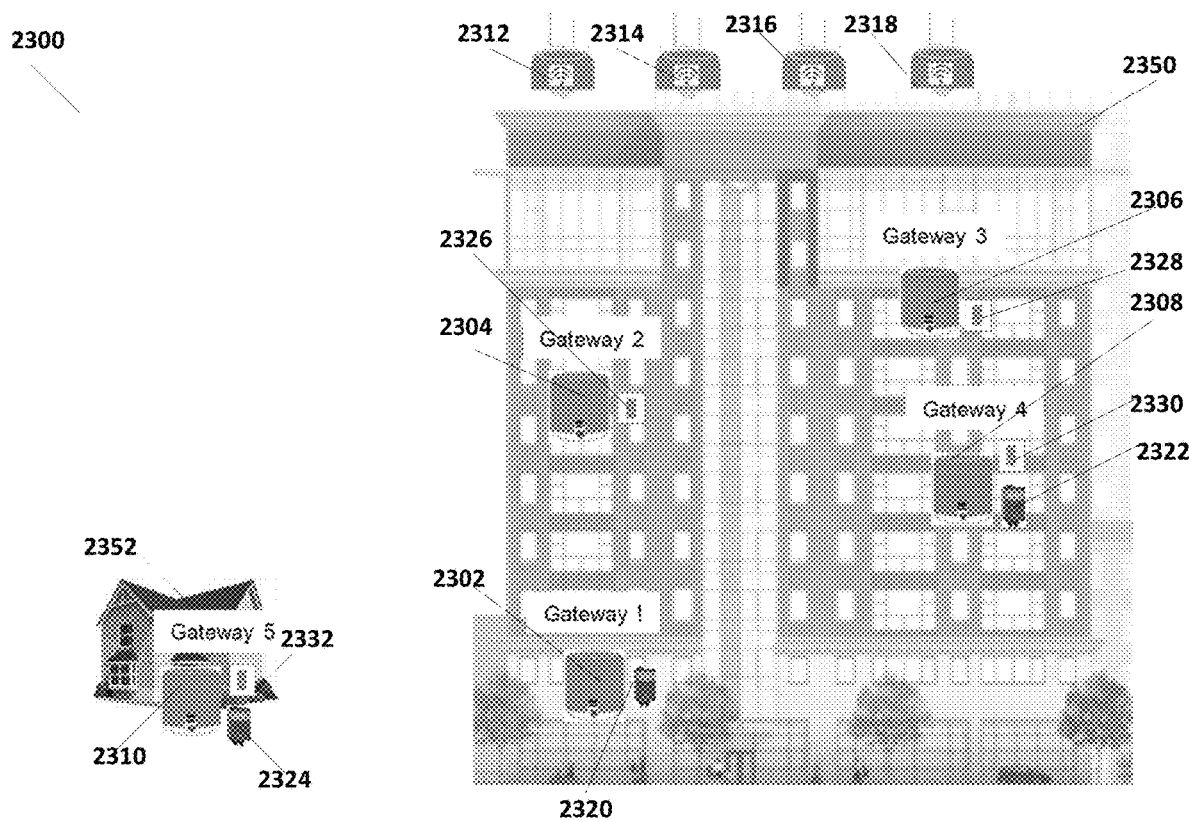
FIGS. 23A and 23B illustrate an example DVDM architecture for a virtual transactive energy gateway according to some embodiments.
Figure 23B:
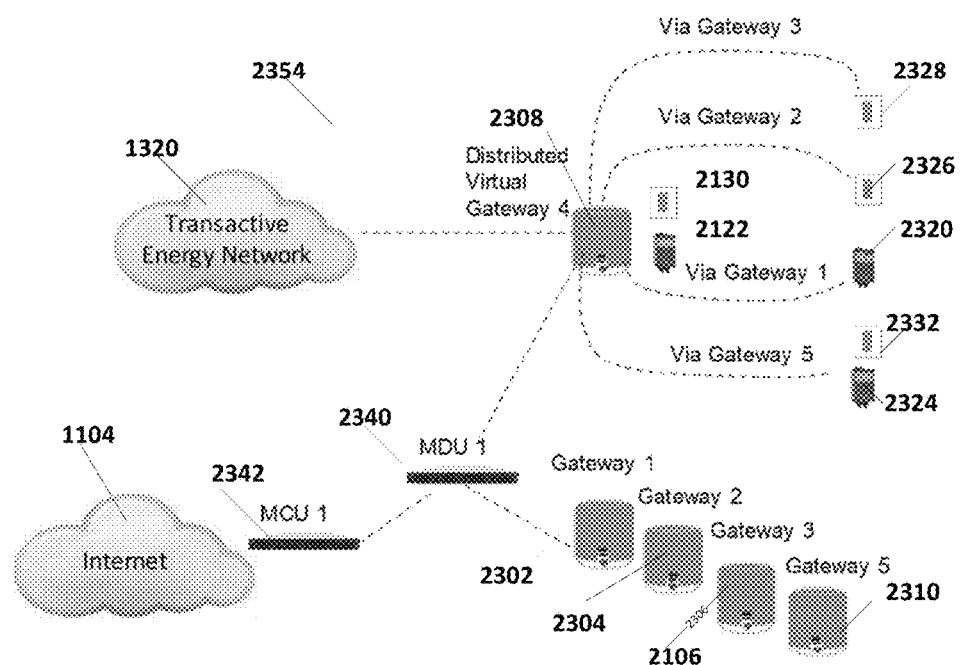

FIGS. 23A and 23B illustrate further how the DVDM architecture can be used to optimize the deployment and Gateway features flexibly to form a network 2354 that can provide energy and communications services to devices connected to multiple gateways. FIG. 23A illustrates a spatial layout of network devices and FIG. 23B illustrates a network according to some embodiments that employ those network devices. In the example illustrated in FIGS. 23A, five gateways (gateway 1 2302, gateway 2 2304, Gateway 3 2306, Gateway 4 2308, and Gateway 5 2310) are deployed between a high-rise building 2350 and a single-family home 2352. In particular, Gateway 1 2302, Gateway 2 2304, Gateway 3 23106, and Gateway 4 2308 are distributed throughout high-rise building 2350 while Gateway 5 2310 is installed at single-family home 2352. Although any distribution of devices can be attached to these gateways, in the illustration illustrated in FIG. 23A an EV charger 2320 is connected to Gateway 1 2302, a smart meter 2326 is connected to Gateway 2 2304, a smart meter 2328 is connected to Gateway 3 2306, a smart meter 2330 and an EV charger 2322 are connected to Gateway 4 2308, and a smart meter 23132 and EV charger 2324 is connected to Gateway 5 2310. Further, radio DMs 2312, 2314, 2316, and 2318 are connected to gateways 2302, 2314, 2316, and 2330, respectively.

Although all of Gateways 2302, 2304, 23106, 2308, and 2310 may share a single owner, each may also be owned separately. They are interlinked to form a network as described below, which as discussed above may implement the Blockchain security and linking processes described previously.

As is illustrated in FIG. 23B, the example network 2354 includes an MCU 2342 coupled to an MDU 2340, which is networked with Gateways 2302, 2314, 2306, 2308, and 2310. As is further illustrated, Network 2354 includes cloud internet services 1104 and transactive energy network services 1320 coupled to network 2354.

To optimize the connection to the Transactive Energy Network 1320 and simplify the management of all these Energy demand endpoints, Gateway 4 2308 can be configured as a Distributed Virtual Gateway providing an interface to the Transactive Energy Network on behalf of all the other Gateways 23102, 2304, 2306, and 2310. To do so, Gateways 23102, 2304, 2306, and 2310 request Gateway 4 2308 as a Transactive Energy proxy for their Energy demand endpoints. Gateway 4 2308 can then operate as discussed with FIGS. 13A and 13B to arrange a PPA contract for energy services. Once Gateway 4 2308 authorizes the connections, all the Energy endpoints are connected to Gateway 4 2308 with MDU 1 2340, protected by the Blockchain rooted in gateway 4 2308 as was discussed above with respect to FIGS. 18A and 18B. All energy demand endpoints behind Gateway 1 2302, Gateway 2 2304, Gateway 3 2304, and Gateway 5 2310 are therefore connected to the Transactive Energy network through Gateway 4 2308 through MDU 1 2342. All of the endpoints can be controlled and managed via Gateway 4 2354. In some embodiments, Network 2354 can be connected locally. FIGS. 23A and 23B, therefore, illustrates the flexibility of the DVDM architecture to create virtual gateway to optimize system connectivity and simplifies operation and management.

As discussed above, the DVDM architecture allows for construction of powerful secure access gateway products from self-contained virtual device modules rapidly. These virtual device modules can be integrated on a common platform, locally attached to a core device, or virtually distributed remotely over a wide area network. However, all these DM's can be locally managed and controlled as part of a coherent network devices. These DMs can be native DMs or unaffiliated DMs as described above. Such a construction also allows for construction of powerful DMs by connecting less sophisticated devices, such as low power connected IoT devices, to Virtual Super DMs as discussed above to create a highly functional resulting DM.

One of the biggest challenges wireless service network operators, including Fixed Wireless Access and Mobile Cellular Network operators, is building the radio base station network infrastructure. Building these radio base station infrastructures is extremely time consuming and expensive. The complexity of locating and securing radio sites is daunting. Further, as has been discussed previously, the creation of radio base stations in a rural area or in under-developed areas may be prohibitively expensive for deploying a conventional network. However, embodiments of the present disclosure allow for deployment of technology dynamically without the additional expense of building the radio base station network. In particular, the component elements of the distributed radio base station system, namely the RU, DU, and CU can be distributed and integrated into gateways, creating a virtual radio BS network overlay. These systems allow networks to be dynamically assembled and expanded without significant investment in radio BS infrastructure.

Figure 24A:
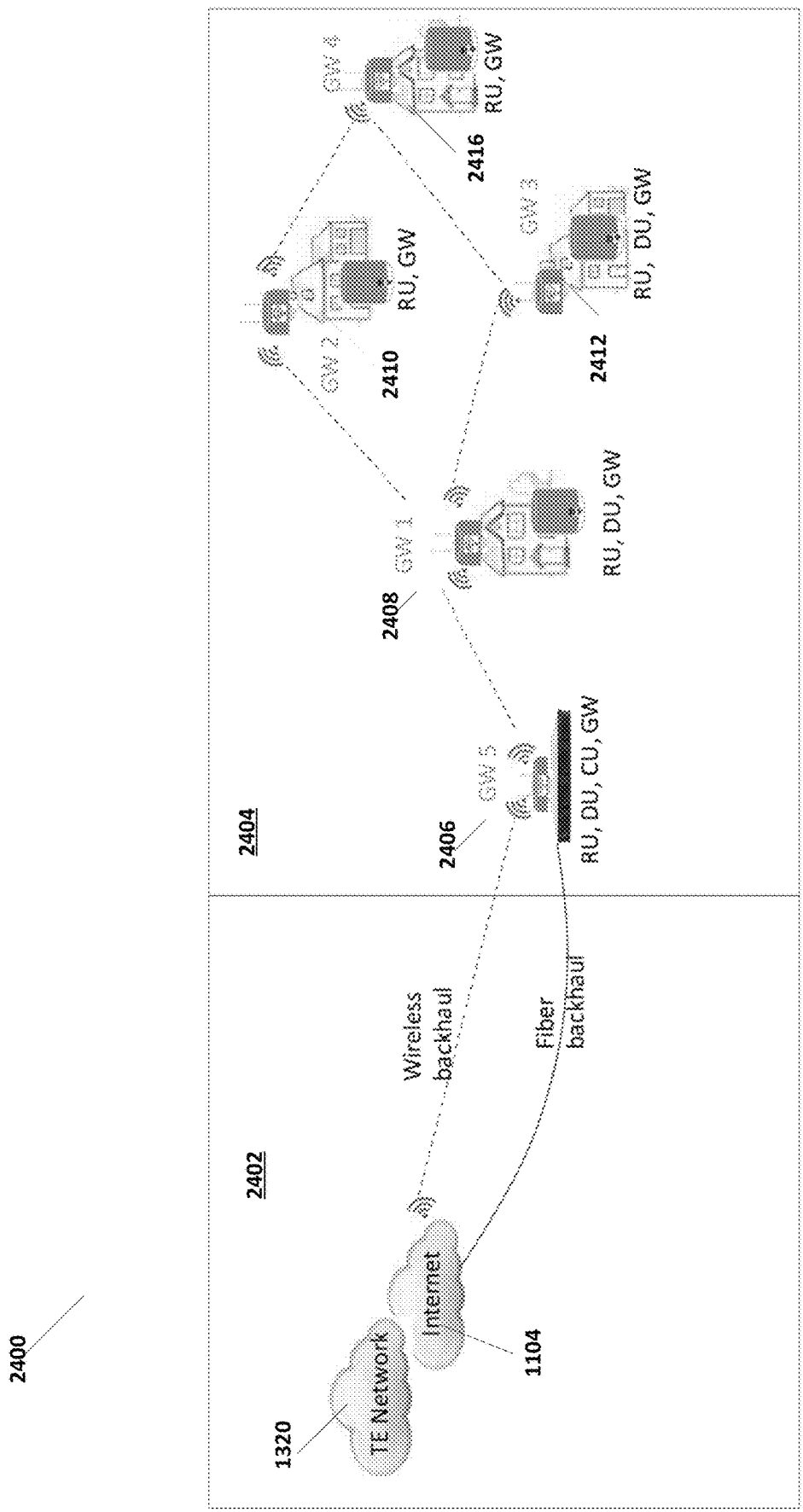
FIG. 24A illustrates a virtual wireless radio base station (BS) network with integrated gateway functionality according to some embodiments.

FIG. 24A illustrates a network 2400, which is an example illustrating construction and deployment of a network using virtual radio base stations. As is illustrated in FIG. 24A, network 2400 includes a backhaul network 2402 (i.e. the connection between a CU network component and the cloud-based services) and a fronthaul subnet 2404. As is illustrated, backhaul network 2402 can include fiber and fixed wireless communications to internet services 1104 and transactional energy services 1302. The fronthaul subnet 2402 of network 2400 can include a collection of mesh-networked integrated BS UE gateway devices, GW1 2408, GW2 2410, GW3 2412, GW4 2416, and GW5 2406. These gateways are deployed throughout an area in any functional fashion. As is discussed, for example, with GW 1030 illustrated in FIG. 10D, each of GW1 2408, GW2 2410, GW3 2412, GW4 2414, and GW5 2406 includes a combination of network elements (CU, RU, DU). As such, user-based subnets 2404 with specific service performance characteristic is assembled using selected RU, DU, and CU components in the integrated BS UE gateways to serve each user, as described above. As illustrated in FIG. 24A, GW5 2406 is connected through backhaul network 2402 to internet services 1104 and TE services 1302. In the example illustrated in FIG. 24A, GW5 2406 is connected on the fronthaul subnet to GW1 2408. GW1 2408 is connected to GW2 2410 and GW3 2412. Both of GW2 2410 and GW3 2412 are connected with GW4 2416.

In the specific example as illustrated in FIG. 24A, GW1 2408 and GW3 2412 integrate an RU, a DU, and a GW. GW2 2410 and GW4 2416 each integrate an RU with a UE GW. GW5 2406 integrates an RU, a DU, a CU, and a UE GW. With this specification, there are potentially six virtual radio Base Stations that can be assembled. A virtual Base Station is constructed with a CU, a DU, and a RU function. Formation of virtual base stations in the example illustrated in FIG. 24A can be defined as in Table V below.

TABLE V

Virtual Base Station of FIG. 22

| CU Functionality | DU Functionality | RU Functionality |
|---|---|---|
| GW5 2406 | GW5 2406 | GW5 2406 |
| GW5 2406 | GW1 2408 | GW1 2408 |
| GW5 2406 | GW3 2412 | GW3 2412 |
| GW5 2406 | GW1 2408 | GW2 2410 |
| GW5 2406 | GW1 2408 | GW4 2414 |
| GW5 2406 | GW3 2412 | GW4 2414 |

Note that, the Integrated BS UE Gateways can be hosted in different hardware platforms. GW5 2406, for example, can be hosted in a general-purpose computer server whereas all other GWs are hosted in hardware, which may have special form factors, as described above.

Enabled by the DVDM architecture, various combinations of RU, DU, and CU Device Modules can easily be assembled and managed as part of any Integrated BS UE Gateway according to some embodiments. A Gateway can be built without any Base Station components. However, as is illustrated in FIG. 24A, the physical base station network may be completely eliminated, and the mesh network formed with GW devices that are integrated with network functionality (CU, DU, RU).

Figure 24B:
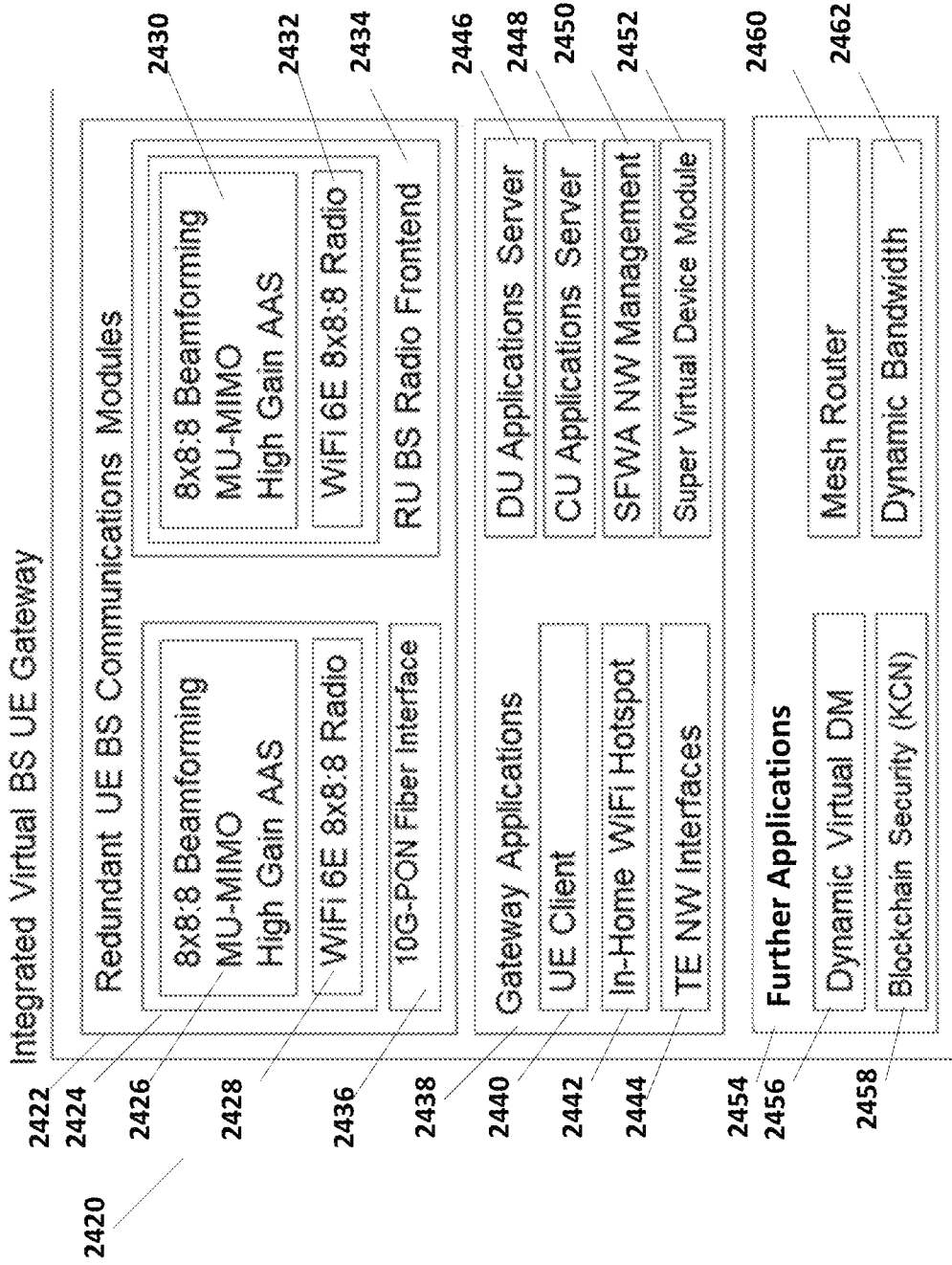
FIG. 24B illustrates further a UE gateway according to some embodiments.

FIG. 24B illustrates a depiction of an integrated virtual BS UE gateway 2420 as has been described above, for example, with respect to FIG. 8D, FIG. 10B, FIG. 10D, FIGS. 20A-20C, and other discussion above. As illustrated in FIG. 24B, gateway 2420 includes communications module 2422 with an upstream communications block 2424 and a downstream communications block 2434. As has been discussed above, upstream communications block 2424 includes a radio transceiver 2426 with high-gain advanced antenna systems with multiple-user multiple-input multiple-output (MU-MIMO) beamforming, for example. Upstream communications block may further include a WiFi block 2428 and a fiber interface block (10G-passive optical network (PON) 2436. Downstream communications block 2434 may include a radio transceiver 2430, which may be the same as radio transceiver 2426, and a WiFi block 2432, which may be the same as WiFi block 2428. Communications module 2422

Integrated BS UE gateway 2420 further includes a gateway applications block 2438. Gateway applications block 2438 includes application DMs that are operating on the gateway, including a UE client block 2440, in-home WiFi hotspot DMs 2442, and TE NW interfaces 2444. Further, applications 2438 also includes a DU applications server 2446, CU applications server 2448, SFWA management 2450, and super virtual device modules 2452. Further applications are illustrated in block 2454, which includes dynamic virtual DMs 2456, Blockchain security 2458, Mesh routers 2460, and Dynamic Bandwidth 2462. These applications are software driven and can be loaded and activated independently when needed.

The general integrated virtual BS UE gateway 2420 can operate in multiple functionalities in a network such as that illustrated, for example, in FIGS. 23A, 23B, and 24A. As explained above, gateway 2420 has all of the components of a virtual base station and also can interact with user devices coupled with gateway 2420.

Figure 24C:
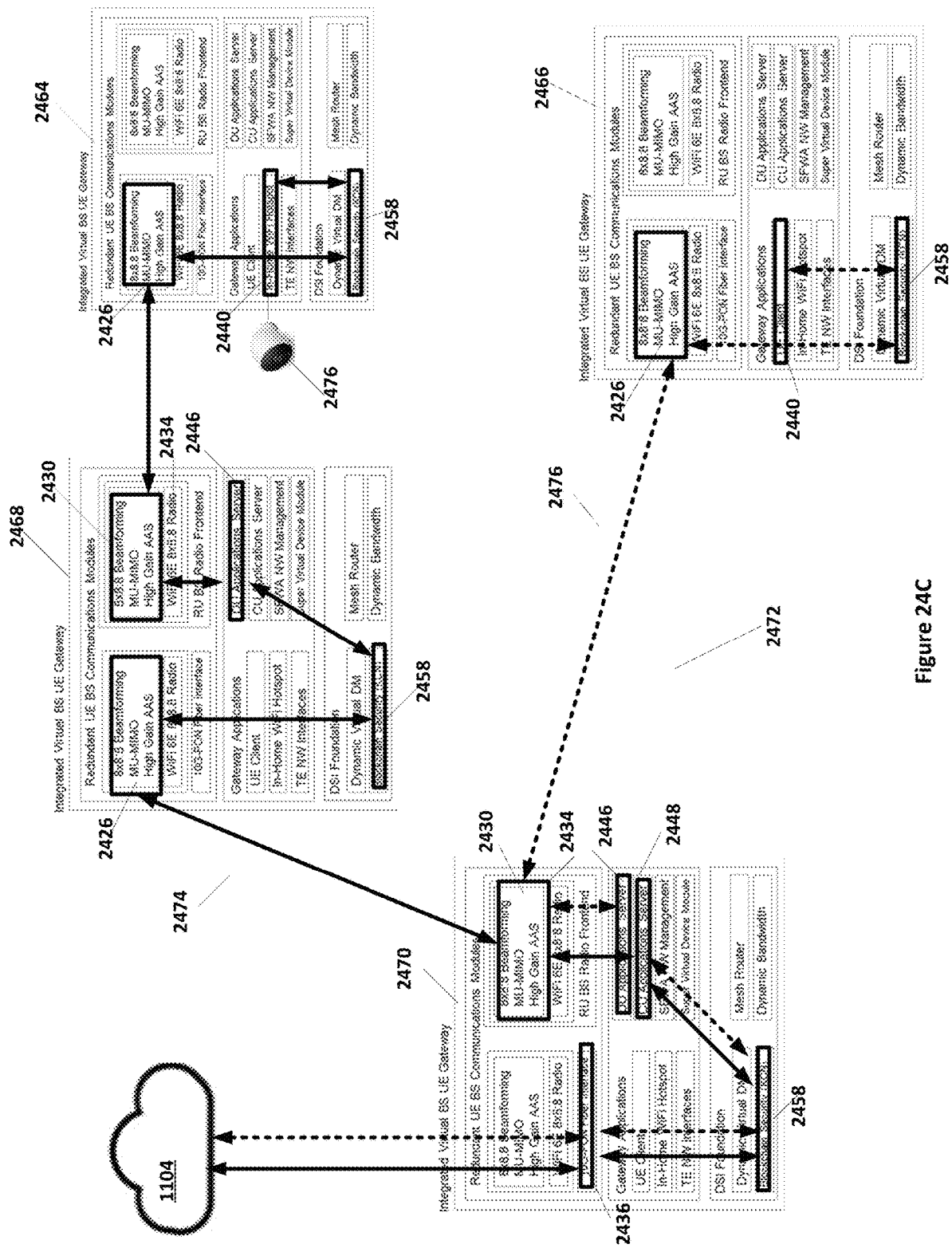
FIG. 24C illustrates data paths through a network formed from UE gateways illustrated in FIG. 24B.

FIG. 24C illustrates data transmission through a network 2472 according to some embodiments using integrated virtual BS UE gateway 2420 devices as illustrated in FIG. 24B. As is illustrated, network 2472 illustrates a gateway 2464 operating as a UE gateway, a gateway 2466 operating as a UE gateway, a gateway 2468 operating as a BS gateway with RU and DU functions to UE to UE gateway 2464 gateway 2470 that is operating either as a BS gateway with CU function to BS gateway 2468 or as a BS gateway with DU and CU functions to UE gateway 2466. Consequently, gateway 2464, gateway 2458, and gateway 2470 form a subnet 2474 while gateway 2466 and 2470 form another subnet 2476. In each of subnet 2474 and 2476, a virtual base station is formed. In subnet 2474, gateway 2468 provides RU and DU functionality, and gateway 2470 provides CU capability. In subnet 2476, gateway 2470 provides all RU, DU, and CU BS functionality. Consequently, the base station of subnet 2474 is formed by CU application 2448 in gateway 2470, RU function of radio block 2430 and radio block 2426 of RU 2434 in gateway 2468, DU application 2446 of gateway 2468. The base station of subnet 2476 is formed by CU application 2448 of gateway 2470, DU application 2446 of gateway application 2470, and the RU 2434 with radio block 2430 of gateway application 2470.

In the example of subnet 2474 illustrated in FIG. 24C, the data path between a device 2476 to cloud services in internet 1104 is presented. The data path through each of gateway 2464, 2468, and 2470 is depicted with solid lines. Device 2476 is protected by blockchain security 2458 in gateway 2464, which may include a root KCN registry. The DU application 2446 in gateway 2468 is protected by the KCN registry in blockchain security 2458 in gateway 2468. The CU application 2448 in gateway 2470 is protected in the KCN registry in Blockchain security 2458 in gateway 2470. Consequently, data from device 2476 is processed through WiFi DM 2440 of gateway 2464, through Blockchain security 2458 of gateway 2464, and transmitted by radio transceiver 2426 of gateway 2464. The data is received by radio block 2430 of gateway 2468, processed through DU applications 2446 of gateway 2468, processed through Blockchain security 2458 of gateway 2468, and then transmitted by radio transceiver 2426 of gateway 2468. The data is then received by radio block 22430 of gateway 2470, processed through CU application 2448 of gateway 2470, processed through Blockchain security 2458 of gateway 2470, then transmitted to cloud internet services 1104 through fiber interface block 2436 of gateway 2470. Data sent from cloud services 1104 to device 2476 follows the reverse path. UE client block 2440 and DU application 2446 of gateway 2470 can be disabled to apply resources to CU block 2448.

In the example of subnet 2476 illustrated in FIG. 24C a data path between UE client block 2440 and cloud internet services 1104 is presented. The data path through gateway 2466 through gateway 2470 to cloud internet services 1104 is depicted by dotted lines. The device connected through UE client 2440 is protected by Blockchain security 2458 of gateway 2466. The DU application 2446 and CU block application 2448 is protected by Blockchain 2458 of gateway 2470. In subnet 2476, the base station is formed by the RU, DU, and CU of gateway 2470. As illustrated in FIG. 24C, in subnet 2476 starting from UE client 2440 of gateway 2466, data is processed through Blockchain security 2458 of gateway 2466 and then transmitted by radio block 2426 of gateway 2466. The data is received in radio block 2430 of gateway 2470, which is part of RU 2434. Data is then processed through DU application 2446 of gateway 2470 and then CU application 2448 of gateway 2470. Data is then processed through Blockchain security 2458 of gateway 2470 before being sent by fiber interface 2436 of gateway 2470 to cloud internet 1104.

Consequently, as illustrated in FIGS. 24A and 24C, data is transmitted throughout a network such as network 2472 of FIG. 24C with individual gateways performing the various functions of the virtual base station. Each gateway performs according to its assignment in the subnet that is processing the data and may provide different functionality depending on individual subnet. For example, in FIG. 24C, gateway device 2468 may form yet a third subnet with gateway 2470 to interact with devices being serviced by gateway 2468.

Figure 25:
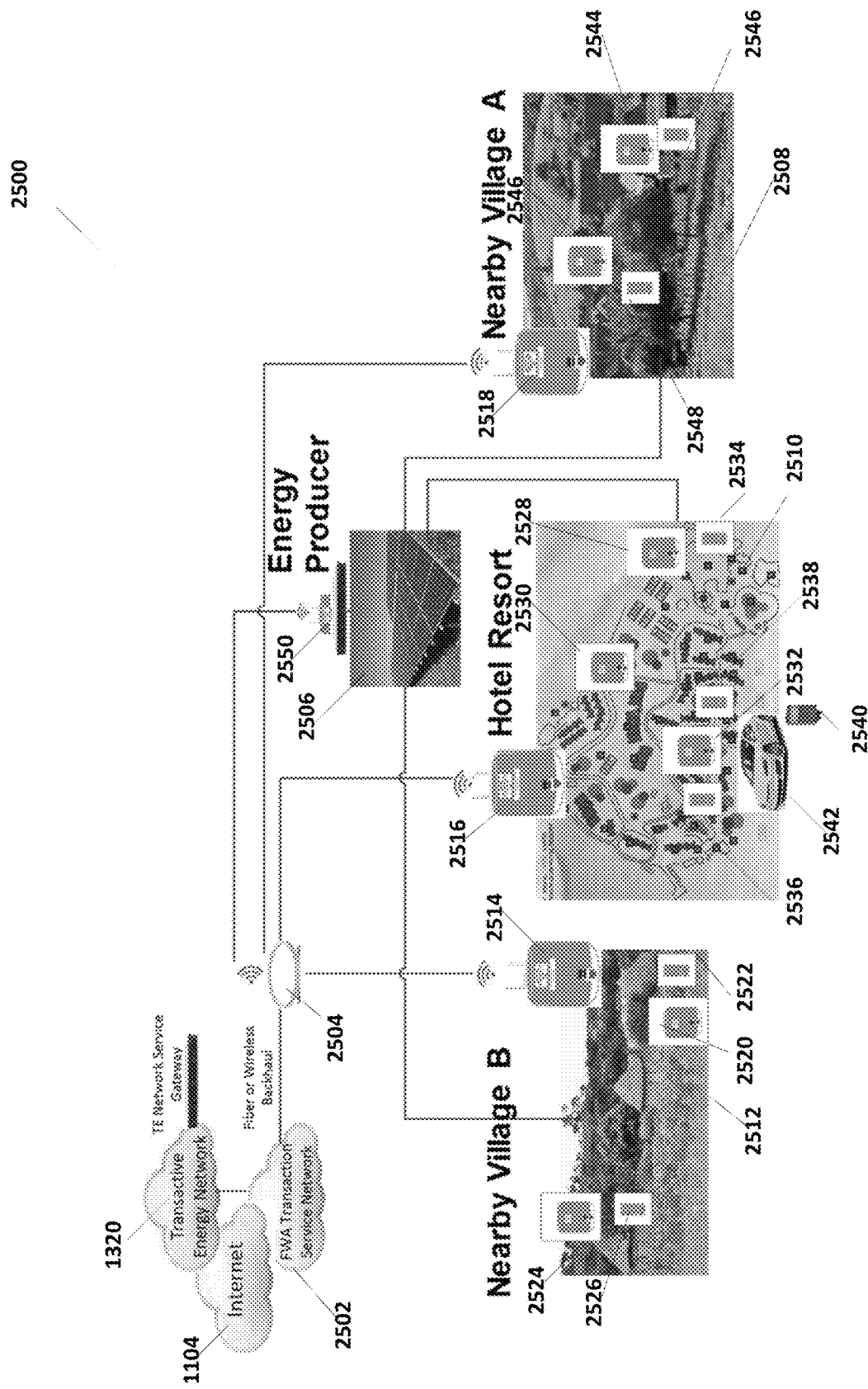
FIG. 25 illustrates an example of utilization of the integrated functionality described with respect to FIGS. 24A and 24C.

FIG. 25 illustrates how Integrated Virtual BS Gateways can enable a network 2500 spanning several site functionalities. As illustrated in FIG. 25, a network 2504, which may be similar to network 1100 as illustrated above with respect to FIG. 11 or 15A or other network that may or may not include a radio based network. Network 2504 is coupled as is discussed above to internet services 1104, TE services network 1320, and potentially a FW transaction services network 2502.

An energy producer network device 2550, which may, for example, be an EN device as discussed above with respect to FIGS. 13A and 13B, can be coupled to network 2504 and can arrange power service contracts through TE network 1320. As is illustrated in FIG. 25, energy producer network device 2506 may be coupled with an Energy Producer power plant 2506 and Electrical Grid connected to supply power to various communities. For example, Energy producer power plant 2506 may be a solar powered plant supplying power to a village 2508, a hotel resort 2510, and a village 2512. In some embodiments, network device 2550 may interconnect power components within the Energy Producer infrastructure, which connects power plant 2506 with the Hotel Resort 2510 and the two nearby villages 2508 and 2512, with a fixed wireless system.

As is illustrated in FIG. 25, each site can include an integrated GW device to facilitate a mesh network with no physical radio BS network outside of network 2504. As is illustrated, a GW 2514 at Village 2512, GW 2516 at Hotel Resort 2510, and GW 2518 at village 2508. GW 2514 is integrated to at least provide CU functionality and is used to form a network such as that illustrated in FIGS. 24A and 24C, for example, with GW 2524 and GW 2520 to interface with devices 2526 and 2522. GW 2546 includes integration with CU functionality to form a network with GW 2530, GW 2528, and GW 2532 to drive devices 2534, 2538, 2536, and 2540. In the example illustrated, device 2540 is an EV charger that receives power through the power network formed by energy producer 2506 to charge an EV car 2542. GW 2518 in village 2508 includes CU functionality to interface with GW 2544 and 2546 in order to drive devices 2548 and 2546. In the example illustrated in FIG. 25, integrated BS UE Gateways illustrated in FIG. 25 can be equipped with Radio Devices 900 that include a Solar Power DMs and batteries to power the gateways. As discussed above, the RU, DU, and CU DM integrated into the mesh gateways can provide a virtual Radio Base Station network connecting all the UE DM's, with per-user subnets designed with specific performance characteristics to meet the needs of each user in the network.

The DMs of Gateways 2514, 2546, and 2518 can be coupled through network 2504 to a FWA Transaction Service Network 2502, which can provide Internet Fixed Wireless Access services to all the users in the Energy Producer network that includes energy producer 2506, the Hotel Resort 2510, and the surrounding villages 2508 and 2512. They also provide connection interface to the Transactive Energy network with irrefutable transaction contract ledger support, as described above. In addition, they provide security protection in conjunction with the DU DM's, to all connected devices connected through them, as has been described above.

As illustrated in FIG. 25, the Server-based Integrated Mesh Gateway 2550 that connects the Energy Producer 2506 to the Transactive Energy (TE) Network 2520, which may be via the FWA Transaction Service Network 2302, can include a Local TE service DM. This Local TE Service DM provides services such as energy production management and microgrid control functions. The local TE services DM may be managed from the TE Network using a TE Network Service DM hosted in the TE Network Service Gateway in the TE Network.

Typically, these user cases will start building the core system to cover the Energy Producer network and the Hotel Resort. Once that is in place, incremental Gateways can be deployed to the nearby villages providing crucial enabler for under-privileged villagers to connect to the Internet to maximize their chances to participate as productive global citizens and to escape structural poverty rapidly.

As illustrated above, embodiments according to this disclosure enable the integration of selected distributed radio Base Station components, namely the RU, DU and CU, into a set of Integrated Virtual BS UE Gateways, to reassemble selected components from selected Integrated Virtual BS UE Gateway to form radio BS to construct per-user subnet to serve a user. With embodiments according to this disclosure, the need for separate expensive radio Base Station access network infrastructure is eliminated. Further, with the implementation of Blockchain security as described above, network security can be maintained.

Embodiments of components according to this disclosure form a powerful framework that enables modular, self-organized, self-optimized, self-healed, wireless mesh networked systems securely interconnecting millions of connected IoT devices, including energy supply and demand endpoints. These embodiments enable both Transactive Energy services and Transactive Communications services. These embodiments further facilitate the transformation of fixed-term single supplier service arrangements, such as Electricity Utility service and Fixed Wireless Access service, to multi-supplier with flexible period, transactive terms between service suppliers and consumers, inviting competition into an otherwise closed service arrangement. These embodiments flexibly integrate radio Base Station infrastructure into UE access Gateways eliminating the need to build separate expensive radio BS access networks.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

The invention claimed is:

1. A method of receiving services at an end-point device coupled to a user equipment (UE) gateway from a network through a radio base station (BS), comprising:
    sending a service request from the UE gateway through the radio BS to one or more distributed units in the network;
    receiving a proposed contract from each of the one or more distributed units into the UE gateway from the radio BS;
    deciding on a winning proposed contract;
    notifying a winning distributed unit associated with the winning proposed contract through the radio BS; and
    connecting to receive services through the winning distributed unit and provide services to the end-point device.

2. The method of claim 1, further including receiving service availability beacons from the one or more distributed units in the network into the UE gateway.

3. The method of claim 1, wherein the service request is for internet services.

4. The method of claim 3, wherein the service request includes a request for internet transaction services according to one or more of parameters from a set of parameters that includes a maximum bandwidth, a maximum latency, a maximum bit-error-rate, a maximum price, a start time, and an end time.

5. The method of claim 3, wherein the winning proposed contract includes a subnet proposal that determines a data pathway with a centralized unit, the winning distributed unit, and a radio unit that couples with the UE gateway.

6. The method of claim 5, wherein the winning proposed contract includes an aggregated plurality of subnets, each of the subnets including a centralized unit, a distributed unit, and a radio unit coupled to the UE gateway.

7. The method of claim 4, wherein the service request is a temporary service request of particular duration defined by the start time and the end time.

8. The method of claim 4, wherein the service request is for an indefinite time.

9. The method of claim 1, wherein the service request is for transactive energy services.

10. The method of claim 9, wherein the service request includes a request for transactive energy services according to one or more parameters from a set of parameters that includes a kWh requirement, a price, a start time, and an end time.

11. The method of claim 9, wherein the one or more distributed units in the network are energy node devices coupled to energy producers.

12. The method of claim 9, wherein the service request is a request for services of a particular duration defined by a start time and an end time.

13. The method of claim 9, wherein the service request is a request for services of an indefinite duration.

14. A method of operating a distributed unit within a network, comprising:
receiving a service request from a user-equipment (UE) gateway, wherein the UE gateway is coupled to the network through a radio base station;
requesting service from a provider according to the service request;
receiving a provisional contract from the provider;
providing a proposal with the provisional contract to the service request to the UE gateway; and
if notified that the proposal is a winning proposal, arranging services to the UE gateway according to the proposal.

15. The method of claim 14, further including transmitting a service availability beacon to the UE gateway.

16. The method of claim 14, wherein the service request is for internet services.

17. The method of claim 16, wherein the service request includes a request for internet transaction services according to one or more of parameters from a set of parameters that includes a maximum bandwidth, a maximum latency, a maximum bit-error-rate, a maximum price, a start time, and an end time.

18. The method of claim 16, further including assembling a subnet includes determining a data pathway with a centralized unit and a radio unit to provide services through the centralized unit, the distributed unit, and the radio unit.

19. The method of claim 18, wherein assembling the subnet includes aggregating subnets.

20. The method of claim 19, wherein subnets may include a first subnet including the distributed unit and a second subnet including a second distributed unit.

21. The method of claim 18, wherein aggregating subnets includes providing a plurality of subnets, each of the subnets including a centralized unit, a subnet distributed unit, and a radio unit to link with the UE gateway, wherein the subnet distributed unit for at least one of the plurality of subnets is the distributed unit.

22. The method of claim 16, wherein the service request is for an indefinite time.

23. The method of claim 16, wherein the service request is for temporary services of particular duration defined by a start time and an end time.

24. The method of claim 14, wherein the distributed unit is an energy node and the service request is for transactive energy services.

25. The method of claim 24, wherein the service request includes a request for transactive energy services according to one or more parameters from a set of parameters that includes a kWh requirement, a price, a start time, and an end time.

26. The method of claim 24, wherein the service request is a request for services of a particular duration defined by a start time and an end time.

27. The method of claim 24, wherein the service request is a request for services of an indefinite duration.

28. A user equipment (UE) gateway, comprising:
a radio device that communicates with a network through a radio base station;
a router coupled to the radio device; and
one or more device interfaces coupled to the router, wherein the router executes instructions to
send a service request to one or more distributed units in the network,
receive a proposed contract from each of the one or more distributed units,
decide on a winning proposed contract,
notify a winning distributed unit associated with the winning proposed contract,
and connect through the radio base station to receive services through the winning distributed unit.

29. The UE gateway of claim 28, wherein the router further executes instructions to receive service availability beacons from the one or more distributed units in the network.

30. The UE gateway of claim 28, wherein the service request is for internet services.

31. The UE gateway of claim 30, wherein the service request includes a request for internet transaction services according to one or more of parameters from a set of parameters that includes a maximum bandwidth, a maximum latency, a maximum bit-error-rate, a maximum price, a start time, and an end time.

32. The UE gateway of claim 30, wherein the winning proposed contract includes a subnet proposal that determines a data pathway with a centralized unit, the winning distributed unit, and a radio unit coupled to the UE gateway.

33. The UE gateway of claim 32, wherein the winning proposed contract includes an aggregated plurality of subnets, each of the subnets including a centralized unit, a distributed unit, and a radio unit coupled to the UE gateway.

34. The UE gateway of claim 31, wherein the service request is a temporary service request of particular duration defined by the start time and the end time.

35. The UE gateway of claim 31, wherein the service request is for an indefinite time.

36. The UE gateway of claim 28, wherein the service request is for transactive energy services.

37. The UE gateway of claim 36, wherein the service request includes a request for transactive energy services according to one or more parameters from a set of parameters that includes a kWh requirement, a price, a start time, and an end time.

38. The UE gateway of claim 36, wherein the distributed unit is an energy node device coupled to energy producers.

39. The UE gateway of claim 36, wherein the service request is a request for services of a particular duration defined by a start time and an end time.

40. The UE gateway of claim 36, wherein the service request is a request for services of an indefinite duration.

41. A distributed unit, comprising:
a processing platform coupled between a centralized unit and a radio unit in a network, wherein the processing platform executing instructions to receive a service request from a user-equipment (UE) gateway coupled to the radio unit;
request service from a provider according to the service request;
receive a provisional contract from the provider;
provide a proposal with the provisional contract to the service request to the UE gateway; and if notified by the UE gateway that the proposal is a winning proposal, arrange services to the UE gateway according to the proposal.

42. The distributed unit of claim 41, wherein the distributed unit further executes instructions to transmit a service availability beacon to the UE gateway.

43. The distributed unit of claim 41, wherein the service request is for internet services.

44. The distributed unit of claim 43, wherein the service request includes a request for internet transaction services according to one or more of parameters from a set of parameters that includes a maximum bandwidth, a maximum latency, a maximum bit-error-rate, a maximum price, a start time, and an end time.

45. The distributed unit of claim 43, wherein the distributed unit further executes instructions to assemble a subnet includes determining a data pathway with a centralized unit and a radio unit to provide services through the distributed unit.

46. The distributed unit of claim 45, wherein the instructions to assemble the subnet includes instructions for aggregating subnets.

47. The distributed unit of claim 46, wherein subnets may include a first subnet including the distributed unit and a second subnet including a second distributed unit.

48. The distributed unit of claim 46, wherein the instructions to aggregate subnets includes instructions to provide a plurality of subnets, each of the subnets including a centralized unit, a subnet distributed unit, and a radio unit to link with the UE gateway, wherein the subnet distributed unit for at least one of the plurality of subnets is the distributed unit.

49. The distributed unit of claim 41, wherein the service request is for an indefinite time.

50. The distributed unit of claim 43, wherein the service request is for temporary services of particular duration defined by a start time and an end time.

51. The distributed unit of claim 41, wherein the distributed unit is an energy node and the service request is for transactive energy services.

52. The distributed unit of claim 41, wherein the service request includes a request for transactive energy services according to one or more parameters from a set of parameters that includes a kWh requirement, a price, a start time, and an end time.

53. The distributed unit of claim 51, wherein the service request is a request for services of a particular duration defined by a start time and an end time.

54. The distributed unit of claim 51, wherein the service request is a request for services of an indefinite duration.

* * * * *